US005748865A

United States Patent [19]
Yamamoto et al.

[11] Patent Number: 5,748,865
[45] Date of Patent: May 5, 1998

[54] RANGE IMAGE SHAPE MEASUREMENT USING HIERARCHICAL ORDERING OF MULTIRESOLUTION MESH DATA FROM DELAUNAY TRIANGULATION

[75] Inventors: Hiroyuki Yamamoto, Yokohama; Toshikazu Ohshima, Kawasaki; Shinji Uchiyama, Yokohama, all of Japan

[73] Assignee: Canon Kabushiki Kaisha, Tokyo, Japan

[21] Appl. No.: 300,997

[22] Filed: Sep. 6, 1994

[30] Foreign Application Priority Data

| Sep. 3, 1993 | [JP] | Japan | 5-243838 |
| Sep. 17, 1993 | [JP] | Japan | 5-231807 |
| Nov. 18, 1993 | [JP] | Japan | 5-288965 |
| Nov. 30, 1993 | [JP] | Japan | 5-299515 |

[51] Int. Cl.$^6$ ............................................. G06T 17/20
[52] U.S. Cl. ............................................. 395/123
[58] Field of Search ....................... 395/119, 121, 395/123, 125, 127, 133; 345/139; 382/154

[56] References Cited

U.S. PATENT DOCUMENTS

| 4,802,759 | 2/1989 | Matsumoto et al. | 356/376 |
| 4,888,713 | 12/1989 | Falk | 395/125 |
| 5,060,280 | 10/1991 | Mita et al. | 382/283 |
| 5,125,038 | 6/1992 | Meshkat et al. | 382/154 |
| 5,291,561 | 3/1994 | Tanaka et al. | 382/113 |
| 5,293,471 | 3/1994 | Ikeuchi et al. | 395/143 |
| 5,325,472 | 6/1994 | Horiuchi et al. | 395/127 |
| 5,335,323 | 8/1994 | Kolnick | 395/340 |
| 5,345,490 | 9/1994 | Finnigan et al. | 395/120 X |
| 5,412,762 | 5/1995 | Kondo | 395/120 |
| 5,428,726 | 6/1995 | Piegl et al. | 395/141 |
| 5,440,674 | 8/1995 | Park | 395/123 |
| 5,465,323 | 11/1995 | Mallet | 395/123 |
| 5,497,451 | 3/1996 | Holmes | 395/120 |
| 5,553,206 | 9/1996 | Meshkat | 395/123 |
| 5,590,248 | 12/1996 | Zarge et al. | 395/121 |

OTHER PUBLICATIONS

Foley et al., Computer Graphics: Principles and Practice, 1990, pp. 350–351, 386–388, 616–617, 548–557, 672–698, 1990.

Boulanger et al., Integration of Synthetic Surface Relief in Range Images, Computer Vision Graphics and Image Processing, v.47, n.3, Sep. 1989, pp. 361–372, Sep. 1989.

Potmesil, Generation of 3D Surface Descriptions from Images of Pattern Illuminated Objects, Proceedings of the 1979 IEEE Computer Society on Pattern Recognition and Image Processing, Aug. 6, 1979, pp. 553–560, Aug. 6, 1979.

Bhanu et al., Range Data Processing: Representation of Surfaces by Edges, Eighth Intl Conf Pattern Recognition, 1986, pp. 236–238, 1986.

Foley et al., Computer Graphics: Principles and Practice, pp. 882–899, 1990.

C.H. Chen et al., "A Robot Vision System for Recognizing 3–D Objects in Low–Order Polynomial Time", IEEE Transactions on Systems, Man, and and Cybernetics, pp. 1535–1563, vol. 19, No. 6, Nov./Dec. 1989.

(List continued on next page.)

Primary Examiner—Anton W. Fetting
Attorney, Agent, or Firm—Fitzpatrick, Cella, Harper & Scinto

[57] ABSTRACT

An image processing method and apparatus using the method allows a target object to be displayed in a 3-D manner. A number of types of shape data with different resolutions for displaying the object are provided and the resolution of shape data used for the 3-D image display is decided in accordance with a display condition. The object is displayed in the form of a 3-D image by employing the shape data with the decided resolution.

30 Claims, 42 Drawing Sheets

OTHER PUBLICATIONS

"*Consideration on Automatic Acquisition and Reconstruction of an Object Sape*", Signal Processing of HDTV, Haruhiko Nishino, et al., Proceedings of the Second International Workshop on Signal Processing of HDTV, L'Aquila, Italy, 29 Feb.–2 Mar., 1988, pp. 295–302.

"*A Multi–Resolution Surface Model for Compact Representation of Range Images*", Marc Soucy, et al., 1992 IEEE International Conference on Robotics and Automation, May 12–14, 1992, Nice, France, IEEE Computer Society Press, Los Alamitos, California, pp. 1701–1706.

"*An On–Line Algorithm for Constrained Delaunay Triangulation*", L. De Floriani, et al., CVGIP: Graphical Models and Image Processing, vol. 54, No. 3, Jul. 1992, pp. 290–300.

GENERAL VIEW

CROSS-SECTIONAL VIEW

F I G. 13
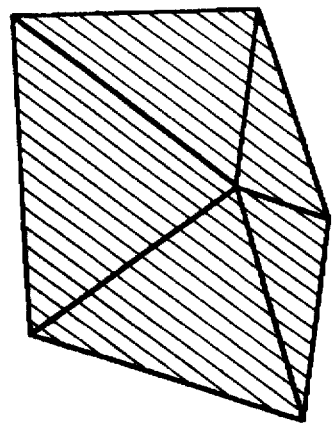
GENERATE TRIANGLES  TRIANGLE GROUP B
↑
REMOVE THE TRIANGLES
↑
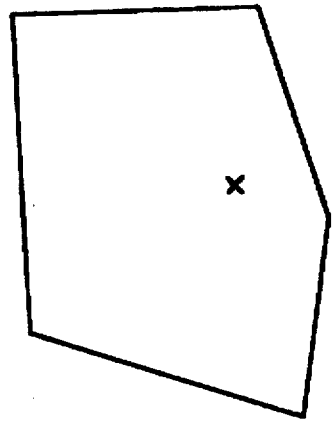
POLYGONAL AREA A

DESIGNATED TO BE DELETED

POLYGONAL AREA C

GENERATE A DELAUNAY TRIANGULATION NET USING THE VERTEX OF POLYGONAL AREA C

F I G. 22A

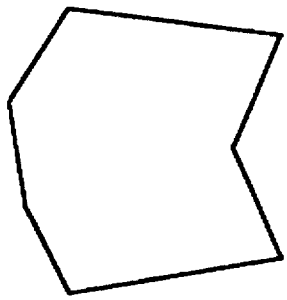

POLYGONAL AREA C

F I G. 22B

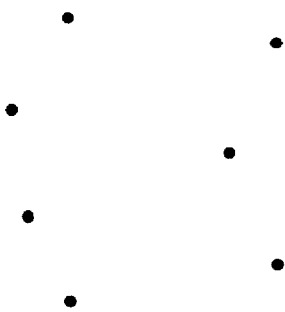

VERTEXES OF
THE POLYGON

F I G. 22C

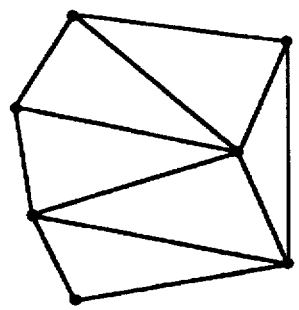

A DELAUNAY TRIANGULATION
NET USING THE PLYGONAL
VERTEXES IS FORMED.

F I G. 22D

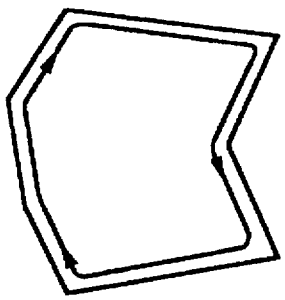

THE VERTEXES OF POLYGONAL AREA C
ARE FORMED INTO A CLOCKWISE CIRCULATION
LIST ALONG THE CONTOUR LINE.

F I G. 22E

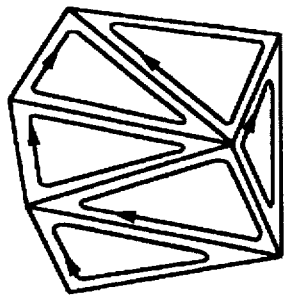

THE VERTEXES OF ALL TRIANGLES
ARE FORMED INTO
A CLOCKWISE CIRCULATION LIST.

F I G. 22F

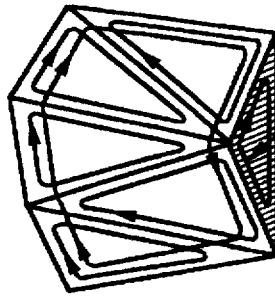

CIRCULATION LIST WITH
REVERSE DIRECTION
DETERMINED TO BE OUTSIDE
THE POLYGON

IF THERE IS A TRIANGLE WITH ITS CIRCULATION LIST DIRECTION OPPOSITE
FROM THE DIRECTION OF THE POLYGONAL CIRCULATION LIST,
THEN THE TRIANGLE IS DELETED.

DESIGNATED TWO POINTS

LINE SEGMENT E CONNECTING THE TWO POINTS

POLYGONAL AREA D

D1

D2

TRIANGLE OUTSIDE D1

TRIANGLE OUTSIDE D2

FULL CIRCUMFERENCE DISTANCE IMAGE

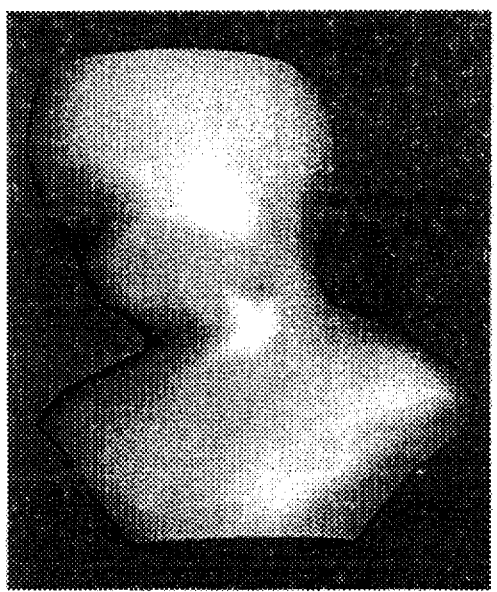 
PICTURE ELEMENT INTERVAL ( 32 + 16 )
FIG. 40A
PICTURE ELEMENT INTERVAL ( 32 + 16 + 8 )
FIG. 40B

PICTURE ELEMENT INTERVAL ( 32 + 16 + 8 + 4 )

PICTURE ELEMENT INTERVAL ( 32 + 16 + 8 + 4 + 2 )

RANGE IMAGE SHAPE MEASUREMENT USING HIERARCHICAL ORDERING OF MULTIRESOLUTION MESH DATA FROM DELAUNAY TRIANGULATION

BACKGROUND OF THE INVENTION

1. Field of the Invention

The present invention relates to a shape measuring apparatus designed to radiate a laser beam to an object to be measured, which is held in a capsule made especially of a light-transmitting material. The apparatus determine the shape of the object to be measured by making use of a beam reflected from the object. The shape measuring apparatus is ideal for measuring a volume or for CAD input.

Another aspect of the present invention relates to a method and apparatus for obtaining a radial range image of a target object.

Still another aspect of the present invention relates to an image processing method and apparatus and more particularly to a method and apparatus for generating a 3-D geometrical shape using triangular patches.

Yet another aspect of the present invention relates to a 3-D image displaying method and apparatus for displaying a 3-D image by employing a computer.

2. DESCRIPTION OF THE RELATED ART

There have been suggested a variety of so-called range finders, which are designed to radiate a beam to a target object (an object to be measured) to determine a distance to the object by taking advantage of the beam reflected from the object and by carrying out two-dimensional optical scan over the entire object, thus obtaining the distance information on the object.

In one method for measuring a distance to an object, employed in the aforesaid range finders, there is a method, wherein an optical pulse is emitted to the object and the distance is determined by measuring the time required for the optical pulse to reflect back from the object. In another method, a beam with its intensity modulated into a sine wave is launched into a target object and the distance to the target object is determined by detecting the phase difference between the beam reflected from the object and the original beam. The recent progress in semiconductor lasers and high-frequency circuit technology has enabled these methods to measure distances with a resolution of 1 mm or less and they are used for measuring the position of an object located at a short distance, identifying an object and the like.

There has also been proposed a shape measuring apparatus which is designed to emit a beam from a light source to an object via reflecting mirrors, and at this time, the reflecting mirrors are driven by driving means to two-dimensionally scan the object with the beam in order to detect the changes in the optical path length by utilizing the beam reflected from the object, thus measuring the shape of the object (references: OPTOELECTRONICS (1985, No. 12, pp. 59, by Seiji Inokuchi, et al.).

In the aforesaid shape measuring apparatus, an object to be measured is spatially held or rested. This makes it necessary to have the object undergo two-dimensional optical scanning from restricted directions, presenting a problem in that the rear, top or bottom surface, etc. of the object cannot be measured.

The image distance information obtained by using the shape measuring apparatus described above is referred to as a range image. More specifically, in the range image, the information on depth and position is stored in each picture element position thereof, while in a variable-density image or color image taken by a typical camera or the like, information on brightness is stored in each picture element position thereof. The range image is normally an image measured from a single direction as in the case of photographing with a camera. Hereinafter, this will be referred to as a projective range image. In contrast to the projective range image, a range image provided with the positional information on full circumference directions of a target object is called a radial range image, the positional information being obtained by performing measurement in full circumference directions of the target object.

Conventionally, in order to obtain a radial range image, a range finder for measuring a distance along a single vertical line is fixed around an object to be measured or rotated around it by a fixed rotary system, thereby measuring each line. This conventional method, however, is disadvantageous in that a significantly larger measuring apparatus structure than an object to be measured is required, and the apparatus is hard to move toward the object, leading to poor mobility and high cost.

There are also the following conventional methods available to obtain range images or generate approximate shape data.

(1) A stereoscopic image of a 3-D space such as an indoor scene or a 3-D object can be obtained by photographing them by two cameras, which are installed in parallel with an appropriate distance provided between them, or by moving a single camera in parallel to photograph them twice so that a left image and a right image constituting a stereo image may be obtained. From this stereo image, a 3-D position can be determined according to the principle of triangulation by designating identical points in an actual 3-D space in the right and left images automatically, semi-automatically or manually. By repeating this operation many times, the positions of points in an actual 3-D space can be determined in a 3-D manner.

(2) There is a method available, whereby a range image of a 3-D space such as an indoor scene similar to the one above or a 3-D object can be entered by means of a range imaging apparatus. It is also possible to select an image point from this range image according to some characteristic amount.

(3) It is also possible to enter in order the positions of 3-D points on the surface of a 3-D object by means of a contact or non-contact type 3-D digitizer.

(4) When there are many groups of points, there are methods available, whereby a Delaunay triangulation net is generated using the groups of points as generating points to determine triangles having the points as the vertexes thereof. In one of the methods, points are added one by one to update the Delaunay triangulation net. This method will be described below.

In a Delaunay triangulation net shown in FIG. 12A, when a point marked with x in FIG. 12B is designated, a triangle wherein this point lies in a circumcircle is looked for. When there are three vertexes pj=(xj, yj), pk=(xk, yk), and pl=(xl, yl) of an element triangle in the Delaunay triangulation net, and a determinant shown below is employed for determining whether or not a point p(=(x, y)) to be added is in the circumcircle;

$$H(p_j, p_k, p_l, p) = \begin{vmatrix} 1 & x_j & y_j & x_j^2 + y_j^2 \\ 1 & x_k & y_k & x_k^2 + y_k^2 \\ 1 & x_l & y_l & x_l^2 + y_l^2 \\ 1 & x & y & x^2 + y^2 \end{vmatrix}$$

if, p is a point on a circle, which passes pj, pk, and pl if $H(p_j, p_k, p_l, p) = 0$, or p is a point in a circle, which passes pj, pk, and pl if $H(p_j, p_k, p_l, p) < 0$, or p is a point outside a circle, which passes pj, pk, and pl if $H(p_j, p_k, p_l, p) > 0$.

This makes it possible to determine whether the point to be added lies in a circumcircle of the triangle. After making this determination on all triangles, all the triangles, which include the point to be added in the circumcircles, are combined into one area (FIG. 12C). The triangles in this area are deleted, then using the designated point as a vertex, new triangles are generated using two adjoining vertexes of the contour of this area (FIG. 13), and the new triangles are inserted in the area (FIG. 12D).

The prior art (1), (2) or (3) discussed above makes it possible to acquire point positions in a 3-D space such as in an indoor scene or a 3-D object. To restore, however, the 3-D shape of a 3-D space such as in an indoor scene or of a 3-D object, the point positions alone are not sufficient; it is necessary to determine a surface constituted by the points. This was the problem with the prior arts. It was considered possible to generate a Delaunay triangulation net to generate a 3-D geometrical shape based on triangular patches by combining the prior art (4) with the prior arts described above, however, there was no technology available to combine them.

Even if it were possible to combine the prior art (1), (2) or (3) with the prior art (4) and to generate the Delaunay triangulation net, thereby generating the 3-D geometrical shape based on the triangular patches, then the prior art (4) would make it possible to update the triangular patches by updating the Delaunay triangulation net by adding the generating points one after another. If, however, a point is not designated in a correct position, then it is necessary to delete the generating point and update the triangular patches. This was not possible with the prior arts.

There was another problem in addition to the problem described above. When a triangular patch is generated from points by the Delaunay triangulation net, the edges of the triangle are automatically decided according to the principle of Delaunay (the circumcircle principle and the minimal angle maximum principle). There is a need, however, for keeping a line, which connects two given points, as a edge of the triangulation net to be generated, and this need cannot be satisfied.

The following describes a prior art, whereby range image data are obtained, then a resultant image is reproduced and displayed.

Technologies for displaying 3-D images by computer graphics have been developed. The techniques in such image displaying technologies include:

(1) a technique, whereby a shape of an object is described using square lattices fixed equidistantly on a range image to provide the 3-D display;

(2) a technique, whereby adaptive polygon patches, in which the size of polygons are changed in accordance with the curvature of, local shape of a curved surface of an object to be displayed, are generated from range image data to describe the shape of the object by the polygon data, thereby providing the 3-D display;

(3) a technique, whereby equidistant square lattices are generated from the shape data of curved surfaces described by a shape modeler to describe the shape of an object, thereby providing the 3-D display; and (4) a technique, whereby an object is described by an appropriate polygon by a shape modeler to directly use it for the 3-D display.

In the techniques of (1) and (3), however, the shape of the object is described by polygons which have same size; therefore, smaller polygons must be used to represent a complicated surface shape. If, however, more polygons are used, then more than necessary polygons would be used for a uniform surface shape such as a large plane. This results in significant waste in memories used and also it causes other problems, including slow displaying speed.

Likewise, in the techniques of (2) and (4), the size of the polygon is changed in accordance with the surface shape of an object to be displayed; therefore, these techniques are free from the problem with the aforesaid techniques, which use polygons which have same size to represent a shape. Nevertheless, all the four techniques discussed above unavoidably represent details according to shape data even when an observer does not need any detailed shape of the object as in a case, where the observer moves or rotates the object to be displayed. As a result, more load than necessary is applied to a display unit, preventing smooth rotation or movement required by the observer.

In addition, even when the observer does not rotate or move the object, the above techniques attempt to display the details of the shape of the object regardless of the resolution of the display unit or the resolution of the observer's vision even when the object occupies only a small portion of a display screen, i.e., even when the angle of view is small, because of a viewpoint set by the observer. This applies more load than necessary to the display unit.

SUMMARY OF THE INVENTION

Accordingly, it is an object of the present invention to provide a method and apparatus for image processing, which solve the problems described above. Specifically, an object of the present invention is to provide a shape measuring apparatus, which is capable of accurately measuring the shape of a target object in all directions by housing the target object in a capsule of an appropriate shape to direct a beam from a light source to the target object and measure the shape of the target object by detecting the beam reflected back from the target object.

It is an object of another aspect of the present invention to provide an inexpensive method and apparatus for measuring a radial range image.

It is an object of still another aspect of the present invention to provide an image processing method and its apparatus, which permit the generation of a 3-D image, taking the point positions in a 3-D space as a group of generating points of a Delaunay triangulation net.

It is an object of a further aspect of the present invention to provide an image processing method and its apparatus, which allow the position of a generating point to be changed.

It is an object of still further aspect of the present invention to provide an image processing method and its apparatus, which allow a line segment connecting two points to be intentionally kept as an edge of a triangulation net.

It is an object of another aspect of the present invention to provide a 3-D image displaying method and its apparatus, which allow a target object to be displayed in a 3-D manner by changing the resolution in accordance with a display condition.

To solve the problems described above, according to the present invention, there is provided a radial range imaging apparatus comprising a rotating means, which is capable of rotating with an object to be measured mounted thereon, a driving means for rotating the rotating means at a predetermined speed, a light radiating means for directing light to the object to be measured, a light detecting means for detecting, reflected light of the light emitted from the light radiating means, the reflected light coming from the object to be measured, and a deducing means for deducing the shape of the object, which is to be measured, in accordance with a light detected by the detecting means.

According to another aspect of the present invention, there is provided a radial range image processing method comprising a calibration depth data generating step for generating depth data for calibration by disposing an object for calibration at a plurality of different rotational angles around a rotation axis and measuring the depth of the object for calibration for each of the rotational angles, a rotation axis calculating step for calculating positional data of the rotation axis, around which the object for calibration is rotated, from the depth data for calibration, a rotating step for rotating the object to be measured around the rotation axis by a predetermined rotational angle, a depth data generating step for generating depth data by measuring the depth of the object to be measured for each of the predetermined rotational angle, and an actual coordinate calculating step for calculating coordinates of the object, which is to be measured, in an actual space by employing the depth data and the positional data of the rotation axis.

According to still another aspect of the present invention, there is provided a radial range image processing apparatus for obtaining a radial range image, comprising a calibration depth data generating means for generating depth data for calibration by disposing an object for calibration at a plurality of different rotational angles around the rotation axis and measuring the depth of the object for calibration for each of the rotational angles, a rotation axis calculating means for calculating positional data of the rotation axis, around which the object for calibration is rotated, from the depth data for calibration, a rotating means for rotating an object to be measured around the rotation axis by a predetermined rotational angle, a depth data generating means for generating depth data by measuring the depth of the object to be measured for each of the predetermined rotational angles, and an actual coordinate calculating means for calculating coordinates of the object, which is to be measured, in an actual space by employing the depth data and the positional data of the rotation axis.

According to still another aspect of the present invention, there is provided an image processing method comprising an input step for interactively selecting and entering discrete points on an object in a 3-D space, and a generating step for generating a model having a 3-D geometrical shape by employing triangular patches making use of the Delaunay triangulation net in accordance with points entered in the input step.

According to yet another aspect of the present invention, there is provided an image processing apparatus comprising an input means for interactively selecting and entering discrete points on an object in a 3-D space and a generating means for generating a model having a 3-D geometrical shape by employing triangular patches making use of the Delaunay triangulation net in accordance with the points entered by the input means.

According to a further aspect of the present invention, there is provided a 3-D image processing method comprising a storing step for storing a plurality of types of shape data with different resolutions for displaying an object, which is to be displayed, in the form of a 3-D image, a deciding step for deciding the resolution of shape data used for the 3-D image display in accordance with a display condition when displaying the object, which is to be displayed, in the form of the 3-D image, and a displaying step for providing 3-D image display by employing the shape data with the decided resolution.

According to a still further aspect of the present invention, there is provided a 3-D image processing method comprising an input step for entering 3-D geometrical shape information related to a 3-D shape of an object to be displayed, a creating step for creating a plurality of shape data with different resolutions in accordance with the 3-D geometrical shape information, which has been entered in the input step, a storing step for storing a plurality of shape data, which have been created in the creating step, and a displaying step for providing 3-D display of the object, which is to be displayed, by employing shape data selected from the plurality of shape data stored in the storing step to change the resolution in accordance with the display condition of the object to be displayed.

According to another aspect of the present invention, there is provided a 3-D image processing apparatus comprising a storing means for storing a plurality of types of shape data with different resolutions for displaying an object, which is to be displayed, in the form of a 3-D image, a deciding means for deciding the resolution of shape data used for the 3-D image display in accordance with a display condition when displaying the object, which is to be displayed, in the form of the 3-D image, and a displaying means for providing 3-D image display by employing the shape data with the decided resolution.

According to still another aspect of the present invention, there is provided a 3-D image processing apparatus comprising an input means for entering. 3-D geometrical shape information related to a 3-D shape of an object to be displayed, a creating means for creating a plurality of shape data with different resolutions in accordance with the 3-D geometrical shape information, which has been entered by the input means, a storing means for storing a plurality of shape data, which have been created by the creating means, and a displaying means for providing 3-D display of the object, which is to be displayed, by applying shape data selected from the plurality of shape data stored by the storing means to change the resolution in accordance with the display condition of the object to be displayed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the present invention and, together with the description, serve to explain the principles of the invention.

FIG. 13 is a schematic diagram illustrating a processing carried out when a generating point is added to the Delaunay triangulation net;

FIGS. 22A–22F illustrate an example of a triangle generating process for generating a triangle outside polygonal area C;

FIGS. 40A and 40B show hierarchical adaptive polygon data shown in FIG. 38, the data being shaded and displayed in a 3-D manner;

DESCRIPTION OF THE PREFERRED EMBODIMENTS

Preferred embodiments of the present invention will be described in detail in accordance with the accompanying drawings.

(First Embodiment)

A shape measuring unit constituting a part of an image processing apparatus of an embodiment according to the present invention is designed so that, when it holds an object to be measured (hereinafter referred to as "target object") in a capsule made of a light-transmitting material by means of supporting members and radiates a beam from a light source provided outside the capsule to the target object via the capsule, it relatively moves the capsule with respect to an incident direction of the beam by a driving means provided on the capsule to change the beam radiating positions on the target object and it detects the beam reflected from the target object by a detecting means, thereby measuring the shape of the target object by utilizing a signal received from the detecting means.

Figure 1:
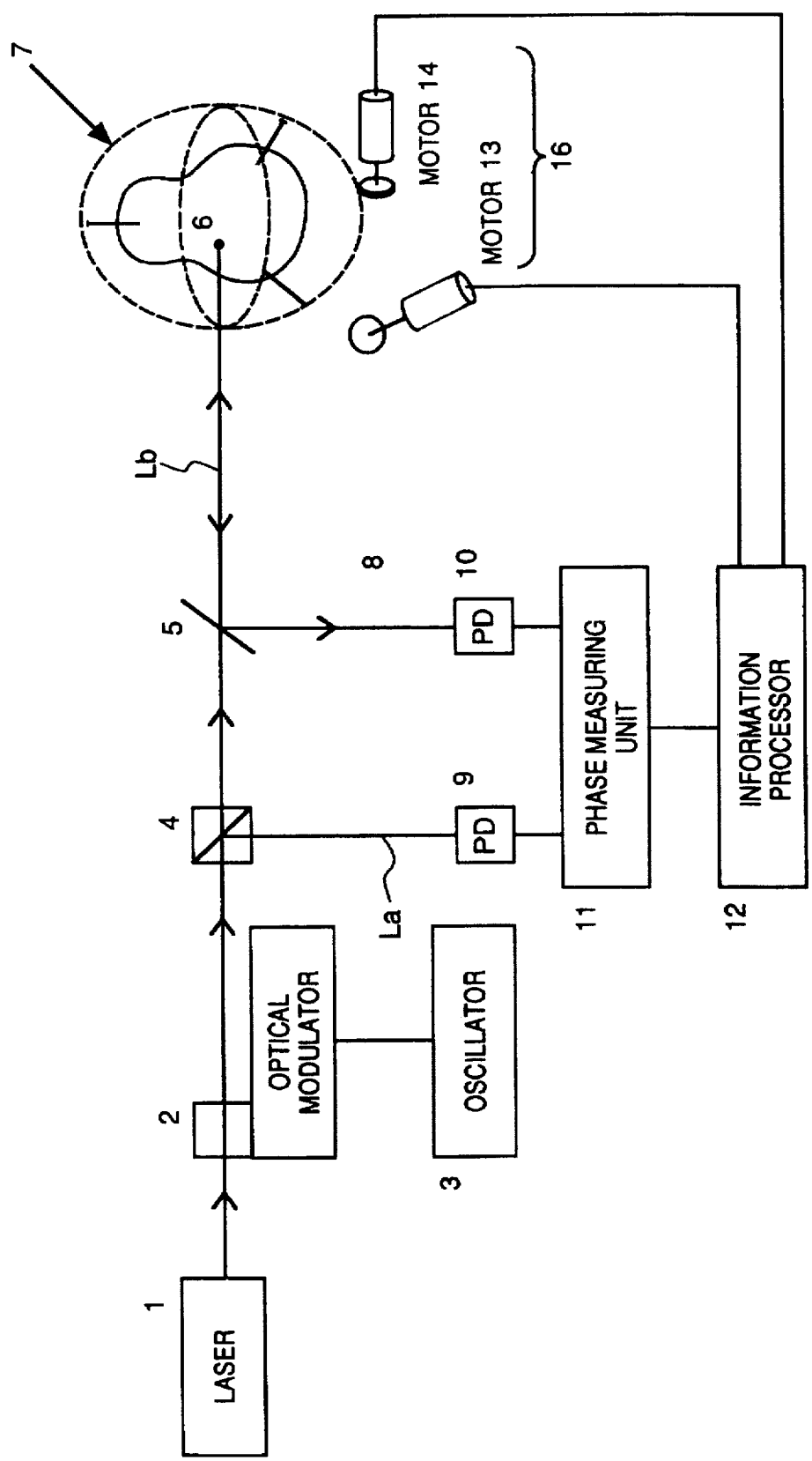
FIG. 1 is a schematic configuration diagram of a shape measuring apparatus of an embodiment according to the present invention.
Figure 2:
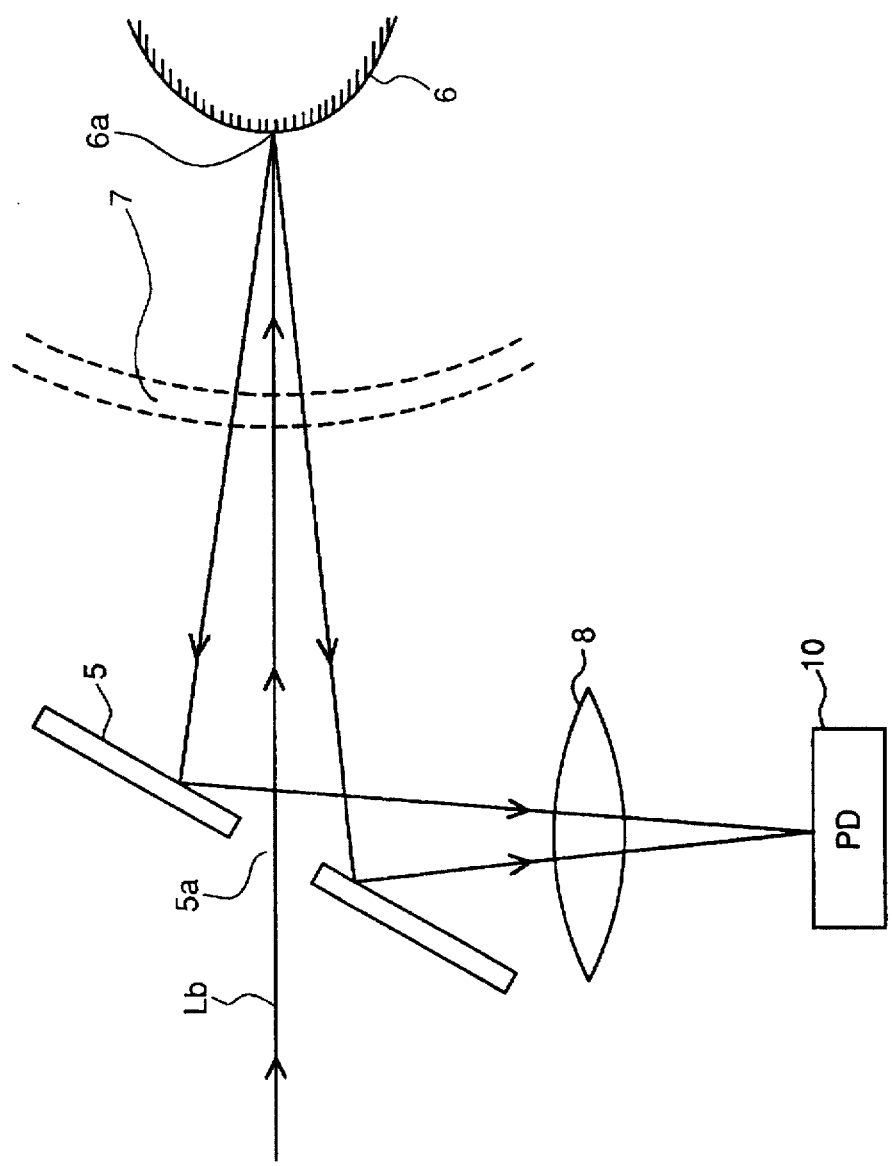
FIG. 2 is an enlarged explanatory view of a part from FIG. 1.

FIG. 1 is the schematic diagram showing the configuration of the first embodiment of the present invention, and FIG. 2 is the enlarged explanatory drawing of a part of FIG. 1. In the drawings, a laser oscillator 1 serves as a light source and it emits laser beams. An optical modulator 2 modulates the intensity of a laser beam received from the laser oscillator 1. An oscillator 3 drives the optical modulator 2. A beam splitter 4 divides the modulated laser beam into reference light La and measurement light Lb. A photodiode 9 detects the intensity of the reference light La provided by the beam splitter 4. A reflecting member 5 has an aperture 5A (see FIG. 2) at the center thereof. The measurement light Lb from the beam splitter 4 is launched into a target object 6 through the aperture 5a of the reflecting member 5. The target object 6 is held in a spherical capsule 7 made of a light-transmitting material, e.g., glass. Motors 13 and 14 constitute an element of a driving means 16, which drives the capsule 7. A condenser lens 8 converges the measurement light Lb, which reflects off the target object 6 and then reflects from the reflecting member 5, and leads it into a photodiode 10. The photodiode 10 detects the intensity of the measurement light Lb based on the beam reflected from the target object 6 as it will be discussed later. A phase measuring unit 11 determines a phase difference between the reference light La and the measurement light Lb detected respectively by the photodiodes 9 and 10. An information processor 12 controls the driving means 16, changes the incident position of the measurement light Lb launched into the target object 6, and determines, by computation, a shape of the target object 6 from a difference in light path according to a signal received from the phase measuring unit 11 for each incident position of the measurement light Lb.

In this embodiment, with the configuration described above, the intensity of the laser beam from the laser oscillator 1 is modulated by means of the optical modulator 2 and the laser beam is divided through the beam splitter 4 into two beams; one for the reference light La and the other for the measurement light Lb. The reference light Lb from the beam splitter 4 passes through the aperture 5a of the reflecting member 5 and irradiates a point 6a of the target object 6 via the capsule 7 as shown in FIG. 2. The beam, which has been reflected and scattered from the target object 6, passes through the capsule 7 again before it enters the reflecting member 5. The beam reflected from the reflecting member 5 is led into the photodiode 10 via the condenser lens 8. The reference light Lb provided by the beam splitter 4 is launched into the photodiode 9.

The phase measuring unit 11 measures the phase difference between the reference light La and the measurement light Lb launched respectively into the photodiodes 9, 10 and applies the measurement result to the information processor 12. The information processor 12 determines the difference in optical path between the reference light La and the measurement light Lb from the information on the phase difference and a modulated frequency supplied by the optical modulator 2. The driving means 16 moves the capsule 7 in a predetermined direction, which will be discussed later, so that the beam is launched into the target object from all directions. The difference in optical path is determined on every direction of the target object and the shape of the target object is determined in accordance with a publicly known method.

Figure 3A:
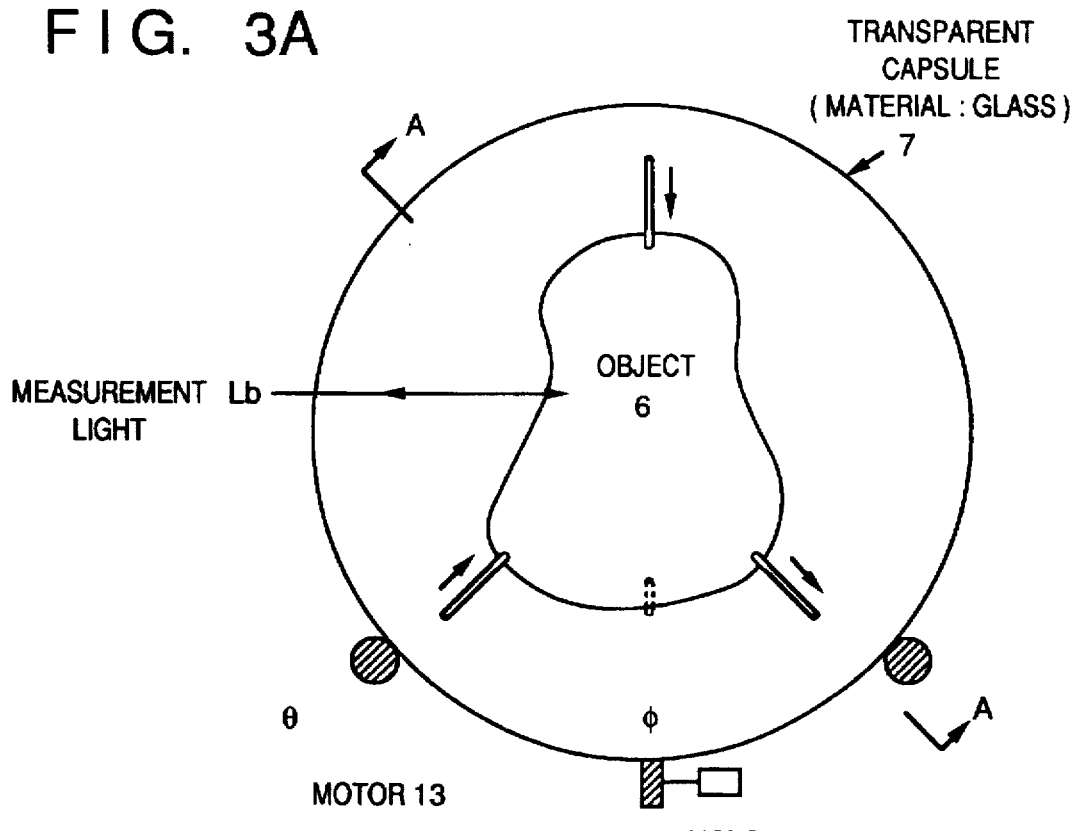
FIG. 3A is an explanatory view of a major section of a supporting mechanism for an object to be measured.
Figure 3B:
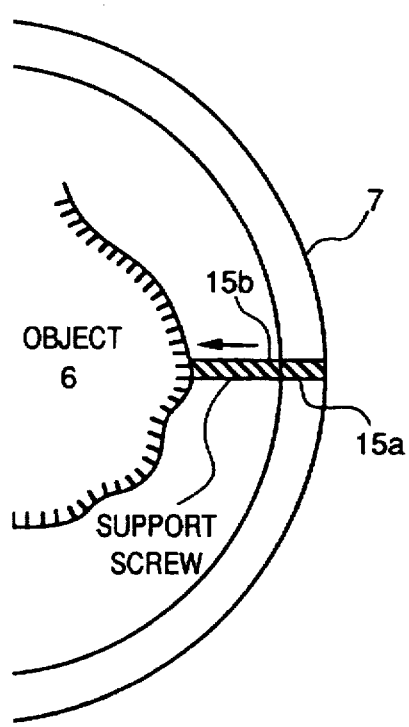
FIG. 3B is an explanatory view of a part taken on line A—A in FIG. 3A.

FIG. 3A is the explanatory view of the major section of a supporting mechanism of the target object 6 in this embodiment and FIG. 3B is the explanatory view of a part taken on line A—A. In these drawings, numeral 15a denotes a threaded hole provided in the capsule 7 and numeral 15b denotes a screw, i.e., the supporting member, which is screwed into the threaded hole. In this embodiment, the target object 6 is supported at four points with the supporting members 15b. The target object 6 housed in the capsule 7 is fixed approximately at the center of the capsule 7 by adjusting the lengths of the supporting members 15b projecting into the capsule 7. After fixing the object, the portions of the supporting members extending outside the capsule 7 are cut off.

Figure 4A:
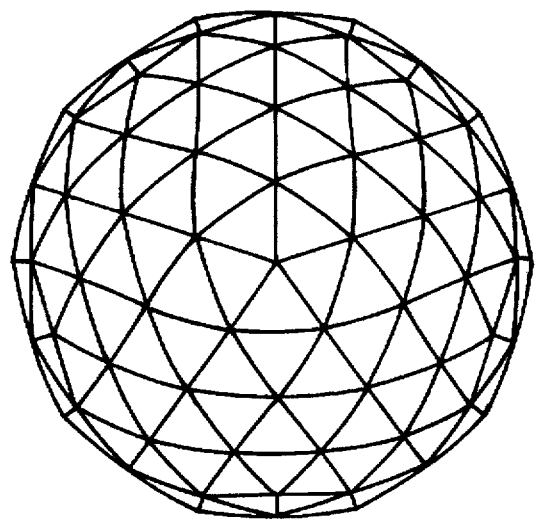
FIG. 4A is an explanatory view of an appearance of a geodetic dome.
Figure 4B:
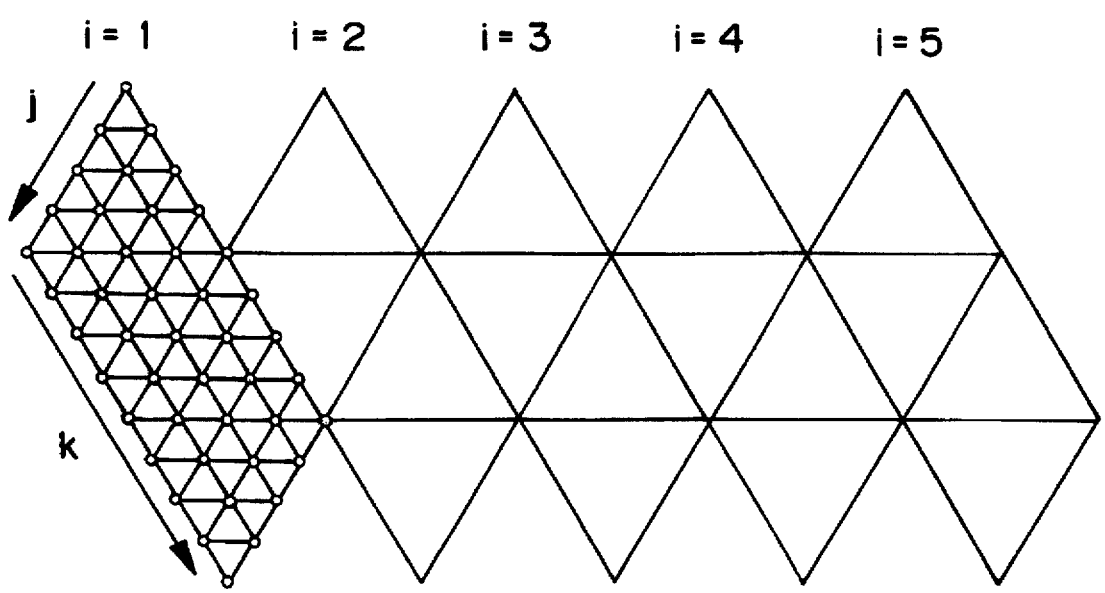
FIG. 4B is an explanatory view of a development of the geodetic dome shown in FIG. 4A.

FIG. 4A and FIG. 4B are the explanatory view showing the data structure of the geodetic dome for determining the rotational direction and rotational angle of the capsule 7 driven by the driving means of FIG. 1. FIG. 4A shows the appearance of the geodetic dome and FIG. 4B shows the development thereof.

To measure the target object from all directions with a uniform density, the information processor 12 calculates the latitude or longitude of each vertex of the geodetic dome shown in FIG. 4 and controls the drive of the motors 13, 14 so that the measurement light Lb is radiated to the corresponding points on the capsule 7.

At this time, the relationship between the position of a vertex (i,j,k) and the latitude/longitude (θ/φ) is expressed as if$(O \leq \theta < \tau)$then $$i = \left[ \frac{\phi}{k} \right] \mod(5)$$

$$k = (\phi - (i-1) \times k) \times \frac{\left( \theta \times \frac{Q}{\tau} \right)}{k} + 1$$

$$j = \theta \times \frac{Q}{\tau} - k + 1$$

elseif$(\tau \leq \theta < \pi - \tau)$then $$i = \left[ \frac{\phi - \left( \theta - \tau \times \frac{x}{2\pi - 4\tau} \right)}{k} \mod(5) \right]$$

$$j = Q \times \left[ \frac{(\theta + \pi - 3\tau)}{\pi 2\tau} \left( \frac{2(\phi - (i-1) \times k)}{k} - 1 \right) \right]$$

$$k = \left[ j + 1 + Q \times \left( \frac{2(\phi - (i-1) \times k)}{k} \right) - 1 \right]$$

else $$i = \left[ \frac{\phi - \frac{k}{2}}{k} \right] \mod(5)$$

$$j = Q - \left[ \left( \phi - (i-1) \times k - \frac{k}{2} \right) \times \frac{(\pi - \theta) \times \frac{Q}{\tau}}{k} \right]$$

$$k = \left[ (\theta - \pi + \tau) \times \frac{Q}{\tau} \right] - j + 2Q + 1$$

endif where k=2π/5, t=atan (2), $0 \leq \theta \leq \pi$, $0 \leq \phi \leq 2\pi$. (C. H. Chen and A. C. Kak, "A robot vision system for recognizing 3-D object in low-order polynomial time. "IEEE Transaction on Systems, Man and Cybernetics, Vol.19 No.6, pp. 1535-1563, 1989).

The shape of object 6 at the contacted portion, where the supporting member 15b is in contact with the target object 6, is interpolated from a neighborhood value.

This embodiment is configured so that the target object 6 is housed in the spherical capsule 7, which is rotated according to the rotational direction and the rotational angle determined from the geodetic dome shown in FIG. 4 with respect to the incident direction of the beam from the light source, thereby optically scanning the target object, however, the configuration is not limited to this; it may alternatively be configured as follows:

(1) The target object is housed in a transparent capsule shaped in a rectangular parallelepiped, and the capsule is rotated so that the beam from the light source always strikes each surface of the rectangular parallelepiped at an angle of 90 degrees, thereby measuring the shape thereof by optically scanning the target object in a 2-D manner. (2) The target object is housed in a transparent capsule shaped in a rectangular parallelepiped, and the capsule is rotated while maintaining the 90 degree angle between the beam of the incident light source and the surface of the rectangular parallelepiped and repeatedly exposed to a 2-D pattern light or slit light, thereby measuring the object's shape.

(3) The target object is housed in a spherical, transparent capsule, which is rotated and exposed to the 2-D pattern light or slit light a few times to measure the shape thereof.

In this embodiment, capsule 7 needs not be necessarily sealed hermetically as long as it encloses the target object and it can be rotated at a desired angle by the driving means. In addition, the capsule 7 needs not necessarily transmit the beam uniformly from all directions.

Thus, the shape measuring apparatus according to the present invention is capable of measuring the shape in every direction with high accuracy by configuring the shape measuring apparatus as described above when optically scanning the target object to measure the shape thereof.

(Second Embodiment)

An outline of the method and the configuration of an apparatus for obtaining the radial range image according to the second embodiment will be given first, then detailed explanation will follow. The method for obtaining the radial range image according to the second embodiment includes a step of generating depth data for calibration, wherein an object for calibration is disposed at a plurality of different rotational angles around the rotation axis and the depth of the object for calibration is measured for each rotational angle in order to generate the depth data for calibration, a step of calculating the rotation axis, wherein the positional data on the rotation axis, which rotates the object for calibration, are calculated from the depth data for calibration, a rotation step, wherein the target object is rotated around the rotation axis by a predetermined rotational angle, a step of generating depth data, wherein the depth data are generated by measuring the depth of the target object for each predetermined rotational angle, and a step of calculating actual coordinates, wherein the coordinates of the target object in actual space are measured by applying the depth data and the positional data of the rotation axis.

The apparatus for obtaining the radial range image includes a depth data generating means, whereby an object for calibration is disposed at a plurality of different rotational angles around the rotation axis and the depth of the object for calibration is measured for each rotational angle in order to generate the depth data for calibration, a means for calculating the rotation axis, whereby the positional data on the rotation axis, which rotates the object for calibration, are calculated from the depth data for calibration, a rotating means, whereby the target object is rotated around the rotation axis by a predetermined rotational angle, a depth data generating means, whereby the depth data are generated by measuring the depth of the target object for each predetermined rotational angle, and a means for calculating actual coordinates, whereby the coordinates of the target object in actual space are measured by applying the depth data and the positional data on the rotation axis.

In the configuration described above, the method for obtaining the radial range image is designed to dispose the object for calibration at a plurality of different rotational angles, measure the depth of the object for calibration for each rotational angle to generate the depth data, calculate the positional data on the rotation axis, around which the object for calibration is rotated, from the depth data, rotate the target object by the predetermined rotational angle, measure the depth for each line to the target object for each predetermined rotational angle to generate depth data, and calculate the coordinates of the depth data in actual space by applying the positional data on the rotation axis.

Likewise, in the apparatus as another embodiment of the present invention for obtaining the radial range image, a means for generating depth data for calibration disposes the object for calibration at a plurality of different rotational angles, measures the depth of the object for calibration for each rotational angle, and generates depth data, a means for calculating the rotation axis calculates the positional data on the rotation axis, around which rotates the object for calibration is rotated, from the depth data, a rotating means rotates the target object by the predetermined rotational angle, a depth data generating means measures the depth for one line of the target object for each predetermined rotational angle to generate the depth data, and the means for calculating actual coordinates calculates the coordinates of the depth data in actual space by applying the positional data of the rotation axis.

The embodiments according to the present invention will now be explained in detail with reference to the attached drawings in order.

Figure 5:
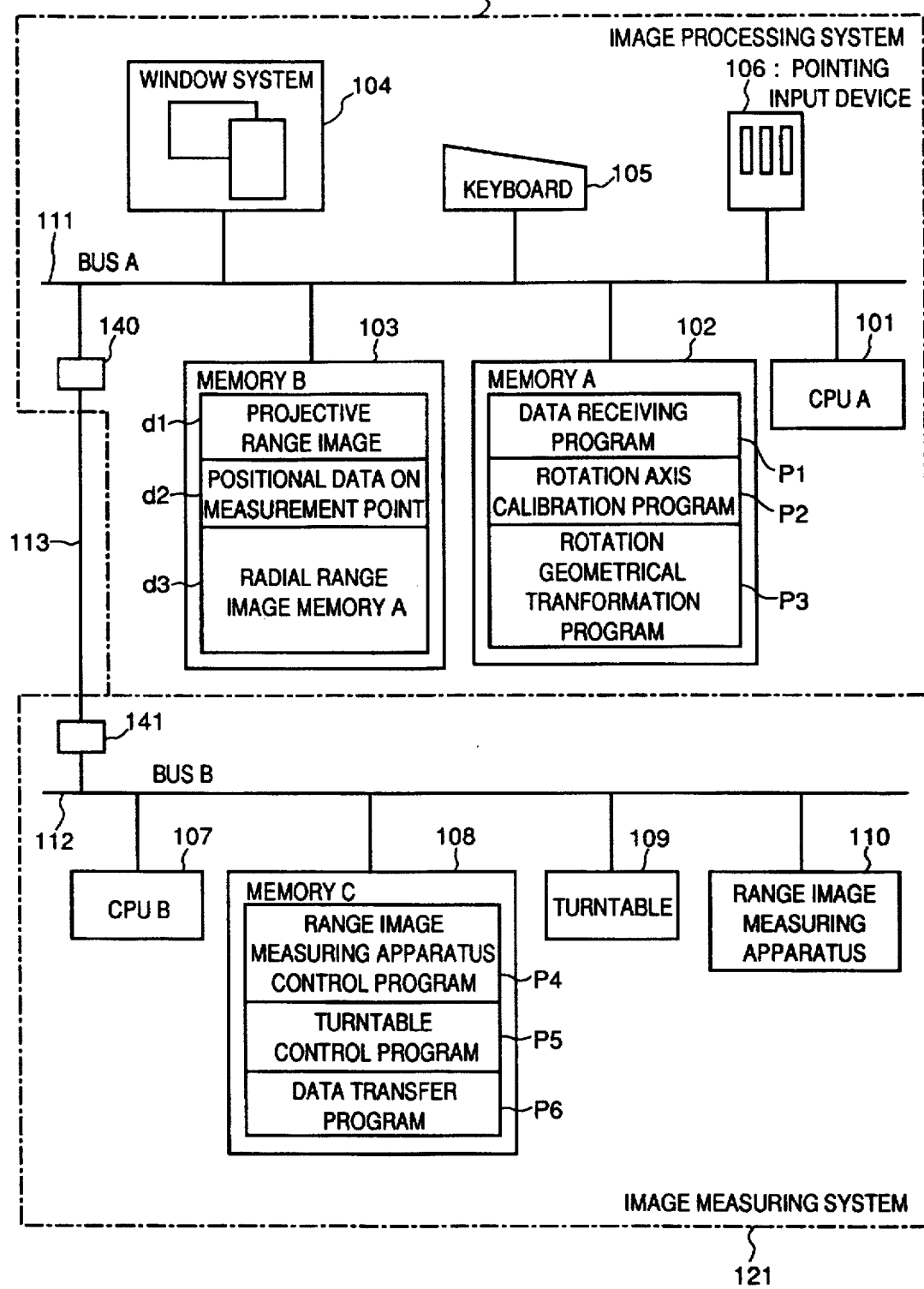
FIG. 5 is a block diagram showing a basic configuration of a radial range image measuring apparatus according to a second embodiment.

FIG. 5 shows the basic configuration of the apparatus for obtaining the radial range image. In FIG. 5, the apparatus for obtaining the radial range image is roughly divided into image processing system 120 and image measuring system 121. The image measuring system 121 obtains projective range image data and radial range image data from a target object and processes the data before sending them to the image processing system 120. Image processing system 120 employs the received projective range image data, the received radial range image data or the like to calculate the position of a turntable 109, performing arithmetic operation for determining the actual coordinates in actual space, which correspond to the radial range image data, modulating the luminance of the range images to display them on a window system 104, or performing other image processing.

The following describes the configuration of image processing system 120. CPU A 101 executes data processing, arithmetic operation, and data receiving by processing programs stored beforehand in memory A 102. Memory B 103 saves data to be processed. The window system 104 is the display system, which displays processes and results of processing. Keyboard 105 is used to enter user's instructions or data. Pointing device 106 is used to enter user's instructions through window system 104. Bus 111 is data transmission lines for data transferred to and from the devices mentioned above. Memory B 103 stores projective range image data d1 and radial range image d3 obtained by range image measuring apparatus 110, and measurement point position data d2, which is obtained by executing the rotation axis calibration program and the rotational geometrical transformation program stored beforehand in the memory A 102. Data receiving program p1 stored beforehand in memory A 102 controls network controller A 140 to receive and store the data obtained by the range image measuring apparatus 110 in memory B 103 via bus B 112, network controller B 141, and network lines 113.

The configuration of image measuring system 121 will now be described. CPU B 107 controls range image measuring apparatus 110 and turntable 109. Range image measuring apparatus control program p4 for controlling range image measuring apparatus 110 to obtain range image data, turntable control program p5 for controlling turntable 109, on which a target object is rested, and data transfer program p6 for transferring measurement data to memory B 103 are stored beforehand in a memory C 108. These programs are read by the CPU B 107 to execute various types of processing. The rotational angle of turntable 109, whereon the target object is rested, is controlled by the CPU B 107. Projective range image measuring apparatus 110 obtains depth information by projecting light to the target object and receiving the reflected light, which is controlled by the CPU B 107. Bus B 112 is used for data transmission among the devices. Network lines 113 is an interface connecting bus A 111 and the bus B 112, the data transmission through the interface being controlled by network controller A 113 and network controller B 141.

Figure 6:
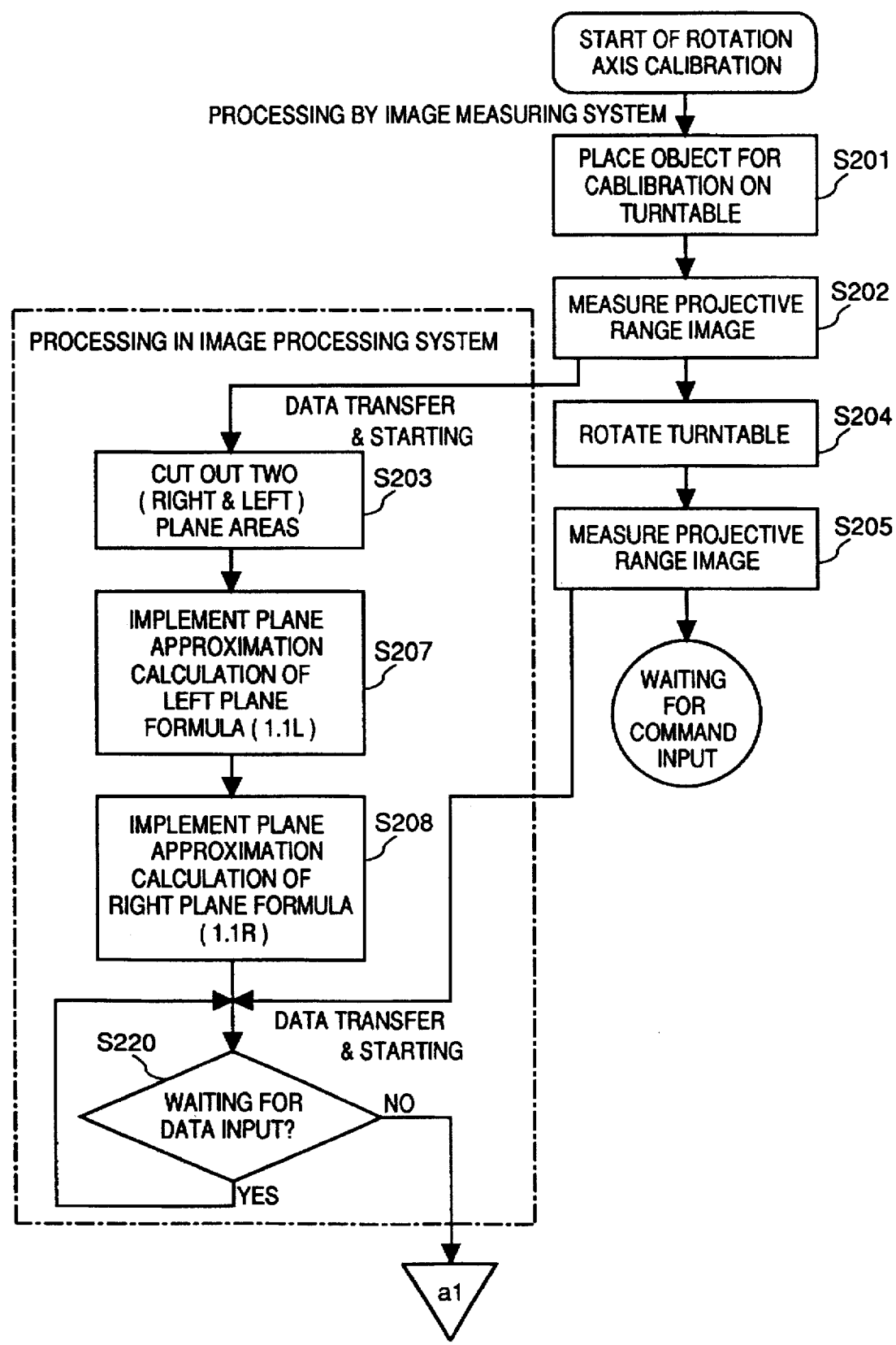
FIG. 6 illustrates the flow of a process for calibrating a rotation axis of a turntable; of which process is one of processes of a method for obtaining a radial range image according to the second embodiment.
Figure 7:
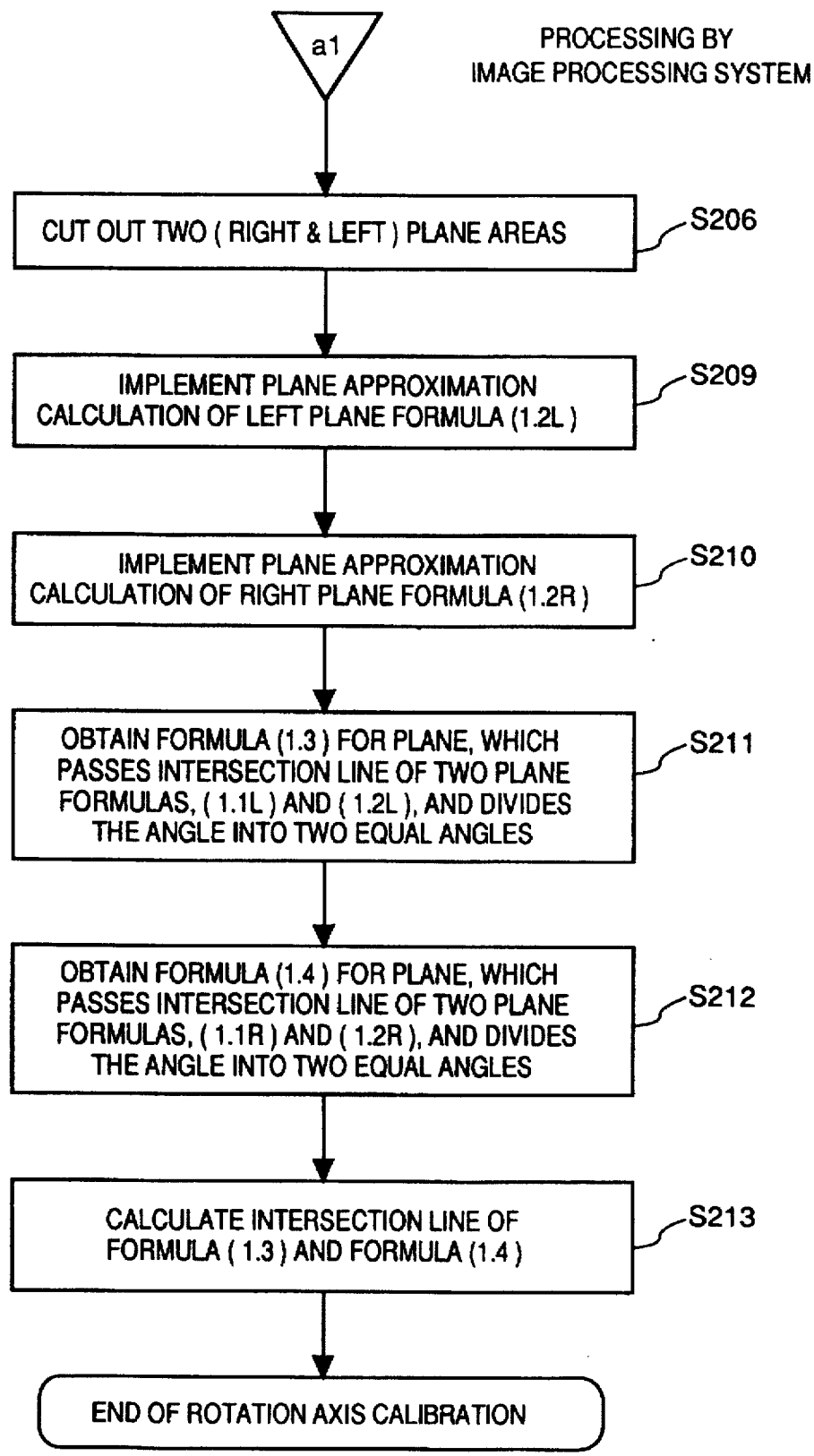
FIG. 7 illustrates a flow of a process for calibrating the rotation axis of the turntable, which is one of the processes of the method for obtaining a radial range image according to the second embodiment.
Figure 8:
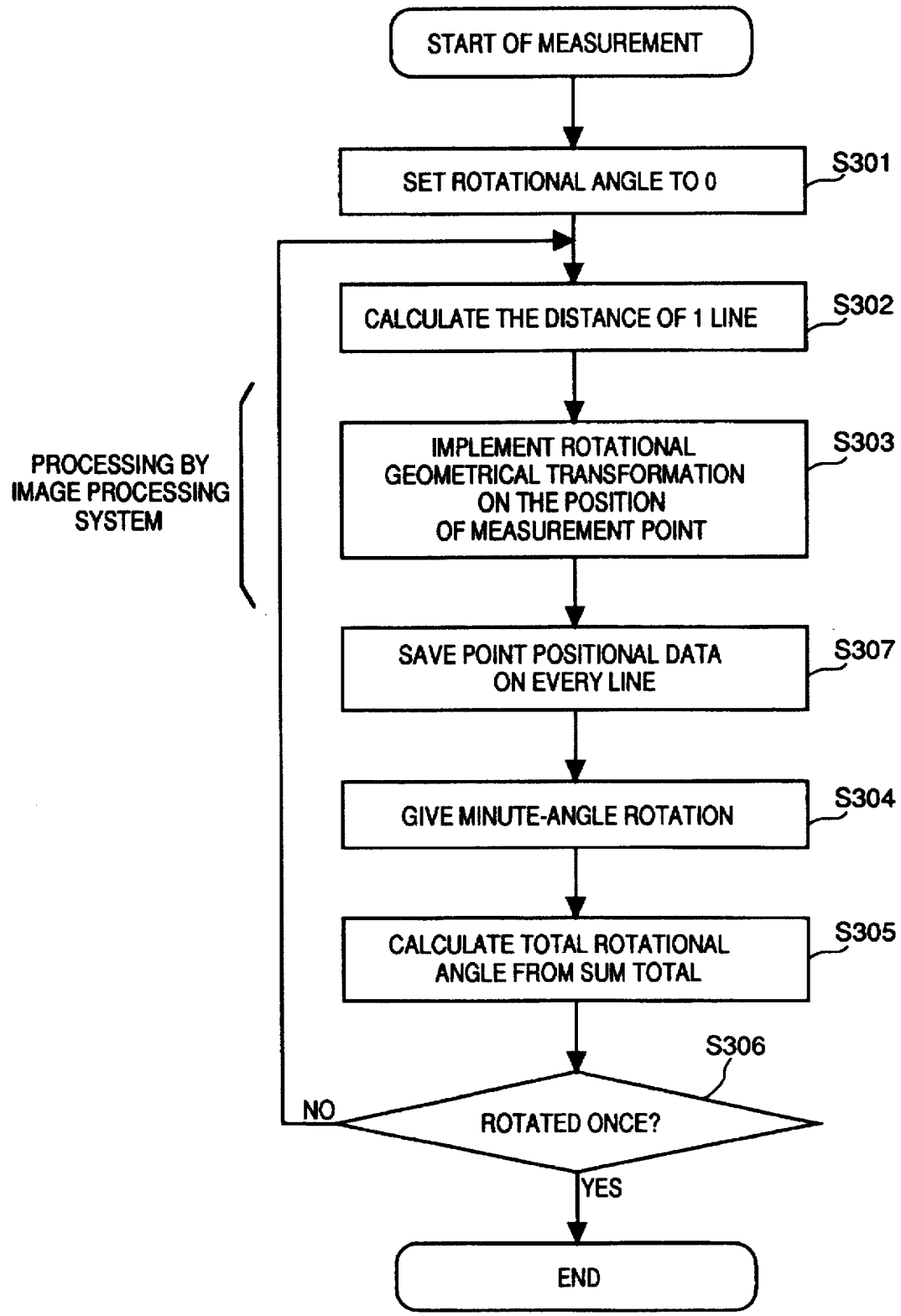
FIG. 8 illustrates the flow of a process for determining actual coordinates of an object; of which process is one of the processes of the method for obtaining a radial range image of the second embodiment.

FIG. 6, FIG. 7, and FIG. 8 illustrate the processing flows for obtaining a radial range image. More specifically, FIG. 6 and FIG. 7 shows the processing flows of the method for determining the rotation axis of turntable 109, while FIG. 8 shows the processing flow for the measurement of the object by applying the determined rotation axis to the acquisition of the radial range image.

First, the processing for determining the rotation axis will be explained in detail with reference to the processing flowcharts given in FIG. 6 and FIG. 7. Steps S201, S202, S204, and S205 are implemented in image measuring system 121, while other steps are implemented in image processing system 120.

In step S201, an object for calibration, which has at least two planes, such as a quadrangular prism and triangular prism, is placed on turntable 109 with its bottom surface down. At this time, the angle formed by the two planes may be unknown. The accurate size of the object for calibration may be unknown as long as the size is appropriate for the turntable and the measuring apparatus.

In step S202, range image measuring apparatus control program p4 controls range image measuring apparatus 110 to set a predetermined rotational angle, whereat the two planes can be measured simultaneously, thereby performing the projective range image measurement on the object for calibration. Data transfer program p6 controls network controller B 141 and sends the obtained projective range image measurement data to image processing system 120 to trigger the processing of step S203. Image processing system 120 stores the entered projective range image measurement data in area d1 of memory B 103, and image processing system 120 begins the processing from step S203. Image measuring system 121 executes the processing, which begins with the step S204.

In step S203, two plane areas are cut out from the projective range image data stored in area d1 of memory B 103. This processing is accomplished by finding the closest line from measurements by taking advantage of the already known fact that the target object has two planes, which are convexly connected, facing against the measuring apparatus. The image is cut into two areas with the line, and the surrounding edges of the cut areas are deleted. The deletion of the edge portions is necessary because the data on the surrounding edges are usually unstable.

In step S207, a plane approximation calculation is carried out by applying the information on the surface position of each picture element in the obtained left plane area. This is accomplished by applying the data in the formula (1) for the plane to determine the estimated values of coefficients a, b, c and d.

$$ax+by+cz+d=0 \qquad \text{Formula (1)}$$

The plane formula for the left plane area of the first measurement image thus obtained is hereinafter referred to as plane formula (1.1L).

In step S208, a plane approximation calculation is performed by using the information on the surface position of each picture element in the obtained right plane area. This is accomplished by applying the data in the formula (1) for the plane to determine the estimated values of coefficients a, b, c, and d in the same manner as in step S207. The plane formula for the right plane area of the first measurement image thus obtained is hereinafter referred to as plane formula (1.1R).

In step S220, the system waits for the second measurement data sent from the image measuring system. When the second measurement data is received, the data is stored in area d1 of memory B 103. The program then proceeds to step S206. The processing performed in the steps S206, S209, and S210 is basically the same as that carried out in steps S203, S207, and S208 with only difference of whether the image data received first or second is processed.

In step S206, two plane areas are cut out according to the projective range image data received second, which is stored in area d1 of memory B 103. In step S209, the plane approximation calculation is carried out by applying the information on the surface position of each picture element in the obtained left plane area. This is accomplished by applying the data to the formula (1) for the plane to determine the estimated values of coefficients a, b, c, and d.

The plane formula for the left plane area of the second measurement image thus obtained is hereinafter referred to as plane formula (1.2L).

In step S210, the plane approximation calculation is performed by employing the information on the surface position of each picture element in the obtained right plane area. This is accomplished by applying the data to the formula (1) for the plane to determine the estimated values of coefficients a, b, c, and d in the same manner as in the step S209. The plane formula for the right plane area of the second measurement image thus obtained is hereinafter referred to as plane formula (1.2R).

In step S211, a plane is determined which passes an intersection line of the plane formula (1.1L) and the plane formula (1.2L), and also bisects the angle between the plane based on formula (1.1L) and the plane based on formula (1.2L). The obtained plane is referred to as a plane formula (1.3). In a step S212, a plane is determined which passes an intersection line of the plane formula (1.1R) and the plane formula (1.2R), and also bisects the plane based on formula (1.1R) and the plane based on formula (1.2R). The obtained plane is referred to as a plane formula (1.4).

In step S213, the intersection line of the plane formula (1.3) and the plane formula (1.4) is calculated. A linear formula for the intersection line thus obtained is:

$(X-P_x)/V_x=(Y-P_y)/V_y=(Z-P_z)/V_z$  Formula (2)

This provides a linear equation for the rotation axis of the turntable.

Figure 11:
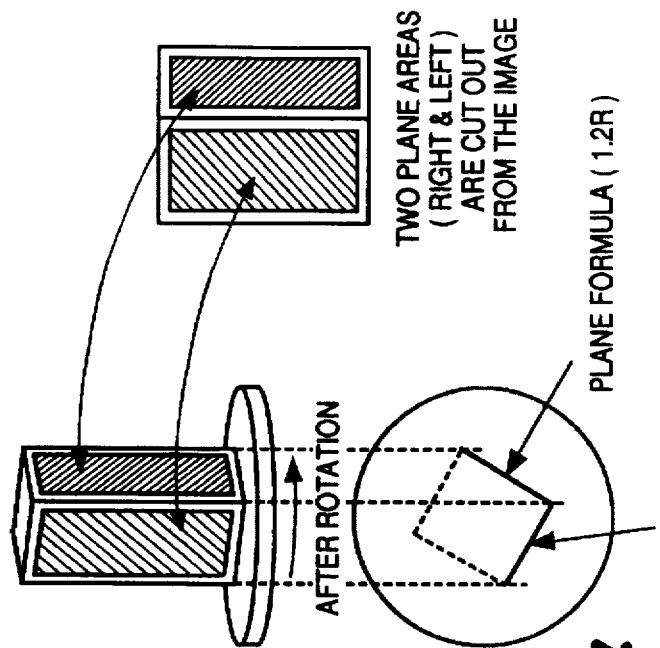
FIG. 11 is a conceptual view illustrating a process for determining an equation for the rotation axis of the turntable.

The steps described above are schematically illustrated in FIG. 11.

The flow of processing, wherein the object is rotated by turntable 109 having the determined rotation axis and the information on the shape in all circumferential directions is obtained, will now be described with reference to FIG. 8. The processing of steps S303 and S307 is carried out by image processing system 120, while other steps are carried out by the image measuring system 121.

In step S301, an object to be measured is rested on the turntable. The rotational angle is regarded as zero degree. In step S302, the range image for each line is measured by range imaging apparatus 110. This measurement can be accomplished by swinging a polygon mirror once when a range image measuring apparatus based on scanning by means of a laser-beam polygon mirror is used. The obtained distance data is transferred to image processing system 120 via network controller A 141 and stored in area d3 of memory B 103.

Figure 9:
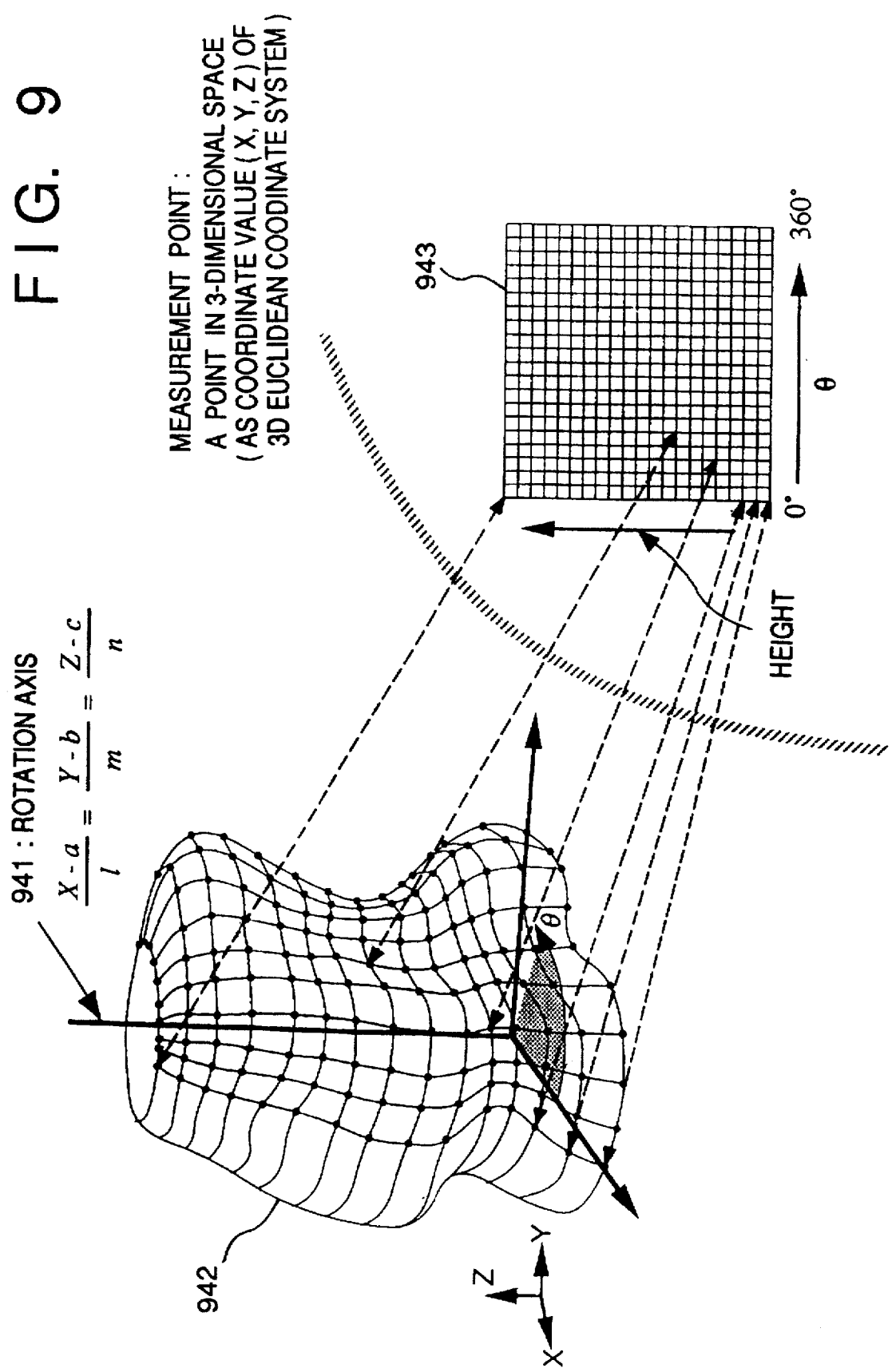
FIG. 9 is a conceptual view of radial range image processing.

Referring to FIG. 9, the concept of the measurement of the radial range image will be described. FIG. 9 shows the contour of object 942 placed on turntable 109. The distance is measured while rotating object 942 around rotation axis 941. For each rotational angle, the distance for each line in the direction of the Z axis is measured, and the measurement results are entered in 2-D data table 943 shown in FIG. 9. The range image data of the 2-D data table are stored in d3 of memory B 103. The axis of abscissa of 2-D data table 943 denotes the rotational angle of turntable 109, while the axis of ordinate denotes the height of the rotation axis, i.e., measurement in the direction of the Z axis. The range image data on one point of object 942 are stored in each unit of the matrix of 2-D data table 943.

Referring back to the processing flow shown in FIG. 4, the description will be continued.

In step S303, the obtained measurement points are subjected to geometrical transformation. The obtained range image data on the measurement points are the results of the measurements made as the object was rotated by the turntable. The coordinates in actual space can be obtained by carrying out the rotational geometric transformation, which sets the measurement points back to their original positions before the rotation. This processing allows the proper surface position of the object to be obtained. When an apparent measurement point position is taken as (x,y,z), the total rotation angle as −θ, and the proper object surface position as (x', y', z'), the rotation geometrical transformation with respect to the rotation axis of formula (2) is expressed by the following formula:

$$T = \alpha \cdot \beta \gamma$$

$$\begin{bmatrix} x' \\ y' \\ z' \\ 1 \end{bmatrix} = T \begin{bmatrix} x \\ y \\ z \\ 1 \end{bmatrix}$$

where $$\alpha = \begin{bmatrix} 1 & 0 & 0 & p_x \\ 0 & 1 & 0 & p_y \\ 0 & 0 & 1 & p_z \\ 0 & 0 & 0 & 1 \end{bmatrix}$$

$$\beta = \begin{bmatrix} v_x v_x(1-\cos\theta)+\cos\theta & v_y v_x(1-\cos\theta)-v_z\sin\theta & v_z v_x(1-\cos\theta)+v_y\sin\theta & 0 \\ v_x v_y(1-\cos\theta)+v_z\sin\theta & v_y v_y(1-\cos\theta)+\cos\theta & v_z v_y(1-\cos\theta)-v_x\sin\theta & 0 \\ v_x v_z(1-\cos\theta)-v_y\sin\theta & v_y v_z(1-\cos\theta)+v_x\sin\theta & v_z v_z(1-\cos\theta)+\cos\theta & 0 \\ 0 & 0 & 0 & 1 \end{bmatrix}$$

$$\gamma = \begin{bmatrix} 1 & 0 & 0 & p_x \\ 0 & 1 & 0 & p_y \\ 0 & 0 & 1 & p_z \\ 0 & 0 & 0 & 1 \end{bmatrix}$$

Since the rotational angle of turntable 109 is zero degree for the first one-line measurement, the measurement of the points on the one line means direct measurement of the position on the surface of the object.

In step S307, the point position data of each line obtained in step S303 are stored in area d3 of memory B 103 of image processing system 120. In step S304, the turntable is rotated by a minute angle. In step S305, the total sum of the minute rotational angles of the turntable rotated in step S304 is calculated.

In step S306, it is checked whether the total sum of the minute turns has reached a full one rotation; if not, the program goes back to step S302 to repeat the measurement, and if it has reached the full one rotation, then the measurement will be terminated.

According to the procedure described above, the measurement of the range image of the object from all directions can be achieved.

Figure 10:
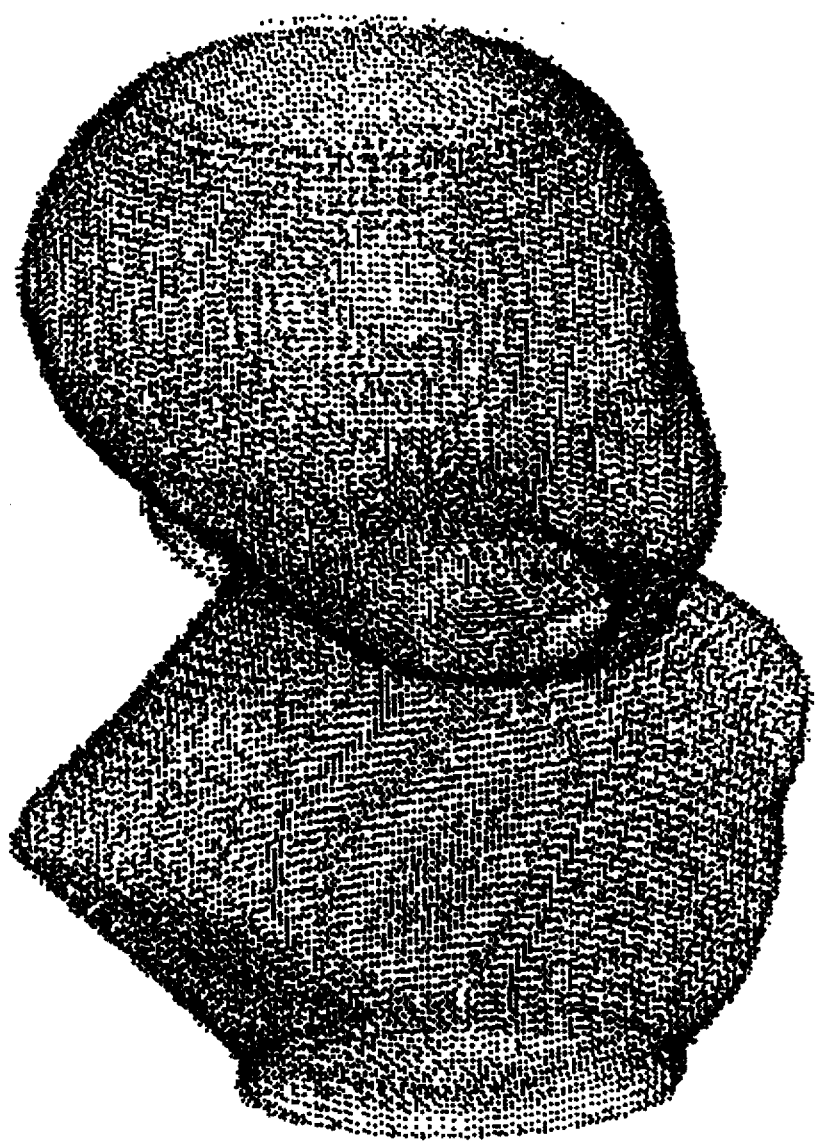
FIG. 10 illustrates an example of the radial range image obtained in the second embodiment.

FIG. 10 shows an obtained range image of the object with the luminance modulated, the image being displayed on window system 104.

In this embodiment, an example, wherein the projective range image measuring apparatus and the turntable, which is independent from the apparatus and which allows the rotational angle to be controlled, were prepared to obtain the radial range image, however, the range image measuring apparatus (hereinafter referred to as the measuring apparatus 110), which uses a light-receiving surface element as in the slit light projection method or a pattern light projection method, may alternatively be used as the projective range image measuring apparatus. To use this measuring apparatus 110 in this embodiment, the measurement of the points on one line in step S302 of FIG. 6 is replaced by the oneline data obtained by measuring apparatus 110.

As explained above, the embodiment provides the following effects. The data on a radial range image, which covers the shape data from every direction around the target object, can be easily generated at low cost without using a measuring apparatus, which is extremely larger than the target object or using a large-scale measuring apparatus, which turns itself. Moreover, the radial range image data can be obtained by setting the target object and automatically measuring the position of the rotation axis, around which the object is rotated, thus permitting easy measurement.

Therefore, according to the present invention, the position of the target object can be set freely and the measurement of the radial range image can be performed at low cost.

(Third Embodiment)

An outline of an image processing method, which is in the third embodiment, for obtaining an range image and generating approximate shape data will be given first, then detailed explanation will follow.

The image processing method of the third embodiment includes a step for interactively selecting and entering discrete points on an object in 3-D space and a step for generating a model having a 3-D geometrical shape by employing triangular patches, which apply the Delaunay triangulation net in accordance with the points entered in an input step.

An image processing apparatus according to the third embodiment is equipped with an input means for interactively selecting and entering discrete points on the object in 3-D space and a generating means for generating a model having a 3-D geometrical shape by employing triangular patches, which apply the Delaunay triangulation net in accordance with the points entered through the input means.

The discrete points of the object in 3-D space are interactively selected and entered through such steps or such a configuration according to the third embodiment. Then, based on the entered points, a model having a 3-D geometrical shape is generated by triangular patches using the Delaunay triangulation net.

The third embodiment according to the present invention will be explained in detail with reference to attached drawings.

Figure 14:
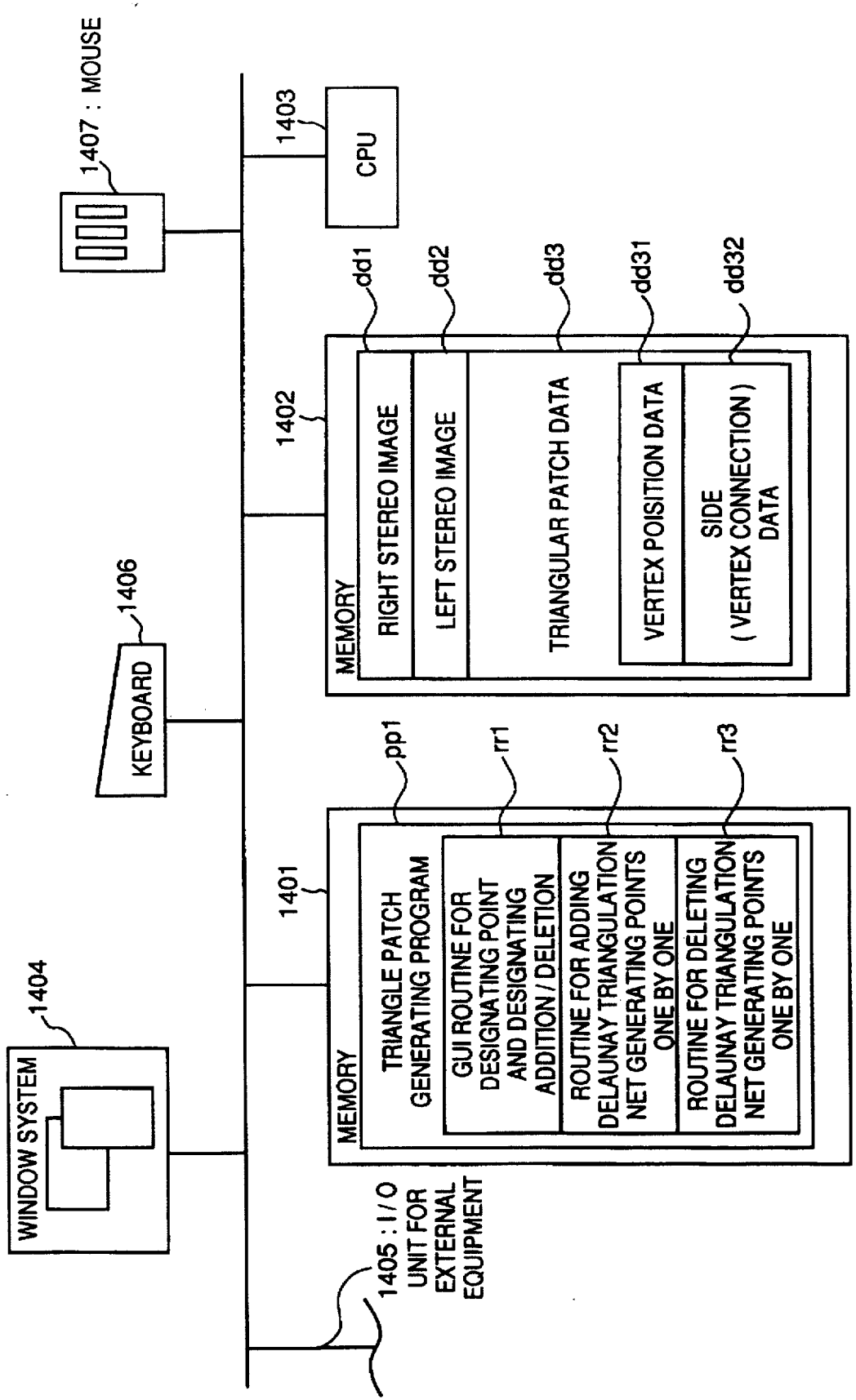
FIG. 14 is a block diagram of a triangular patch generator according to a third embodiment.
Figure 15:
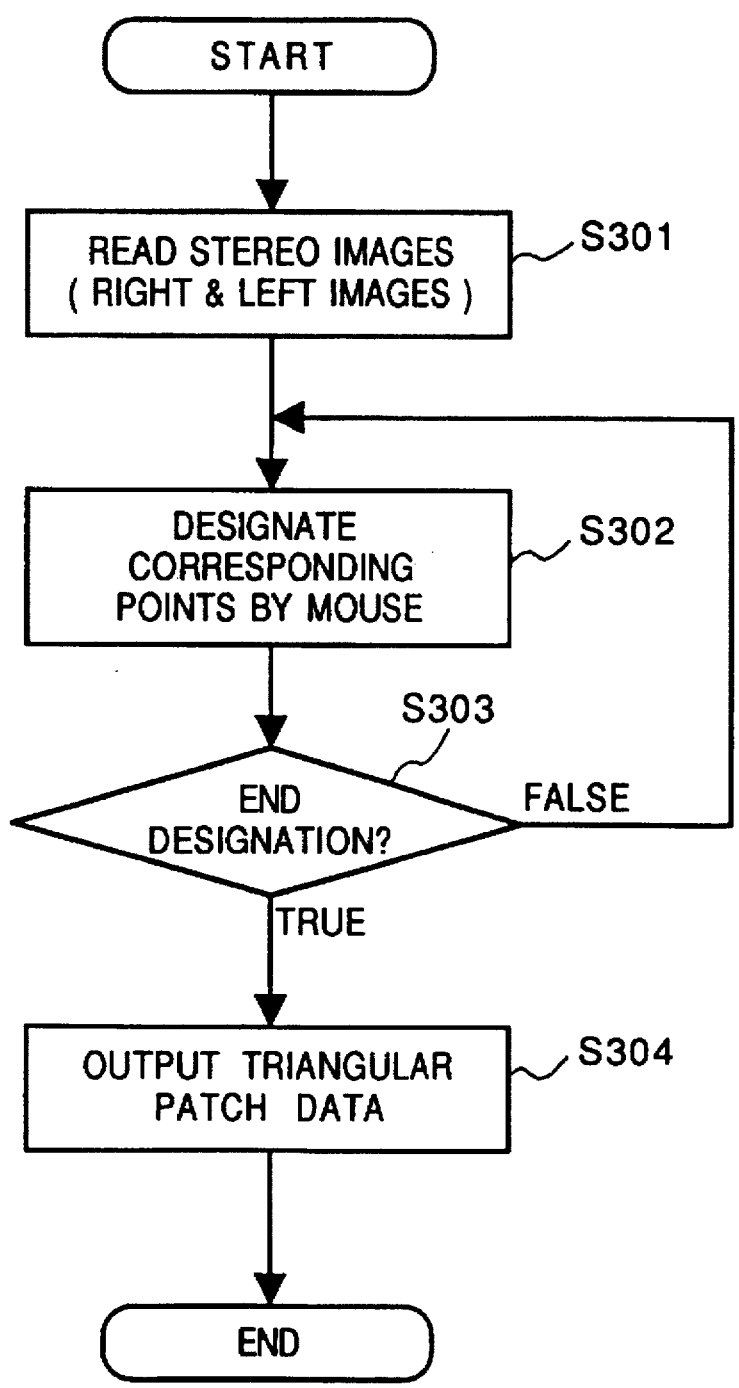
FIG. 15 is a flowchart illustrating an entire flow of a triangular patch generating process according to the third embodiment.

FIG. 15 shows the processing flow of the triangular patch generating method of this embodiment. According to the present invention, FIG. 14 is the block diagram showing an apparatus, which implements the method. The following gives detailed explanation of the processing carried out by CPU 1403 of the embodiment, which functions as a processing unit, a related processing procedure (program) being stored in memory 1401.

A stereo image, which has been obtained by photographing an object with two cameras spaced away from each other with a certain distance or by photographing the object twice with a single camera moved to provide perspective, is read in step S301 through I/O unit 1405 for an external equipment in FIG. 14, and the stereo image, which has been read, is stored in areas dd1 and add of memory 1402. With the stereo image displayed on display unit 1404, a Delaunay triangulation net is updated by designating the corresponding points of the right and left images, respectively, by means of mouse 1407 or other pointing device (step S302). The processing in step S302 (program routines rr1 through re stored in memory 1401) will be discussed later with reference to the flowchart. Designating the corresponding points is repeated until it is terminated in step S303. If termination is designated, then all element-triangles of the Delaunay triangulation net are transformed, in step S304, to triangular patch data, which is output through I/O unit 1405.

Figure 16:
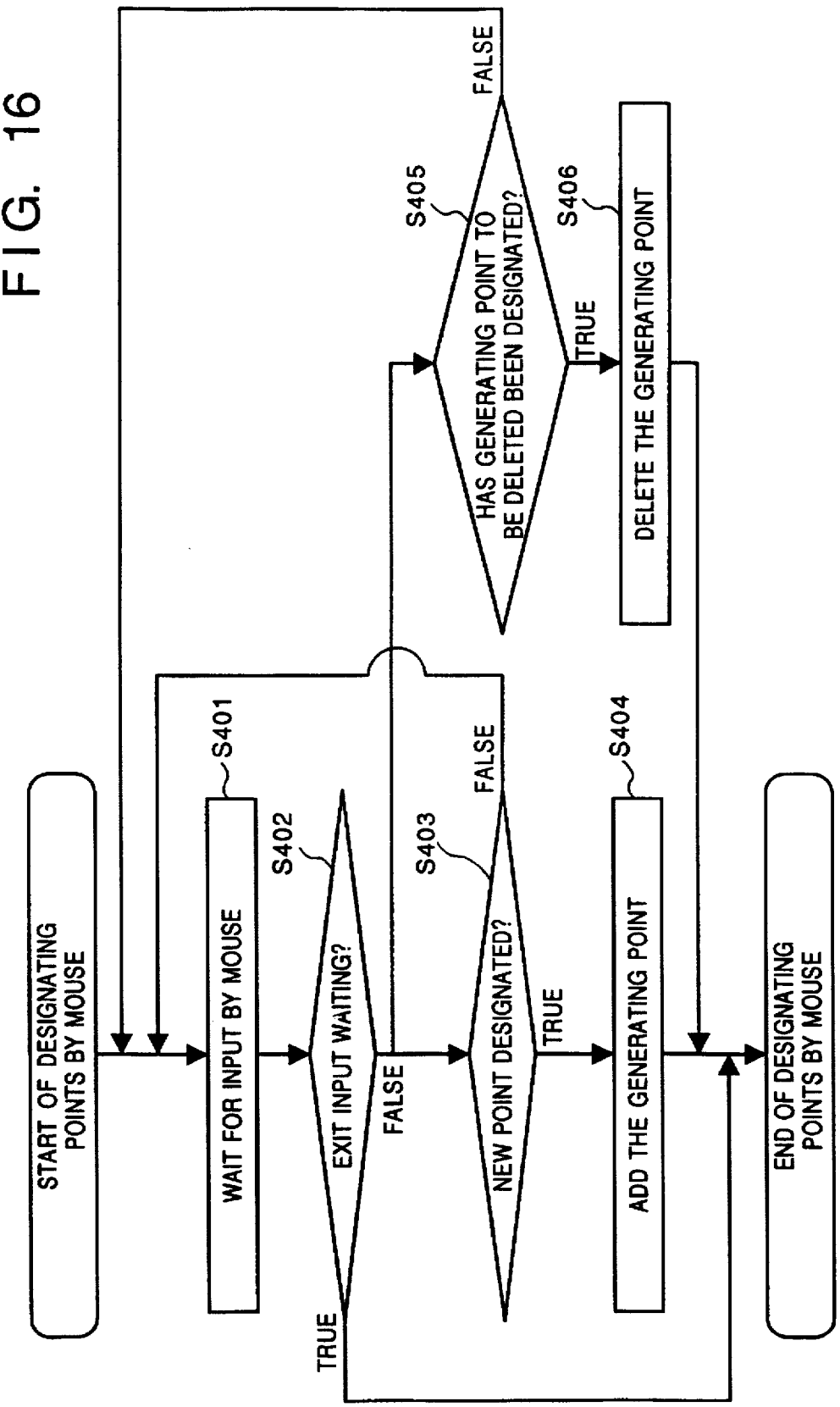
FIG. 16 is a flowchart of designating a corresponding by means of a mouse in FIG. 15.

The processing in aforesaid step S302 will now be described in accordance with the flowchart given in FIG. 16. The processing includes designating of the points by means of the mouse and updating the Delaunay triangulation net.

In step S401, the system waits for an input given through a mouse used for designating a point. If no instruction is given in step S402 as to whether the system should exit the waiting for an input, then a new generating point is designated in step S403 or a generating point to be deleted is designated in step S405. The generating point designated in step S403 is added to the Delaunay triangulation net in step S404. The processing will be discussed later with reference to the flowchart shown in FIG. 17. This processing is the same as that discussed under "Description of the Related Art." The generating point designated in step S405 is deleted from the Delaunay triangulation net in a step S406. This processing will be discussed later with reference to the flowchart shown in FIG. 17.

The processing of adding the generating point in step S404 will now be described, referring to FIG. 16. First, in step S501, an element triangle in the Delaunay triangulation net is checked to determine whether the point to be added lies inside a circumcircle in order to decide which element triangle of the current Delaunay triangulation net should be updated, and the triangle, which includes the point to be added inside the circumcircle, is registered (step S502). This processing is carried out on all triangles (step S503) These steps S501 through S503 correspond to FIG. 12C. Whether a certain point is located inside the circumcircle of a triangle can be determined as shown below. If the three vertexes of the triangle are taken as pj=(xj, yj), pk=(xk, yk), and pl=(xl, yl), and the determinant shown below is employed for a point p=(x,y);

$$H(p_j, p_k, p_l, p) = \begin{bmatrix} 1 & x_j & y_j & x_j^2 + y_j^2 \\ 1 & x_k & y_k & x_k^2 + y_k^2 \\ 1 & x_l & y_l & x_l^2 + y_l^2 \\ 1 & x & y & x^2 + y^2 \end{bmatrix}$$

then, p is a point on a circle, which passes pj, pk, and pl when H(pj,pk,pl,p)=0, or p is a point in a circle, which passes pj, pk, and pl when H(pj,pk,pl,p)<0, or p is a point outside a circle, which passes pj, pk, and pl when H(pj,pk,pl,p)>0.

Figure 12A:
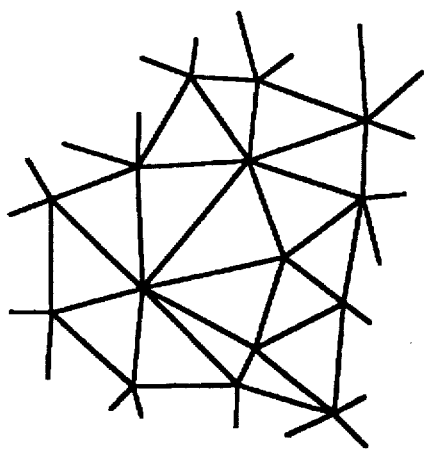
FIGS. 12A–12D are schematic diagrams illustrating the flow of the processing for adding a generating point to a Delaunay triangulation net, and for updating generating points accordingly.
Figure 12B:
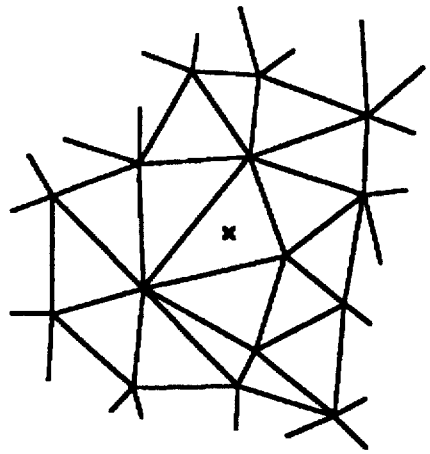
Figure 12C:
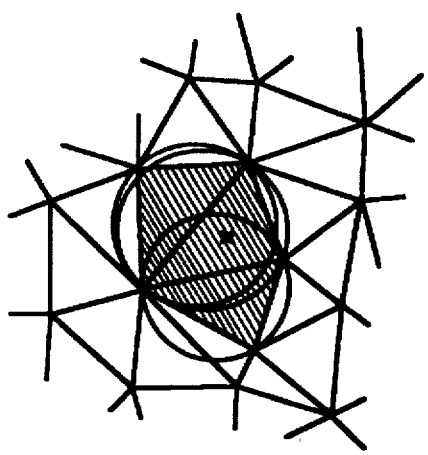
Figure 12D:
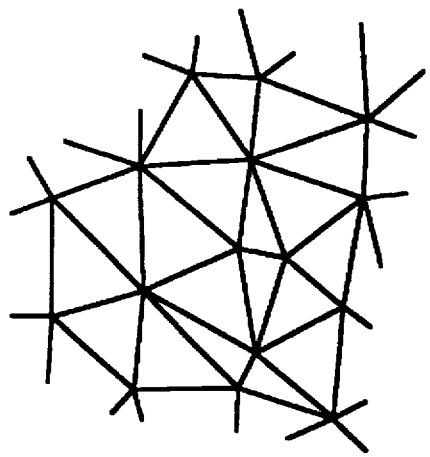

Thus, all triangles that include the point to be added inside circumcircles have been selected. The selected triangles are combined into a single polygonal area A (step S504). Then, the triangles in this polygonal area A are deleted (step S505), and triangles, which are formed by applying two adjoining vertexes on the contour line of polygonal area A and the point to be added, are named triangle group B (step S506). These steps S504 through S506 correspond to FIG. 13. After that, polygonal area A in the original Delaunay triangulation net is replaced by triangle group B to generate a new Delaunay triangulation net (step S507) The Delaunay triangulation net is updated in steps S501 through S507. Thus, the Delaunay triangulation net shown in FIG. 12A is updated to the Delaunay triangulation net shown in FIG. 12D.

The processing in step S406 for deleting the generating point mentioned previously will now be described with reference to the flowchart of FIG. 18 and FIG. 19.

Select triangles, which have the designated generating point to be deleted (FIG. 19A) as a middle point thereof (step S601). This selection results in a hatched section shown in FIG. 19B. This triangle group is named as polygonal area C (step S602), then the triangles in this polygonal area C are deleted (step S603). This eliminates the generating point designated to be deleted and also the triangles involving the generating point. At this point, there is no triangulation net in polygonal area C; therefore, processing for regenerating a triangulation net will be carried out as follows. Applying the vertexes of the polygon of polygonal area C as generating points, a Delaunay triangulation net, which is entirely different from the previous Delaunay triangulation net, is generated (step S604). The processing for generating the Delaunay triangulation net in step S604 will be discussed later in connection with the flowchart shown in FIG. 20. The Delaunay triangulation net obtained in step S604 may have a triangle outside polygonal area C (an example is shown in FIGS. 22A–22F); therefore, the triangle, which lies in the Delaunay triangulation net generated in step S604 but which has been generated outside polygonal area C is deleted in step S605. Step S605 will be discussed later with reference to the flowchart of FIG. 21. The triangle group thus obtained replaces polygonal area C in step S606 to delete the generating point and update the Delaunay triangulation net. It can be mathematically proved that the method for updating the Delaunay triangulation net in steps S601 through 606 maintains characteristics of the Delaunay triangulation net.

Figure 20:
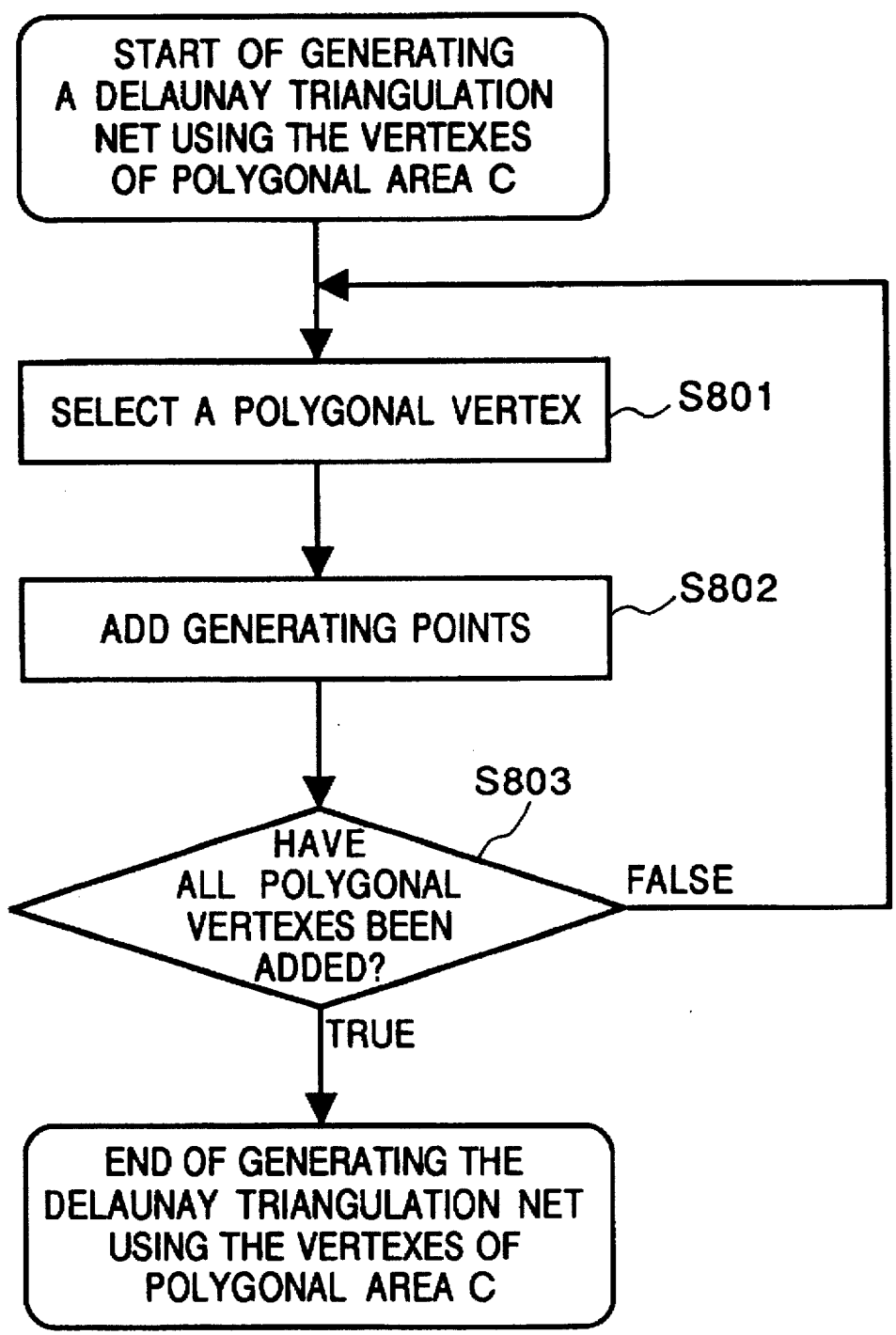
FIG. 20 is a flowchart of generating the Delaunay triangulation net using a vertex of the polygonal area C shown in FIG. 18.

The processing for generating the Delaunay triangulation net using the vertexes of polygonal area C in step S604 will now be explained according to FIG. 20.

First, one of the vertexes of the polygon is selected (step S801) and the generating point designated in FIG. 13 is added in step S802. These steps S801 and S802 are carried out on all vertexes (step S803) to generate the Delaunay triangulation net applying the vertexes of polygonal area C.

Figure 21:
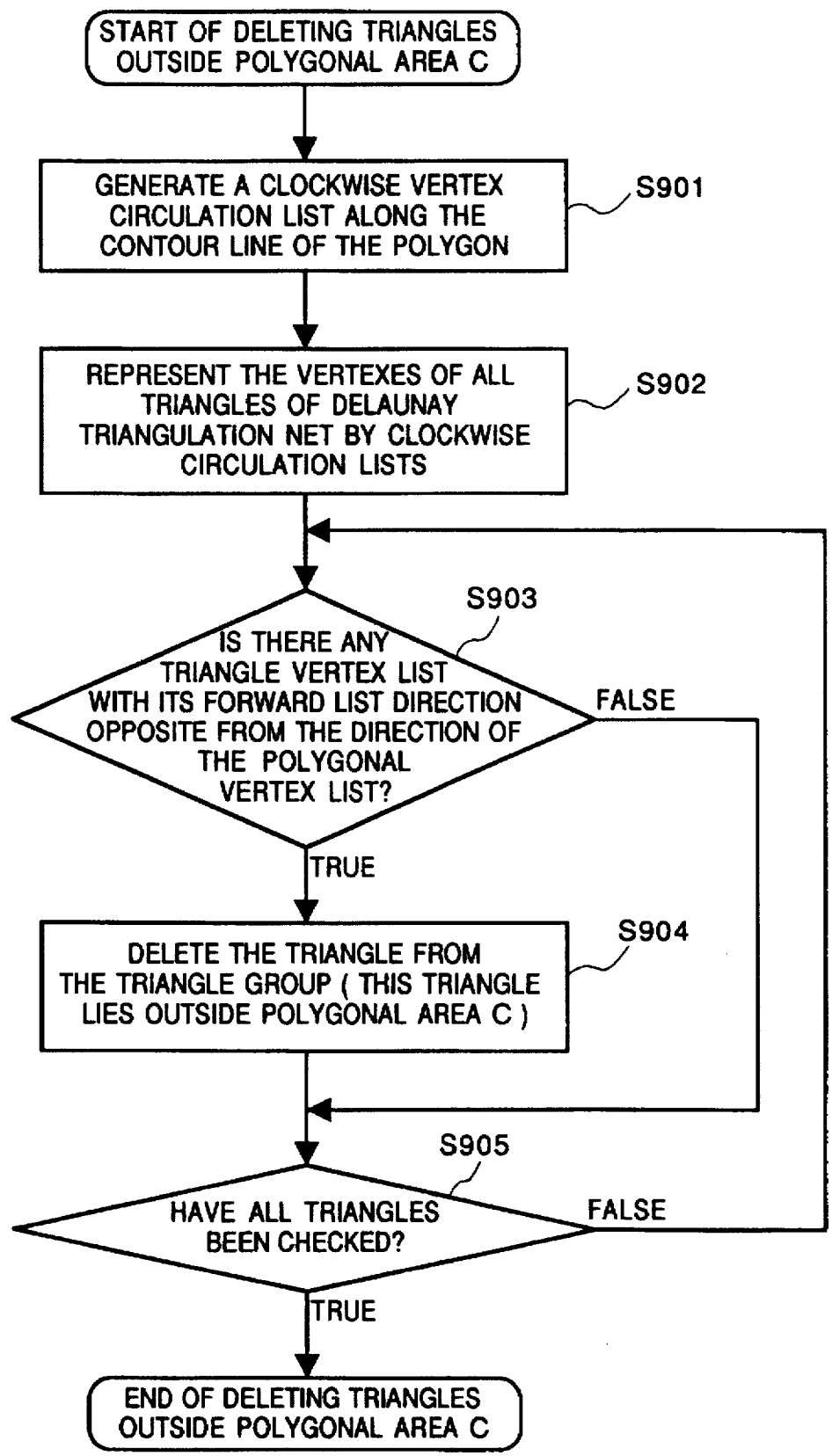
FIG. 21 is a flowchart of deleting a triangle lying outside polygonal area C shown in FIG. 18.

The procedure for deleting the triangle outside polygonal area C from the Delaunay triangulation net in step S605 will be explained, referring to FIG. 21. An example of this processing illustrated in FIGS. 22A–22F will be used for the explanation.

First, a clockwise circulation list of the vertexes is generated along the contour of polygonal area C (step S901, FIG. 22D). Then, for each triangle of the Delaunay triangulation net, a clockwise circulation list of the vertexes is generated (step S902, FIG. 22E). If any of the triangles is located outside polygonal area C, then the triangles share the vertex, which has the opposite list direction as shown in FIG. 22F. Therefore, in step S903, it is checked whether the list directions are reversed and if any reversed list direction is found, the triangle having the opposite list direction is deleted from the triangle group (FIG. 22F). The processing of steps S903 and S904 is carried out on all triangles (step S905) to delete triangles lying outside polygonal area C.

Figure 23:
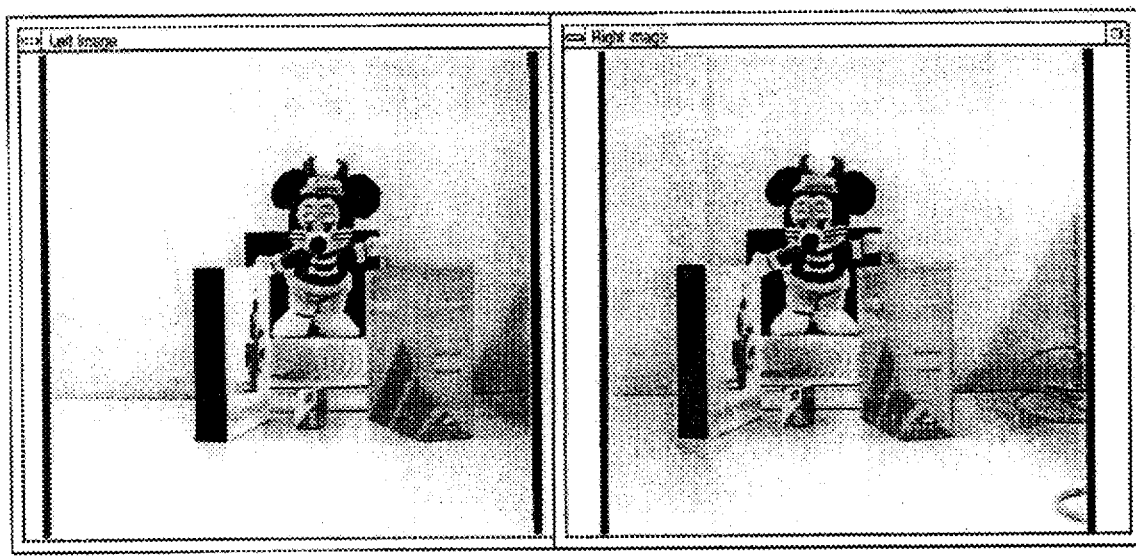
FIG. 23 illustrates an example of an entered stereo image.
Figure 24:
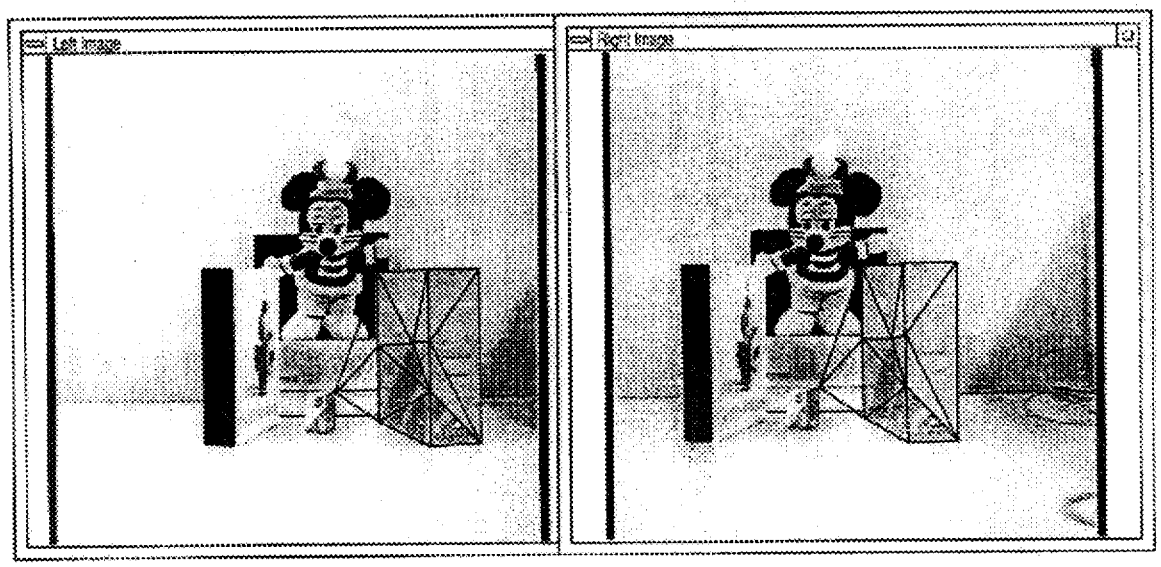
FIG. 24 illustrates an example of a state, wherein a system is waiting for a point to be designated in an image.
Figure 25:
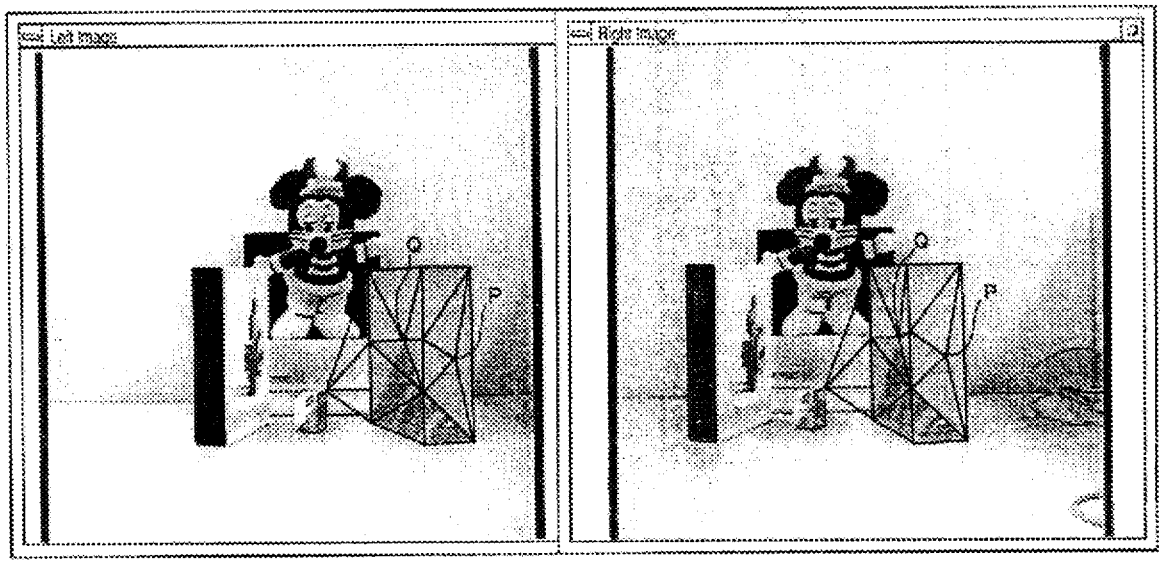
FIG. 25 illustrates an example, wherein a generating point has been added to the Delaunay triangulation net, which has accordingly been updated.
Figure 26:
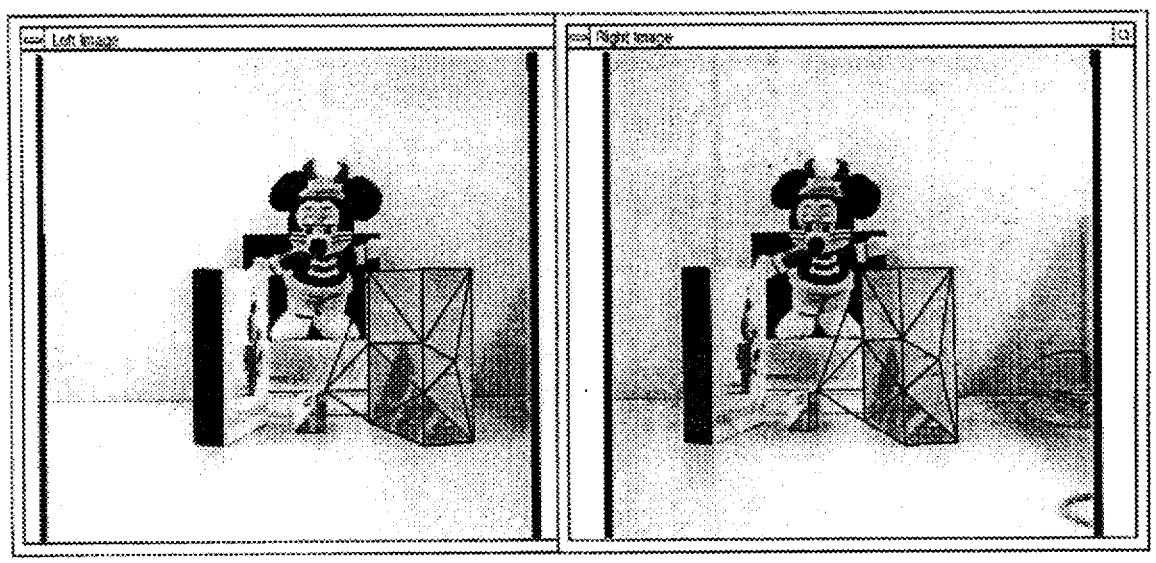
FIG. 26 illustrates an example, wherein a generating point has been deleted from the Delaunay triangulation net, which has accordingly been updated.

An example of the process for generating a triangular patch data from a stereo image according to the method described above is illustrated in FIG. 23 through FIG. 26. FIG. 23 shows the stereo image read in step S301. FIG. 24 shows a state, wherein designation is performed by means of the mouse in step S302 and it is the state, wherein the system is waiting for an input in the step S401. FIG. 25 shows a result of designating a new point in step S403 from the state shown in FIG. 24 and adding the generating point in the step S404 (point P in FIG. 25). FIG. 26 shows a result of designating a generating point to be deleted in the step S405 from the state shown in FIG. 25 and deleting the generating point in step S406 (point Q in FIG. 25).

(Fourth Embodiment)

The above embodiment is an example, which combines the method, whereby a position of a point in a scene is determined by designating corresponding points in the stereo, images and the designated point is added as a generating point to update the Delaunay triangulation net, and the method, whereby the Delaunay triangulation net is updated by deleting an existing generating point. The following describes the fourth embodiment, which includes a method, whereby edges of the triangulation net is fixed, in addition to the two methods mentioned above. The configuration of the apparatus of the fourth embodiment is the same as that of the third embodiment. This applies to the fifth embodiment and ones after the fifth embodiment to be discussed later.

Figure 27:
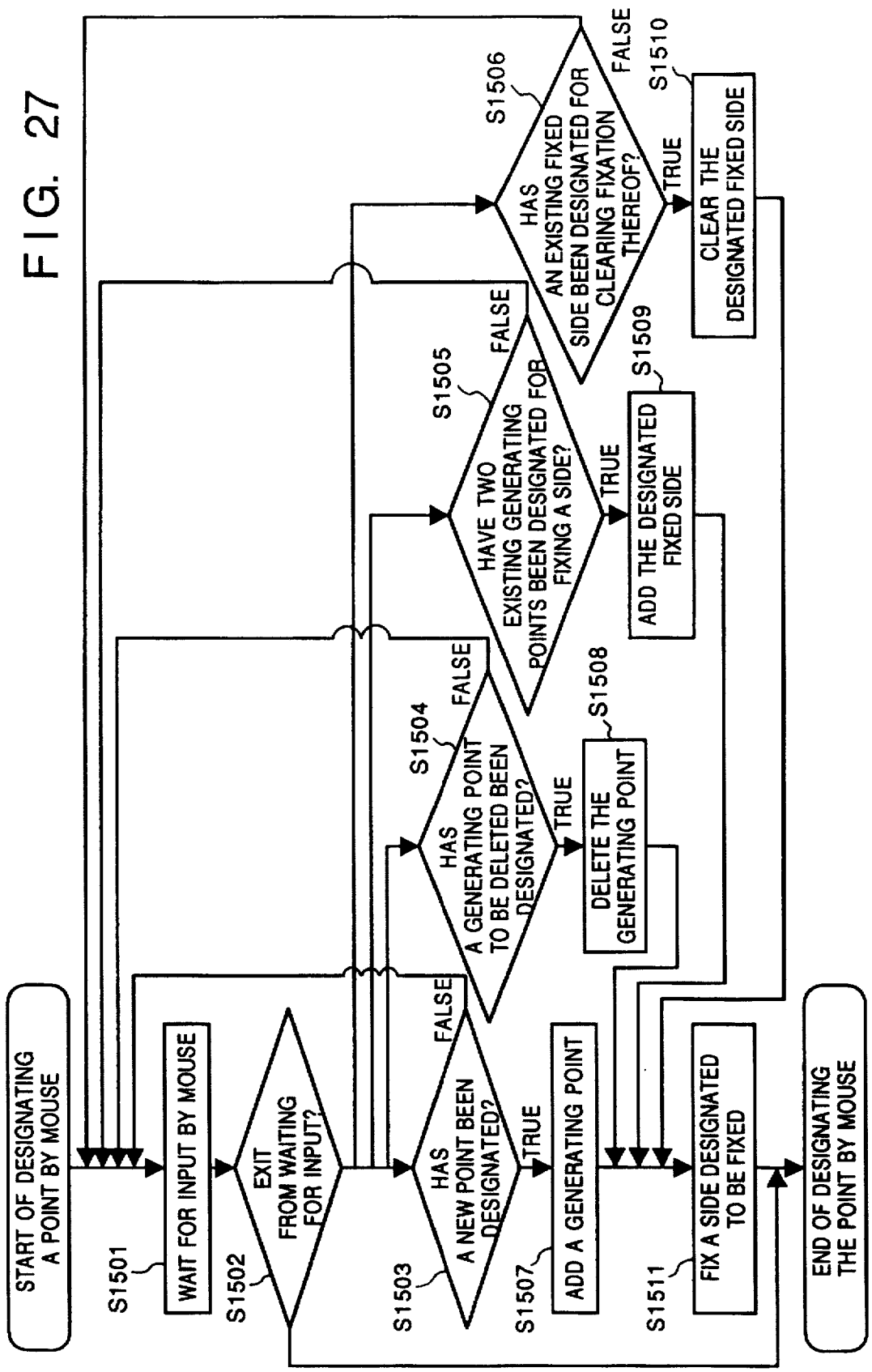
FIG. 27 shows a flowchart of a process for designating a point by means of a mouse in a fourth embodiment.

The basic flowchart of this embodiment is similar to that of the third embodiment described above and to that of FIG. 15. The flow of the processing performed in step S302 is shown in FIG. 27 (corresponding to FIG. 16 in the third embodiment). The description will be given with reference to FIG. 27.

The processing implemented in step S1501 is identical to that of step S401. Then, when no instruction is given as to whether the system should exit the waiting-for-input state in step S1502, a new generating point is designated in step S1503, a generating point to be deleted is designated in step S1504, two generating points are designated for fixing the line segment connecting the two generating points as an edge in step S1505, or an existing fixed edge is designated for clearing the fixation thereof in step S1506.

Figure 17:
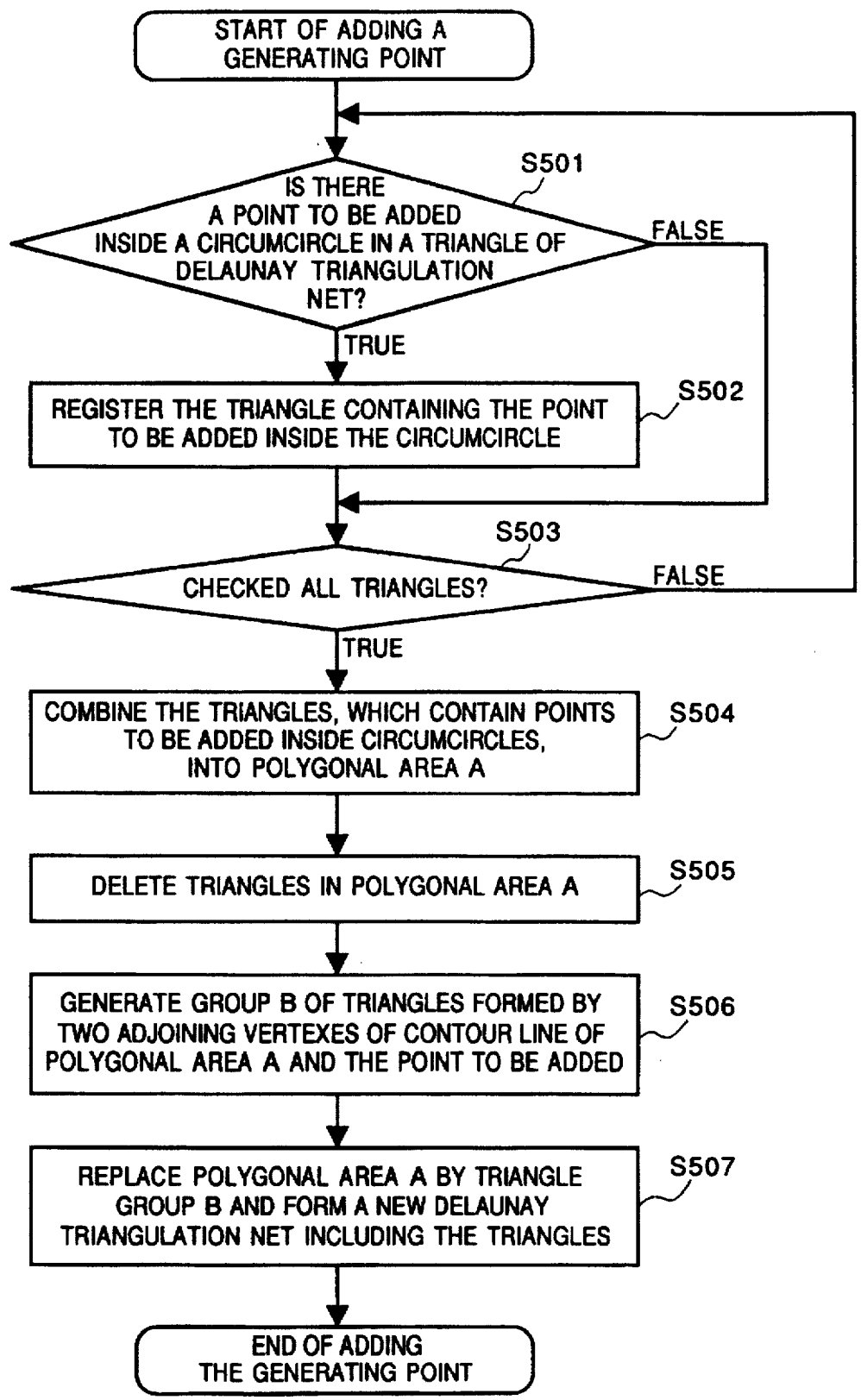
FIG. 17 is a flowchart of a process for adding the generating point shown in FIG. 16 and FIG. 19.

When it is determined that a generating point has been added in step S1503, the processing for adding a new generating point to the Delaunay triangulation net (step S1507) is carried out as shown by the flowchart of FIG. 17.

Figure 18:
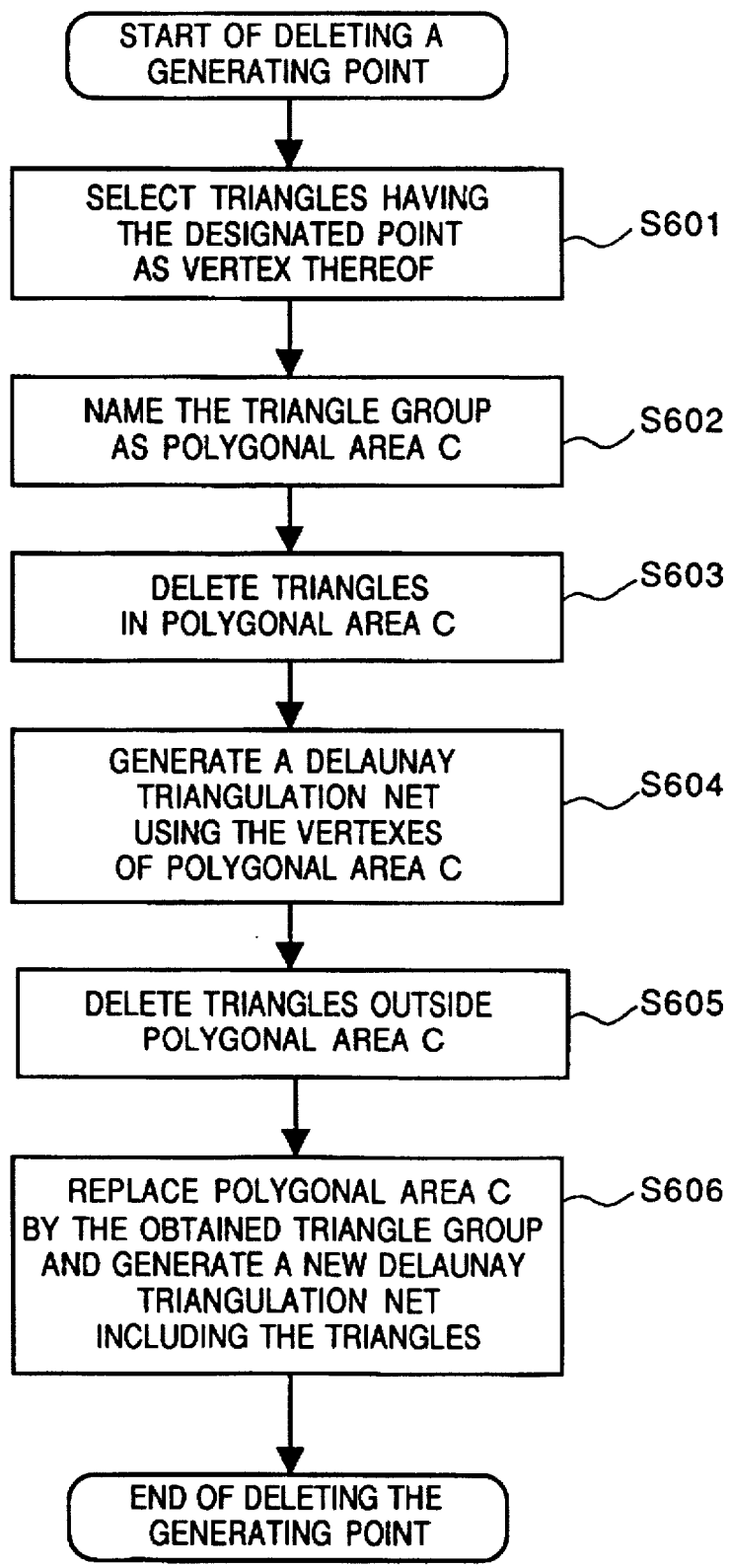
FIG. 18 is a flowchart of deleting the generating point shown in FIG. 16.
Figure 19A:
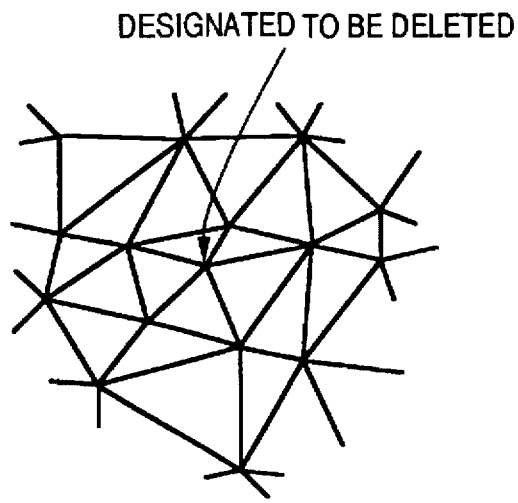
FIGS. 19A–19F are schematic diagrams illustrating a generating point deleting process.
Figure 19B:
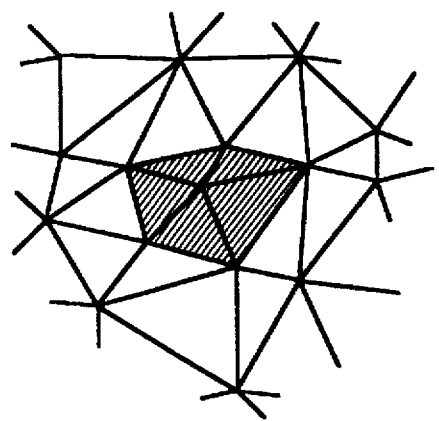
Figure 19C:
Figure 19D:
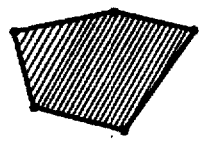
Figure 19E:
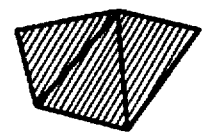
Figure 19F:
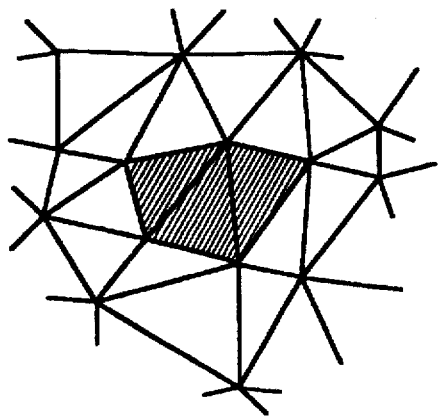

Likewise, when a generating point has been designated for deletion in step S1504, the processing for deleting the point from the Delaunay triangulation net (step S1508) is carried out as shown by the flowchart of FIG. 18.

If it is determined that two existing generating points have been designated for fixing an edge in step S1505, then the processing is performed in step S1509. In step S1509, an edge designated to be fixed is stored one after another.

If it is determined that an existing fixed edge has been designated for clearing the fixation thereof, then the system proceeds to step S1510 to perform the processing. Step S1510 which is the part of the processing for storing a fixed edge to be cleared, and in this step, the designated fixed edge is erased from fixed edges, which have been stored in step S1509, thereby clearing the fixation of the designated fixed edge.

Figure 28:
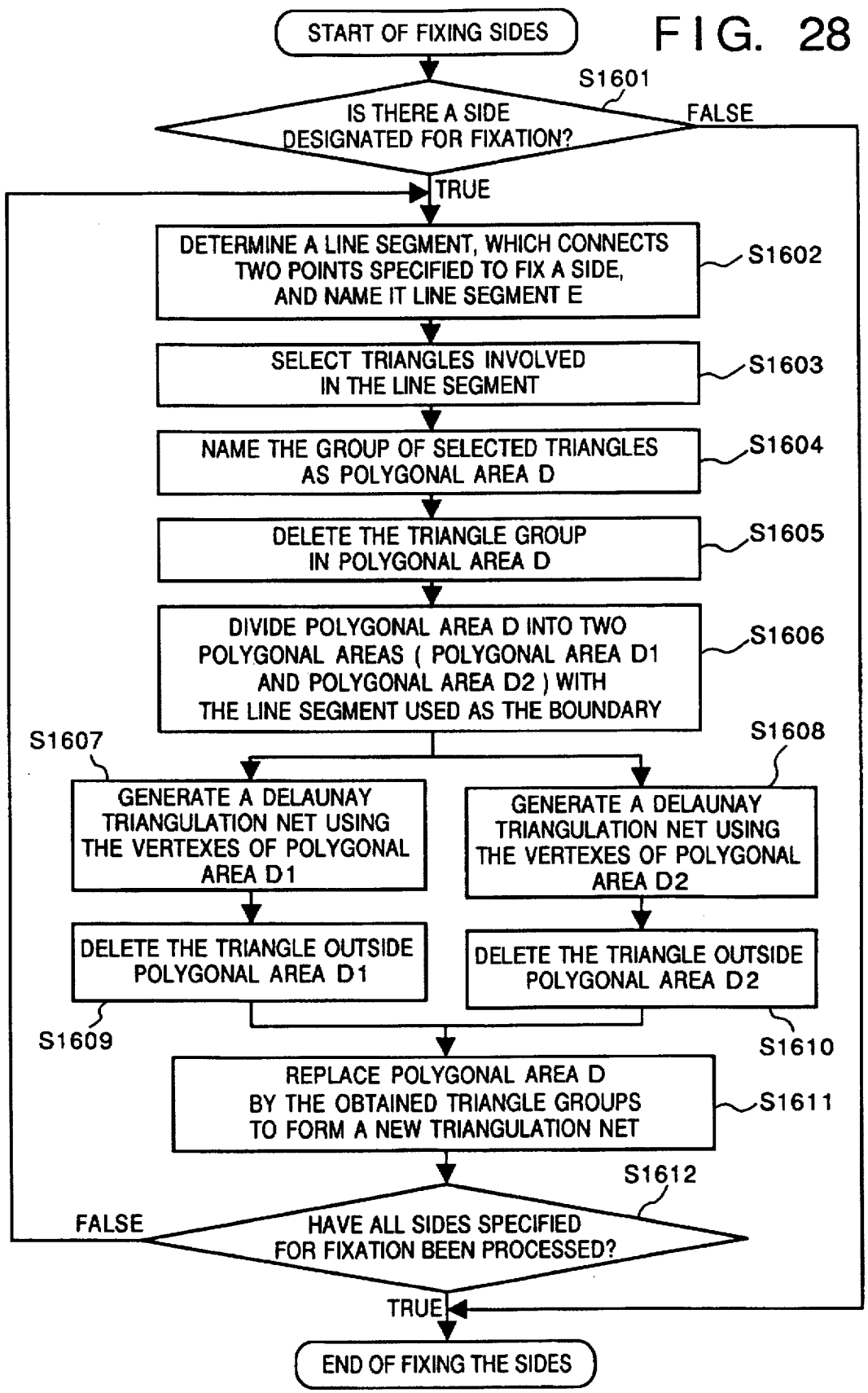
FIG. 28 shows a flowchart of a process for fixing a line in the fourth embodiment.

After completion of step S1507, S1508, S1509 or S1510, the system proceeds to step S1511. In the step S1511, the edges designated to be fixed, which have been stored for fixation in steps S1509, are actually fixed. The processing implemented in step S1511 will be described with reference to the flowchart given in FIG. 28.

First, in step S1601, it is checked whether there is any line segment that has been specified for fixation. A line segment to be fixed is designated in step S1509 and step S1510. If it is found that no line segment has been designated for fixation, then the system exits the processing for fixing a edge, or if there is any, then the system goes to step S1602. The processing implemented in step S1602 and its subsequent steps will be described below.

Figure 29A:
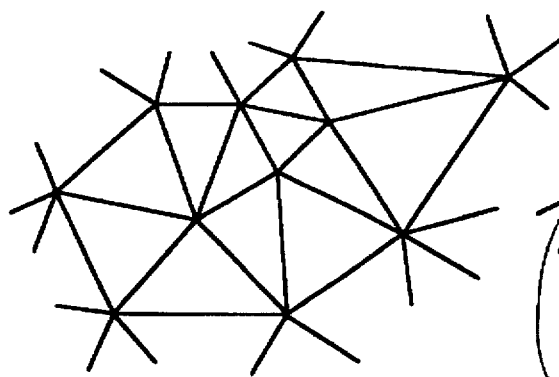
FIGS. 29A–29G are schematic diagrams of the process for fixing the line in the fourth embodiment.
Figure 29B:
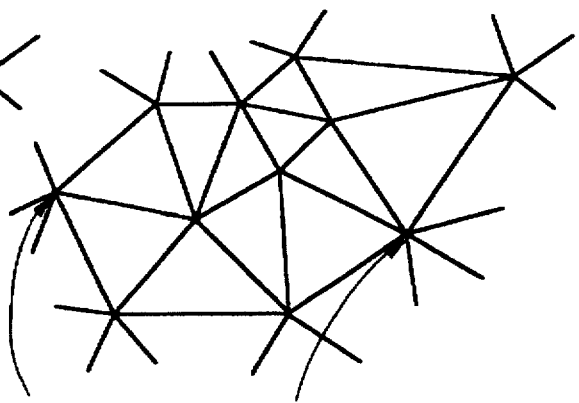
Figure 29C:
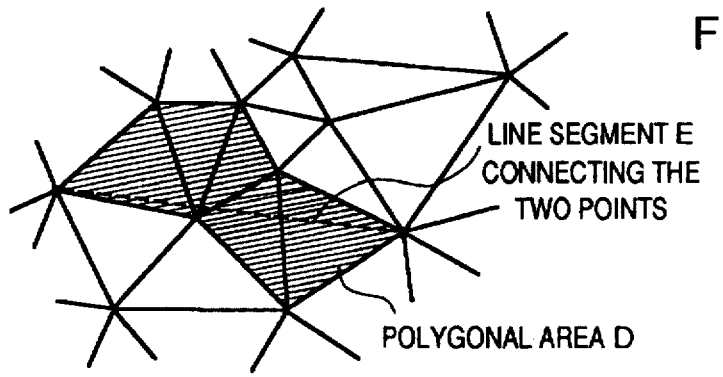

When there is a Delaunay triangulation net like shown in FIG. 29A, a line segment connecting the two generating points (FIG. 29B) designated is determined as a fixed edge in step S1602, and this line segment is named E. Triangles involving line segment E are selected in step S1603. The processing for selecting the triangles, which involve the line segment of step S1603, will be discussed later in connection with FIG. 30. The selection result is shown by the hatched part of FIG. 29C. This triangle group is temporarily named as polygonal area D (step S1604). The triangles in polygonal area D are eliminated in step S1605. This completes eliminating the triangles involving the aforesaid line segment. A triangulation net, which retains the aforesaid line segment as an edge, will be generated in polygonal area D.

Figure 29D:
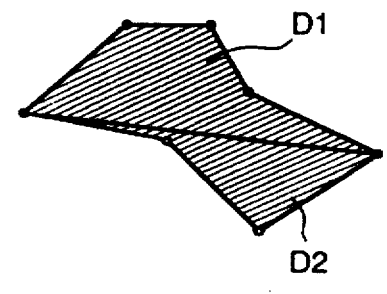
Figure 29E:
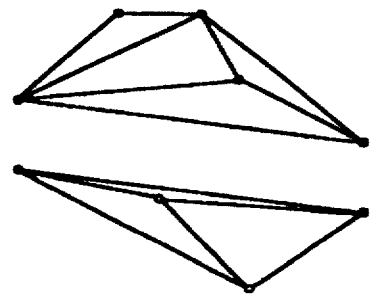
Figure 29F:
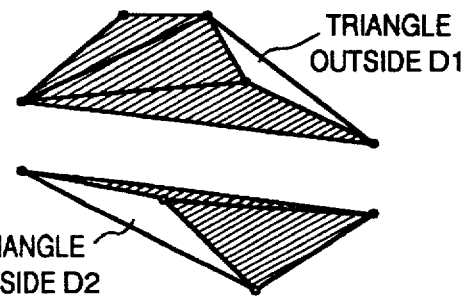

In step S1606, polygonal area D is divided into two polygonal areas D1 and D2 with the aforesaid line segment as a boundary thereof (FIG. 29D). Using the vertexes of polygonal area D1, the Delaunay triangulation net, which is completely independent from the original Delaunay triangulation net having the points as the generating points, is generated (step S1607). Likewise, using the vertexes of polygonal area D2, a Delaunay triangulation net is generated (step S1609)(FIG. 29E). The processing for generating the Delaunay triangulation nets in two steps, S1607 and S1609, is illustrated by the flowchart shown in FIG. 20. The Delaunay triangulation nets obtained by steps S1607 and S1609 may include triangles outside the polygonal areas (e.g., the cases shown in FIG. 22 and FIG. 29F). Therefore, the triangles generated outside polygonal areas D1 and D2 are deleted in steps S1608 and S1610 from the Delaunay triangulation nets generated in steps S1607 and S1609. The steps S1608 and S1610 are as shown in the flowchart of FIG. 21.

Figure 29G:
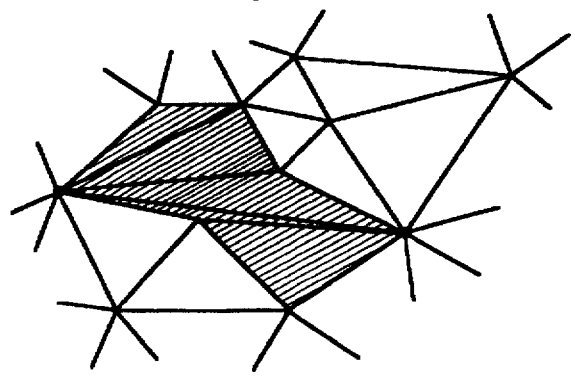

The triangle groups of polygonal area D1 and polygonal area D2 thus obtained are combined and replace polygonal area D, thereby generating a triangulation net with the edge connecting the two generating points fixed (FIG. 29G).

The system goes to step S1611 and then to step S1612. In step S1612, it is checked whether the processing from steps S1602 through S1611 has been carried out on all edges designated for fixation. If the processing has been carried out on all the edges designated to be fixed, then the system exits the processing. If the processing on all the edges designated for fixation has not been completed, then the system goes back to step S1602 to repeat the processing of steps S1602 through S1611 on the remaining edges to be fixed.

The triangulation net generated by steps S1601 through S1610 is called a constrained Delaunay triangulation net, which is a type of triangulation net, wherein the characteristics of the Delaunay triangulation net are ruined in a constrained part.

Figure 30:
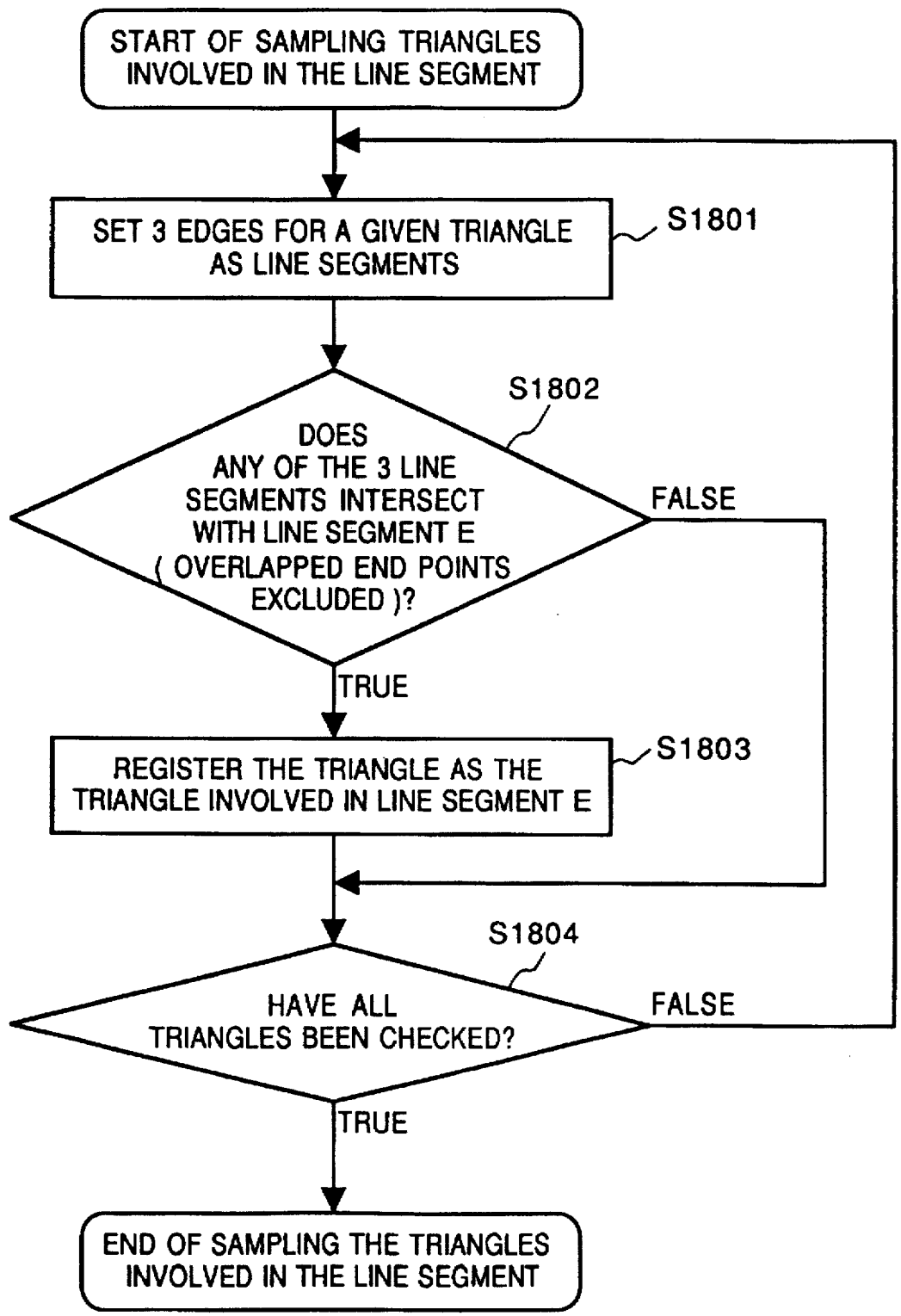
FIG. 30 is a flowchart of a process for selecting a triangle, which involves a line segment shown in FIG. 28.

The processing for selecting the triangles involving the line segment in step S1602 is shown in FIG. 30, and the description of the processing is given below.

First, in step S1801, a triangle is disassembled into three edges to become line segments. It is checked whether these three line segments intersect with line segment E (step S1802). The following shows how to determine whether two line segments intersect with each other. When the coordinates of two end points of one line segment are (x1, y1) and (x2, y2), and the coordinates of the two end points of the other line segment are (x3, y3) and (x4, y4), if $$\left(\begin{bmatrix} y_2 y_3 \\ x_2 x_3 \end{bmatrix} + \begin{bmatrix} y_1 y_2 \\ x_1 x_2 \end{bmatrix} + \begin{bmatrix} y_3 y_1 \\ x_3 x_1 \end{bmatrix}\right)\left(\begin{bmatrix} y_2 y_4 \\ x_2 x_4 \end{bmatrix} + \begin{bmatrix} y_1 y_2 \\ x_1 x_2 \end{bmatrix} + \begin{bmatrix} y_4 y_1 \\ x_4 x_1 \end{bmatrix}\right) < 0$$

$$\left(\begin{bmatrix} y_4 y_1 \\ x_4 x_1 \end{bmatrix} + \begin{bmatrix} y_3 y_4 \\ x_3 x_4 \end{bmatrix} + \begin{bmatrix} y_1 y_3 \\ x_1 x_3 \end{bmatrix}\right)\left(\begin{bmatrix} y_4 y_2 \\ x_4 x_2 \end{bmatrix} + \begin{bmatrix} y_3 y_4 \\ x_3 x_4 \end{bmatrix} + \begin{bmatrix} y_2 y_3 \\ x_2 x_3 \end{bmatrix}\right) < 0$$

is true, then it is determined that they intersect with each other. A case, wherein the end points of one line segment contact other line segment, is not included. Using the result, the intersection of the line segments is determined in step S1802. If even one of the three edges of the triangle intersects with line segment E, then line segment E is involved in the triangle. The triangle is registered in step S1803 and steps S1801 through S1803 are implemented on all triangles in step S1804.

Figure 31:
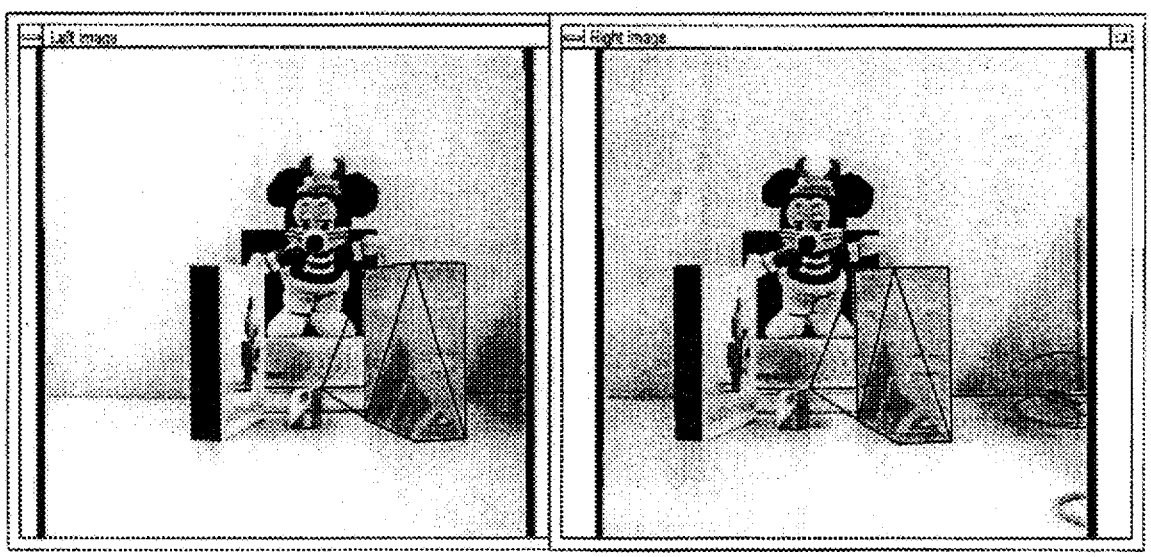
FIG. 31 shows an example of a state, wherein the system is waiting for a point to be designated in an image in a Delaunay triangulation net in the fourth embodiment.
Figure 32:
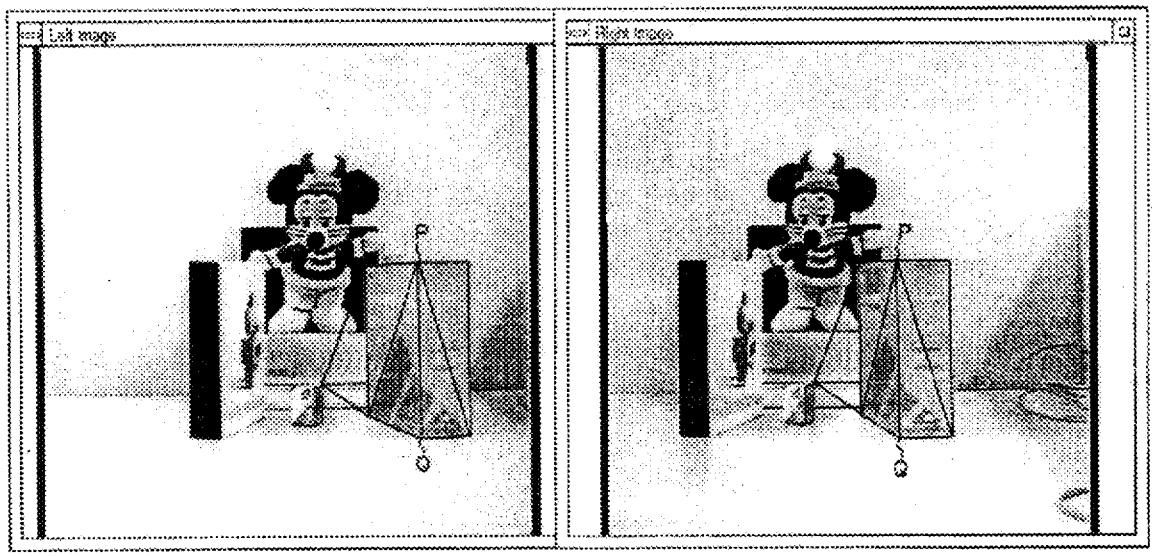
FIG. 32 is an example, wherein the line segment connecting two generating points is fixed as an edge in the fourth embodiment.

By the method described above, two points can be designated and the line segment connecting the two points can be fixed as an edge in the process of generating a triangular patch data from a stereo images. Examples are shown in FIG. 31 and FIG. 32. FIG. 31 shows the state, wherein the system is waiting for the designation by the mouse or for an input as in FIG. 13 showing the third embodiment. From this state, two generating points (points P and Q shown) are designated to fix an edge, the result thereof being illustrated in FIG. 32.

(Fifth Embodiment)

In the third and fourth embodiments, the positions of 3-D points are determined from the stereo images, and triangular patch data are generated by applying the points. As in prior art (2), a range image of a 3-D space such as an indoor scene or a 3-D object can be measured. The range image has a 2-D characteristics of a 2-D image array and 3-D characteristics, which are represented by each picture unit holding a 3-D position. This feature makes it possible to generate a Delaunay triangulation net on the range image surface instead of generating a Delaunay triangulation net by employing the right or left image out of the stereo images. It is also possible to extract the points, which are involved in a constantly changing shape as in a scene from a range image by using an existing technology, i.e., an algorithm for extracting diverse characteristic points. Alternatively, characteristic points may be designated by a pointing device such as a mouse. By regarding these points as the generating points of a Delaunay triangulation net, a Delaunay triangulation net can be generated to produce triangular patch data by updating the Delaunay triangulation net by adding generating points according to the procedure shown in FIG. 6.

(Sixth Embodiment)

Edges such as roof edges and jump edges in an image can be extracted from a range image by employing an existing art, i.e., an algorithm for extracting diverse edges. Regarding end points, as generating points, of an edge of a Delaunay triangulation net and the edge as a fixed edge connecting the two generating points, a triangular patch model is generated by generating a constrained Delaunay triangulation net as in the case of the fourth embodiment.

(Seventh Embodiment)

As in prior art (3), it is possible to input positions of 3-D points of a 3-D object in order by means of a contact or non-contact type 3-D digitizer. The input 3-D point positions are projected and transformed onto a 2-D projection surface, and the input points on the projection surface are regarded as generating points of a Delaunay triangulation net. By updating the Delaunay triangulation net each time a generating point is added, triangular patch data are generated. If any inappropriate point has been entered, the generating point is deleted by carrying out the process for deleting the generating point, thus updating the Delaunay triangulation net. The rest is the same as the third embodiment.

(Eighth Embodiment)

In the fifth embodiment, during the input process, when a line segment connecting certain two points needs to be fixed as an edge, the two generating points are designated to fix the edge to generate a constrained Delaunay triangulation net as in the case of the fourth embodiment, thus generating triangular patch data.

(Ninth Embodiment)

It is also possible to generate triangular patch data by generating a Delaunay triangulation net based upon a group of 3-D points obtained by any apparatus and method permitting the measurement of positions of points in a 3-D space, where the Delaunay triangulation net can be generated by using the same way as in the apparatus of the third embodiment.

(Tenth Embodiment)

Further, it is also possible to generate triangular patch data by generating a constrained Delaunay triangulation net based upon the information on fixing a line segment as an edge connecting two points out of a group of 3-D points which are obtained by any apparatus and method permitting the measurement of positions of points in 3-D space, where the constrained Delaunay triangulation net can be generated by using the same way as in the apparatus of the fourth embodiment, .

As explained in the embodiments above, an apparatus according to this invention needs not be always a single united apparatus as long as it is capable of entering 3-D images and generating Delaunay triangulation nets. Instead, the apparatus may be a general-purpose computer (e.g., a personal computer or workstation), which supplies programs for implementing the processing described above. In other words, the present invention may be applied to a system including a plurality of apparatuses or to a system consisting of a single apparatus. Moreover, the present invention may also be applied to a case, wherein the objects thereof are fulfilled by supplying programs to a system or an apparatus.

As explained above, according to the embodiments, it is possible to generate a 3-D geometrical shape by using triangular patches based on a Delaunay triangulation net rather than using only 3-D positions. Moreover, according to the embodiments, when generating a Delaunay triangulation net to generate a 3-D geometrical shape using triangular patches, if a point has been designated in a wrong position, then the point (generating point) can be deleted, thereby updating affected triangular patches. Generating a triangular patch from the generating points by applying a Delaunay triangulation net automatically decides the edges of the triangles according to the principle of Delaunay (circumcircle principle and minimal angle maximum principle), presenting a problem in meeting a need for leaving a line segment as an edge connecting certain two points of a triangulation net to be generated. This invention allows the line segment connecting the two points to be fixed for the triangulation net to be generated.

(Eleventh Embodiment)

The 3-D image displaying method and its apparatus according to the eleventh embodiment are related to a method and its apparatus for displaying polygon data generated by the embodiments described above. The following summarizes some main points of the eleventh embodiment.

The 3-D image displaying method of this embodiment includes a step of storing a plurality types of shape data based upon different resolutions for displaying a 3-D image of an object according to the shape data, a step of deciding the resolution of the shape data used for the 3-D image display in accordance with the display condition at the time of displaying the 3-D image of the object, and a step for displaying the 3-D image by applying the shape data with a decided resolution.

The 3-D image displaying apparatus of this embodiment is equipped with a means for storing a plurality types of shape data for displaying a 3-D image of an object according to the shape data based upon different resolutions, a means for deciding the resolution of the shape data used for the 3-D image display in accordance with the display state at the time of displaying the 3-D image of the object, and a means for displaying the 3-D image by using the shape data based upon a decided resolution.

Through the configuration or steps described above, a plurality types of shape data for displaying a 3-D image of an object are stored with different resolutions. Further, the resolution of the shape data to be used for display is decided according to the display condition of the object to be displayed (e.g., whether the object is turning or moving, and the angle of view) and a 3-D image is displayed using the shape data of the decided resolution.

A preferred embodiment of the present invention will now be described with reference to the attached drawings.

Uniform polygon data such as range image data based upon 3-D shape information, which represents a shape of an object to be displayed, are supplied to an image displaying apparatus of this embodiment through a range imaging device, range image database, shape modeler or the like. The information on attributes indicating the material and the like of the object to be displayed is also supplied to the apparatus in order to identify the surface condition of the object.

The image displaying apparatus generates shape data for representing the shape of the object from supplied 3-D shape information (uniform polygon data). In this embodiment, adaptive polygon data are used as the shape data. The adaptive polygon data are the polygon data characterized by the size of the polygon, whose size is adaptively changed according to an surface shape of an object to be displayed. Further, in this embodiment, hierarchical adaptive polygon data constituted by a plurality of adaptive polygon data, which are obtained by changing the maximum resolution contained in the adaptive polygon data in steps, are stored in a storage medium.

The displaying apparatus displays a 3-D image, which appeals as a smooth, natural image, to observer's eyes, by automatically selecting a hierarchy of the hierarchical adaptive polygon data for representing an object in accordance with observer's needs for a partial surface shape of an object to be displayed, the performance of the display unit, how the object is shown on the display unit, and whether a displayed image needs to be rotated or moved. For instance, the 3-D display of the object is performed by changing the hierarchy of the hierarchical polygon data according to whether the observer wants the displayed object to be turned or moved on the display unit or how much of the whole field of view the object occupies (angle of view) as the viewpoint moves. Thus, smooth image rotation and movement is achieved by changing the resolution of the 3-D image in accordance with the displaying condition.

The following explains in detail the 3-D image displaying apparatus of this embodiment.

Figure 33:
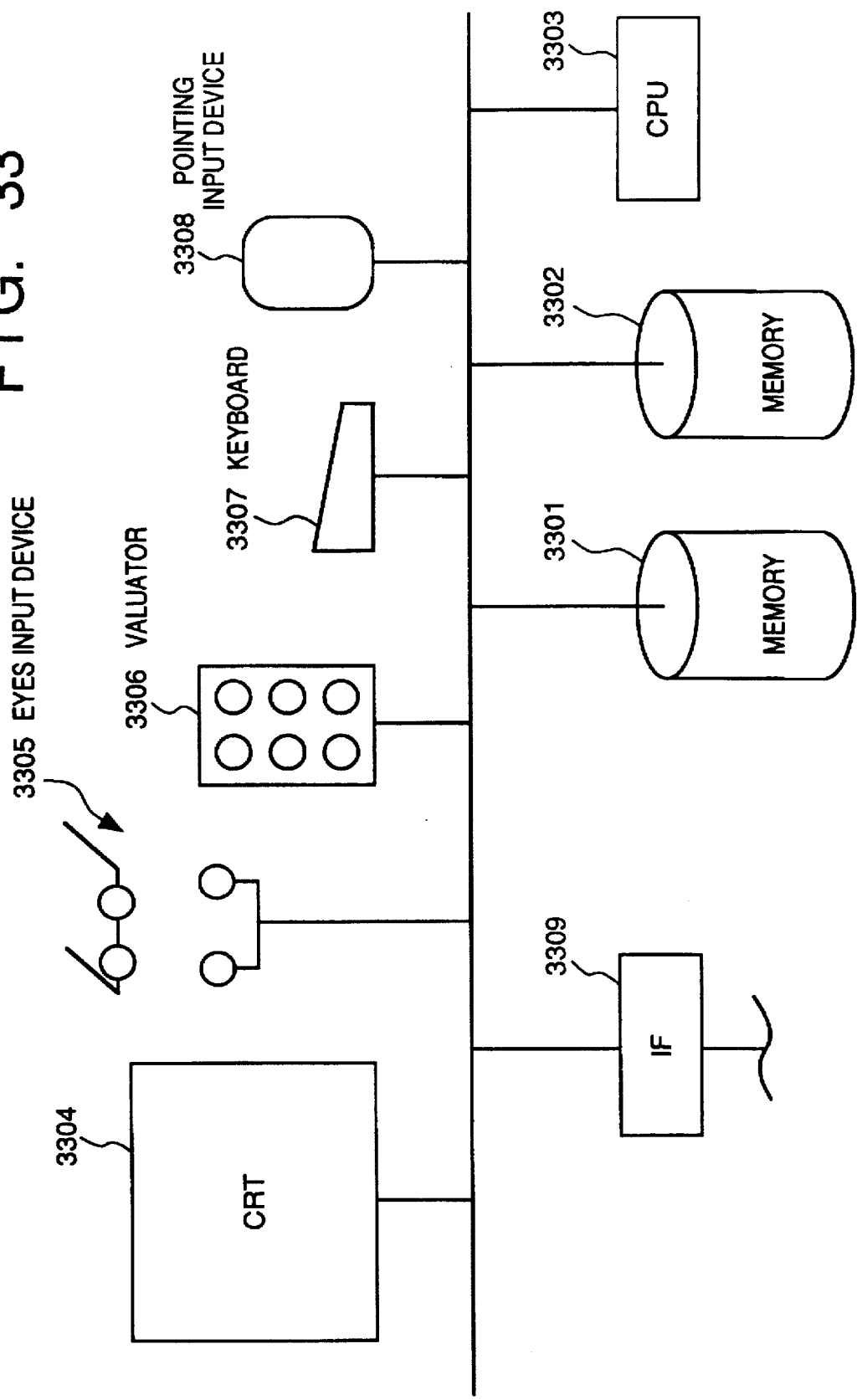
FIG. 33 is a block diagram showing a configuration of a 3-D display unit of an embodiment according to the present invention.

FIG. 33 is the block diagram showing the basic configuration of the 3-D displaying apparatus according to this embodiment. In the drawing, memory 3301 stores processing procedures and also the control program, which will be discussed later, referring to the flowcharts shown in FIG. 34 and FIG. 36. Memory 3302 stores the information required for processing and input/output data and it also stores the hierarchical adaptive polygon data and the like to be discussed later with reference to FIG. 35. CPU 3303 executes processing in accordance with the processing procedures stored in memory 3301. Display (CRT) 3304 displays 3-D images and information required for processing. Eyes input apparatus 3305 detects the 3-D position and direction of the viewpoint of an observer in relation to CRT 3304. Valuator 3306 is used by the observer to enter instructions on turning or moving an object or other instructions. Keyboard 3307 is used to enter data or instructions from a user, and pointing input device 3308 is used to enter instructions on CRT 3304. An external range imaging apparatus, range image database, and geometrical modeler (shape modeler) are connected to the 3-D displaying apparatus via I/O interface 3309. Through this I/O interface, uniform polygon data obtained by sampling a 3-D object at equal intervals.

Figure 34:
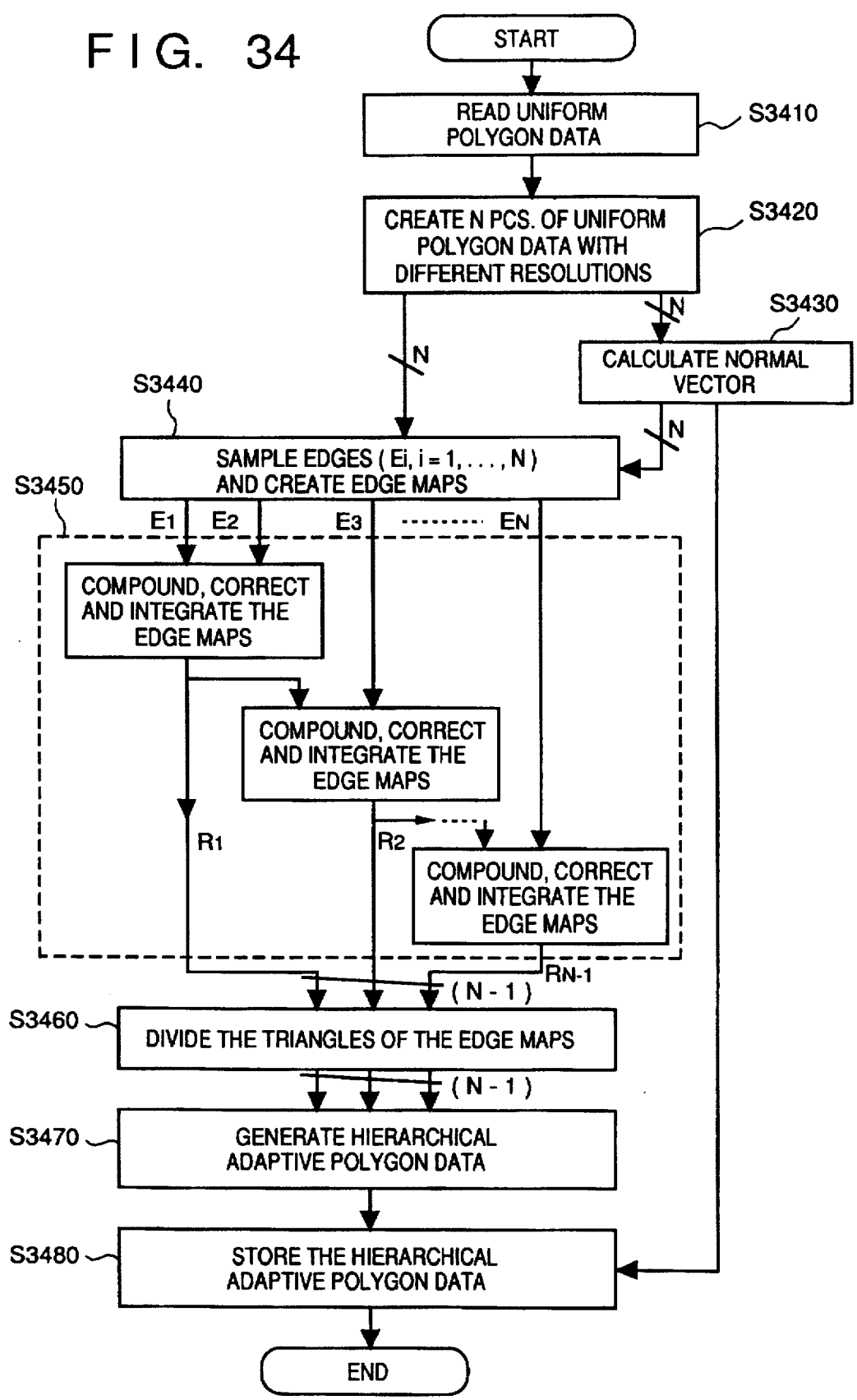
FIG. 34 is a flowchart illustrating a processing flow for creating hierarchical adaptive polygon data of an embodiment according to the present invention.

FIG. 34 shows the flowchart indicating the processing flow for preparing hierarchical adaptive polygon data in this embodiment. In the flowchart, the arrows indicate the directions of data flows.

Figure 37:
FIG. 37 shows a radial range image used for an experiment in an embodiment according to the present invention.

First, in step S3410, uniform polygon data representing the shape of a 3-D object are read through a range imaging device, range image database device, geometrical modeler or other input device via I/O interface 3309. In this embodiment, the radial range image data shown in FIG. 37 are employed as the uniform polygon data.

The radial range image is a type of image data for imaging the results of the measurement of a distance to an object; it is image data based on information on the shape and the positions of points all around the. object, the information being obtained from measurement by turning the object or the measuring device when measuring the distances. The radial range image used in this embodiment has the data structure illustrated in FIG. 9. Specifically, a straight line is taken as a rotation axis, and measurement points are disposed around the rotation axis as illustrated in FIG. 9. The distance data at these points are stored in the 2-D memory shown in FIG. 9.

In step S3420 of FIG. 34, N (N>1) pieces of uniform polygon data with different resolutions are created from the uniform polygon data. Then the resolutions of the uniform polygon data to be created are decided according to the shape of the object. In general, an object having a complicated surface shape and curves of various curvatures requires polygon data of many different resolutions.

The basic procedure for preparing a plurality of uniform polygon data in step S3420 of this embodiment is as follows. First, the read radial range image data (this is referred to as original uniform polygon data) is regarded as the one with a maximum resolution, then the data is smoothed out and resampled to create a radial range image with a lower resolution. At this time, by changing the smoothing range and the resampling interval, radial range images with different resolutions can be created. More specifically, a low-pass filter is used to eliminate noises from entered uniform polygon data and uniform polygon data containing curvature components in a predetermined range is created. As the low-pass filter for this purpose, a Gaussian filter is used in this embodiment.

Next, in step S3430, a normal vector in the uniform polygon data of each resolution obtained in step S3420 is calculated (step S3430). The normal vectors are obtained by approximating the 3-D data of points in neighborhood in the polygon data to a plane by the method of least squares.

After that, in step S3440, edges are sampled from the uniform polygon data of the resolutions previously described and the normal vectors in order to generate an edge map {E1,E2,EN}. The edge map provides data on edge lines indicating boundaries between polygons. when the angle between the normal vectors of neighboring polygons is larger than a predetermined value, it is regarded that there exist a boundary between the polygons. As an example of the processing procedure of this step, there is a technique disclosed in Japanese Patent Application No. 4-321636. A method similar to this technique may be used.

When extracting edges based upon the uniform polygon data, an edge is provided in a part, wherein the angle between normal vectors of adjoining picture elements is more than given value, which does not depend on whether the uniform polygon data has a low resolution or a high resolution. This makes the curvature become proportional to the sampling interval, allowing an edge map of smooth shapes to be created from the uniform polygon data with a low resolution, and an edge map of fine shapes to be created from the uniform polygon data of a high resolution.

In step S3450, the logical sum of the edge maps of the different resolutions determined in step S3440 is obtained for compounding the data, thus generating adaptive polygon data for each resolution. At this time, the contradiction of intersecting edge line elements or isolated edge line elements are corrected. An example of the processing procedure for this step is disclosed in Japanese Patent Application No. 4-325554 and Japanese Patent Application No. 5-159549, and a technique similar to it may be used. In this embodiment, however, data of a plurality of resolutions are not compounded into an integrated edge map as in the case of the art described in the specifications above. Specifically, as shown in step S3450 of FIG. 34, edge map E1 with the lowest resolution and an edge map E2 with the second lowest resolution are compounded to generate an integrated edge map R1. The integrated edge map R1 is compounded with an edge map E3 with the third lowest resolution to create an integrated edge map R2. This processing is repeated to create N–1 integrated edge maps {R1,R2,RN–1}.

The integrated edge maps above represent target objects in terms of many polygons. In step S3460, these polygons are divided into triangles. In step S3470, final adaptive polygon data are generated by referring to the 3-D coordinate values and normal vectors of the picture elements located at the vertexes of the triangles obtained in step S3460. As an example of this technique, there is a method described in the previous Japanese Patent Application No. 5-159549.

Figure 38A:
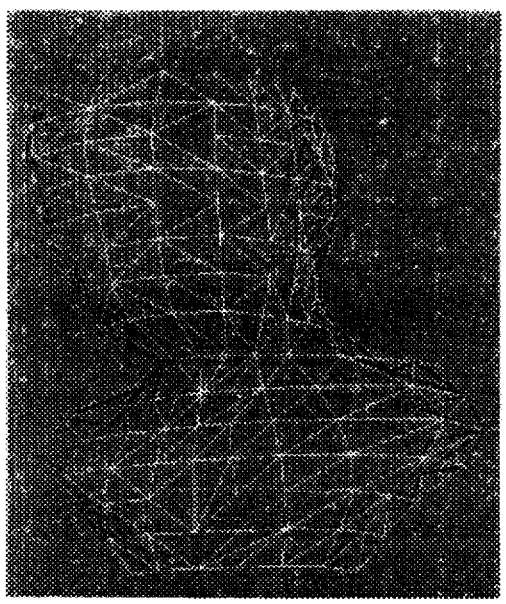
FIGS. 38A and 38B show hierarchical adaptive polygon data prepared in an embodiment according to the present invention, the data being displayed in a 3-D manner using wire frames.
Figure 38B:
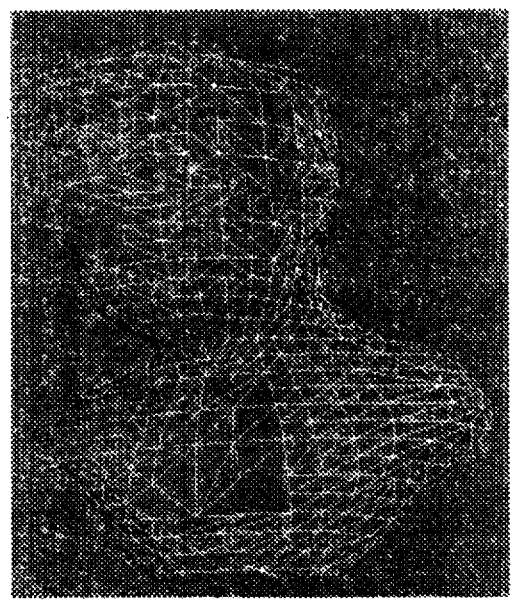
Figure 39A:
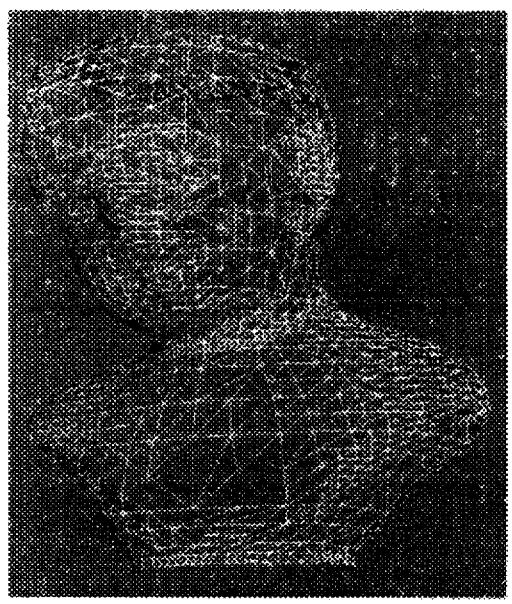
FIGS. 39A and 39B show hierarchical adaptive polygon data prepared in an embodiment according to the present invention, the data being displayed in a 3-D manner using wire frames.
Figure 39B:

FIG. 38 and FIG. 39 show adaptive polygon data, which has been obtained from the radial range image of FIG. 37, and which are represented using wire frames. FIG. 38A shows adaptive polygon data obtained by integrating the edge map data of the uniform polygon data obtained by resampling the picture element interval to 32 dots and the edge map data of the uniform polygon data obtained by resampling the picture element interval to 16 dots. Further, FIG. 38B shows the adaptive polygon data obtained by integrating the integrated edge map data of FIG. 38A and the edge map data of the uniform polygon data obtained by resampling the picture element interval to 8 dots. Likewise, FIG. 39A shows the adaptive polygon data obtained by integrating the integrated edge map data of FIG. 38B and the edge map data obtained by resampling the picture element interval to 4 dots. FIG. 39B shows the adaptive polygon data obtained by integrating the integrated edge map data of FIG. 39A and the edge map data obtained by resampling the picture element interval to 2 dots. Thus, polygon data with different resolutions are disposed in accordance with the shape of a curved surface.

Figure 35:
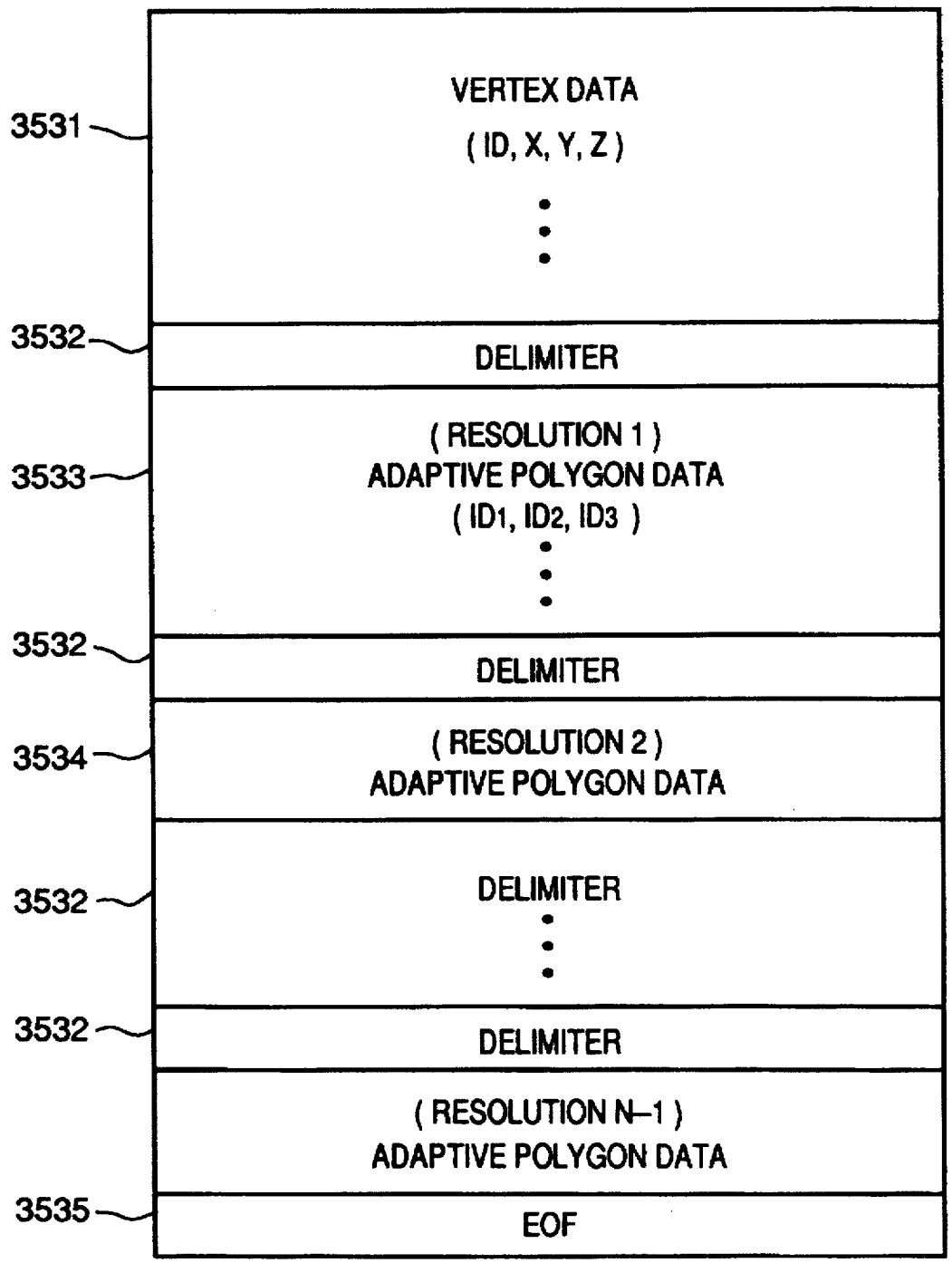
FIG. 35 is a data format of the hierarchical adaptive polygon data of an embodiment according to the present invention.

In step S3480, the N−1 pieces of adaptive polygon data are combined into one piece of data using the format shown in FIG. 35, and the result is stored in memory 3302 as hierarchical adaptive polygon data.

FIG. 35 shows an example of the data configuration of the hierarchical adaptive polygon data stored in memory 3302. In the drawing, vertex data 3531 has an identifier (ID1) added to vertex coordinates (X,Y,Z) of all triangles obtained in step S3460. Delimiter 3532 partitions individual data. Adaptive polygon data 3533 has resolution 1 and it takes three identifiers of the vertex coordinates as a set to represent one triangle. Like polygon data 3533 of resolution 1, adaptive polygon data 3534 with resolution 2 is a data set and it takes three identifiers of the data on three vertexes constituting a triangle as a set. Numeral 3535 is a code, which denotes the end of the hierarchical adaptive polygon data. Thus, the adaptive polygon data of each hierarchy are stored only by means of the identifiers of vertex coordinates, saving memory capacity.

Figure 36:
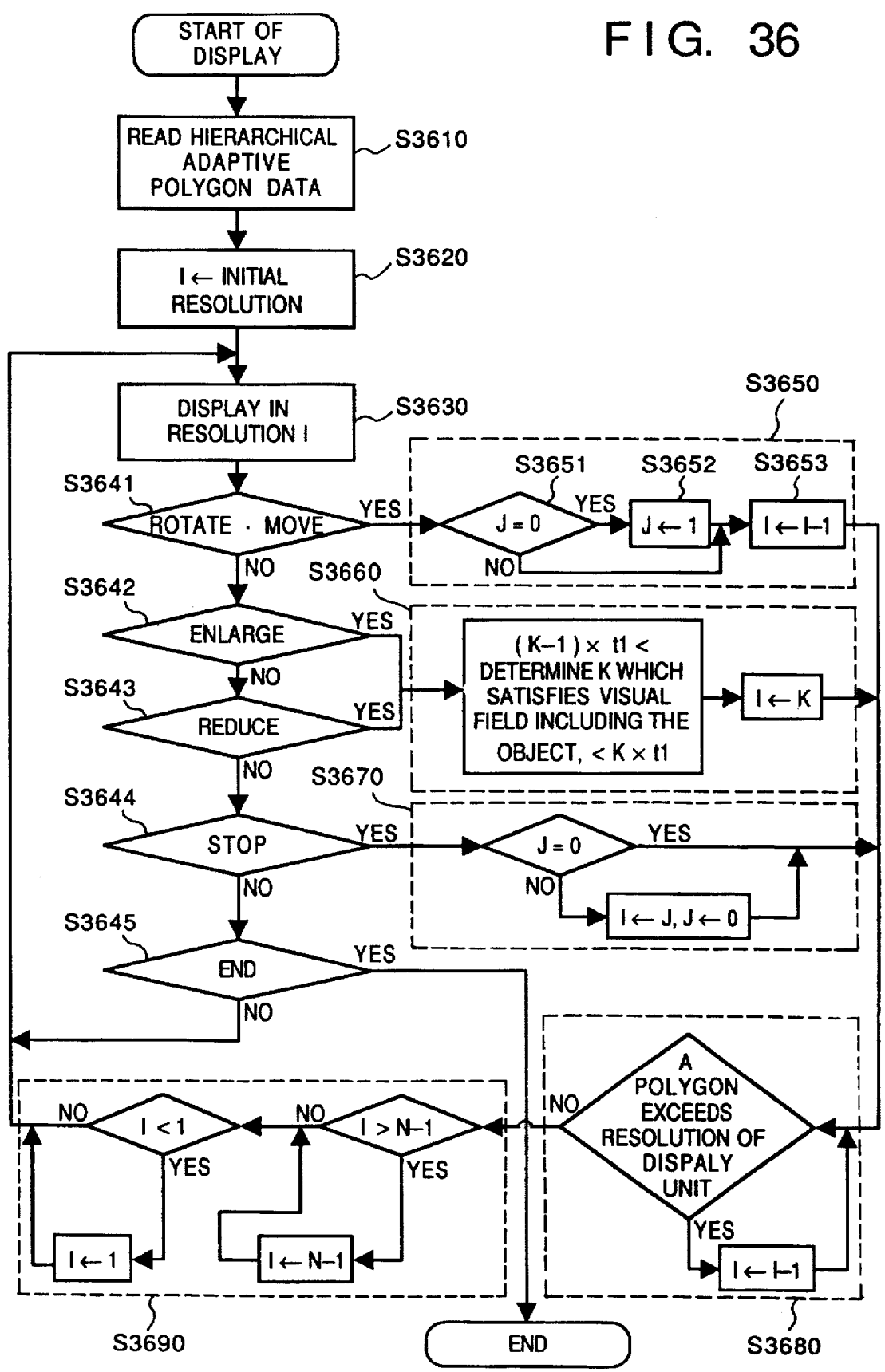
FIG. 36 is a flowchart illustrating a processing flow of displaying the hierarchical adaptive polygon data of an embodiment according to the present invention.

The following describes the procedure for displaying hierarchical adaptive polygon data stored in memory 3302, referring to the flowchart of FIG. 36. The hierarchical adaptive polygon data stored in memory 3302 as mentioned above are displayed in a 3-D mode according to the processing flow shown in FIG. 36.

First, the hierarchical adaptive polygon data is read from the memory 3302 of FIG. 33 (step S3610) Then, resolution I is set to an initial resolution (step S3620), and the adaptive polygon data of resolution I is displayed in a 3-D manner (step S3630). The initial resolution at this time is the maximum resolution (N−1). Alternatively, a resolution, which is decided by the technique shown in a step S3660 according to the ratio (angle of view) of the area on a screen occupied by the object to be displayed, may be used. Step S3660 will be discussed later.

Next, the system is placed in a state of waiting for an instruction (event) given by an observer (steps S3641 through S3645). The event is the information on a moving viewpoint of the observer, whose information is obtained through eyes input device 3305 of FIG. 33, and the event is entered through valuator 3306 or pointing input device 3308. If the entered event is related to the rotation or movement of the object or a change of the viewpoint position (step S3641), then the program proceeds to step S3650.

In step S3650, it is determined whether the rotation or movement is being begun, and if it is being begun, then the resolution immediately before the start is saved before the resolution of an image is decreased by 1 step. Or if it is already in the process of rotation or movement, then the resolution is simply decreased by 1 step. To give an example of the processing procedure, it is determined in step S3651 whether the rotation or movement is being started (J=0), and if J=0, then J is set to the current resolution I in step S3652 and the current resolution I is decreased by 1 step in a step S3653. If the rotation or movement is continuing (J≠0), then the program directly goes to step S3653 to decrease the current resolution by 1.

If the entered event is related to the enlargement of the object or an approaching viewpoint, then the program moves from step S3642 to step S3660. In step S3660, the angle of visual field, i.e., the angle of view, of a new area for displaying the object, which occupies the visual field of the observer, is estimated. Based on this obtained angle, a value K, which satisfies the conditions shown in step S3661, is determined, and the determined value is set as the current resolution. In this case, t1 denotes a predetermined interval of the angle of view required for changing the display resolution. When the entered event is related to the reduction of the object or a withdrawing viewpoint, the program proceeds from step S3643 to step S3660 to carry out the processing described above.

When no more input event is given and the object or viewpoint changes from the rotating or moving state to a quiescent state, the program advances to step S3670. If it is the rotating state immediately before the quiescent state, i.e., J≠0, then the resolution is set back to resolution J, which is the resolution before the rotating state, and J is reset to 0 (step S3670).

When a new resolution has been set through above steps S3650, S3660, and S3670, the program proceeds to step S3680. In step S3680, if the new set resolution proves to display polygons, which are so small that they exceed the resolution limit of the display unit, then the resolution is decreased so that none of the polygons go beyond the resolution limit of the display unit (step S3680). Further in step S3690, the new resolution is checked for validity, and another 3-D display of the object is implemented using the adaptive polygon data of the resolution I. More specifically, in step S3690, it is checked whether the set resolution exceeds the minimum resolution or the maximum resolution of the hierarchical adaptive polygon data stored in memory 3302. If the set resolution proves to be lower than the minimum resolution, then it is reset to the minimum resolution, while if it proves to be higher than the maximum resolution, then it is reset to the maximum resolution.

Figure 41A:
FIGS. 41A and 41B show hierarchical adaptive polygon data shown in FIG. 39, the data being shaded and displayed in a 3-D manner.
Figure 41B:

As previously described, FIG. 38 and FIG. 39 show 4-stage hierarchical adaptive polygon data displayed using wire frames, the data being obtained by the embodiments. FIG. 40 and FIG. 41 show shaded data corresponding to the adaptive polygon data of FIG. 38 and FIG. 39, respectively. In an actual display unit, these hierarchical adaptive polygon data are switched and displayed in accordance with the procedure shown by the flowchart of FIG. 36.

Figure 42:
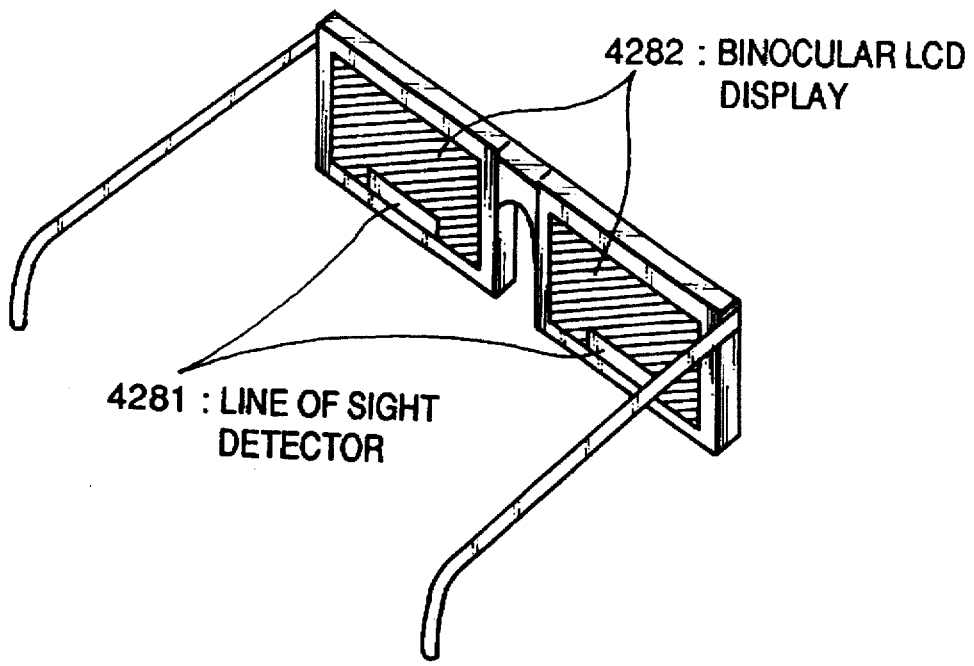
FIG. 42 shows the appearance of eyes input head-mounted display (HMD)
Figure 43:
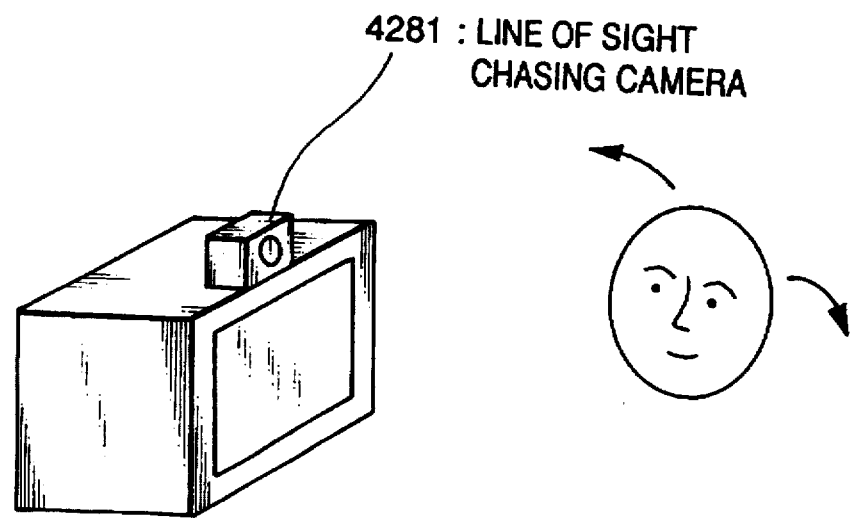
FIG. 43 shows another example of the eyes input apparatus.

In the embodiment shown in FIG. 33, not all the input devices 3305 through 3308 are always required; other methods or devices may be used instead. For example, the following device may replace eyes input device 3305. Eyes detector 4281, for example, may be added near the two lenses of the head mounted display (HMD) shown in FIG. 42 to detect the movement of the eyes, so that the equivalent operation to that of this embodiment can be performed by carrying out the processing of step S3650 of FIG. 36 while the eyes is moving. For eyes detector 4281, the one used in, for example, an auto-focus camera or the like can be used. Or, as shown in FIG. 43, TV camera 4391 may be mounted on CRT 3304 of FIG. 33 in order to detect the moving eyes by chasing the positions of the observer's eyes directed toward CRT 3304 by means of TV camera 4391. By so doing, the processing of step S3650 of FIG. 36 is carried out while the eyes is moving, and further, an approximate distance to a viewpoint is calculated from the distance between the eyes in order to calculate the angle of view, then the processing of step S3660 is carried out. This enables the equivalent operation to that of this embodiment to be accomplished.

Thus, according to the embodiment described above, the size of a polygon, i.e., resolution, is changed in accordance with a partial shape of the object to be displayed, thereby preventing generating more polygons than necessary in an attempt to faithfully representing the shape.

Moreover, according to the embodiment, there are polygon data having a plurality of different resolutions for a single object to be displayed, making it possible to display the object by changing the resolution in response to the instructions given by an observer on rotation, movement, etc. As a result, the display resolution is decreased to avoid representing unnecessary details of a shape when the observer does not need the representation of the details of the shape while the object is turning or the like, enabling smooth display of a turning or moving object.

Furthermore, according to this embodiment, it is possible to calculate the angle in the visual field occupied by the object when it is displayed by making use of the position or direction of the observer in relation to the display unit and to change the resolution of the display image accordingly. Hence, the load on the display unit can be reduced by changing the resolution of polygon data according as the object is displayed small or large on the screen.

As described above, the 3-D image displaying method and apparatus according to the present invention make it possible to provide 3-D display of an object by changing the resolution in accordance with the display condition, thereby reducing the load applied to the display unit and also ensuring smooth display when a displayed image is moved, enlarged or reduced.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:
   an input step of interactively selecting and entering discrete points on an object in a 3-D space;
   a generating step of generating a model having a 3-D geometrical shape by employing triangular patches making use of a Delaunay triangulation net in accordance with the discrete points entered in said input step;
   said generating step comprising:
   a first updating step of adding a generating point, which has been entered in said input step, generating a triangular patch data including the added generating point and updating the Delaunay triangulation net;
   a second updating step of deleting an existing generating point by designating the point to be deleted, deleting a triangular patch data including the deleted generating point, and updating the Delaunay triangulation net;
   a third updating step of fixing a line segment connecting two points, which have been entered in said input step, as an edge of a triangle of a triangular patch data, and updating the Delaunay triangulation net; and
   a fourth updating step of selecting an existing fixed edge on a screen displaying the Delaunay triangulation net, releasing the fixed edge from the Delaunay triangulation net, and updating the Delaunay triangulation net;
   a storing step of storing the model generated in said generating step in a storing means; and
   a displaying step for providing a 3-D display of the object by using shape data selected from the pluarity of shape data stored in said storing means to change the resolution in accordance with the display condition of the object.

2. An imannge processing method according to claim 1, wherein said input step interactively selects corresponding points of right and left images in a stereo image and enters 3-D positional data of these points in accordance with the principle of triangulation.

3. An image processing method according to claim 1, wherein said input step selects points from a range image and enters the 3-D positional data.

4. An image processing method according to claim 1, wherein said input step selects points by means of a 3-D digitizer and enters the 3-D positional data.

5. An image processing method according to claim 1, further comprising:
   a storing step of storing a plurality of types of shape data each having different resolution for displaying the object to be displayed in a form of a 3-D image;
   a deciding step of deciding the resolution of the shape data used for the 3-D image display in accordance with a display condition when displaying the object in the form of a 3-D image; and
   a displaying step of providing a 3-D image display by applying the shape data with the decided resolution.

6. An image processing method according to claim 1, wherein said input step enters range image data of an object and said generating step generates 3-D geometrical shape data, which represents the 3-D shape of the object, based upon the range image data.

7. An image processing method according to claim 1, wherein the discrete points on the object are manually input in said input step.

8. An image processing method according to claim 1, wherein, in said generating step, a plurality of polygon data with different resolutions is generated in accordance with the information on the 3-D geometrical shape, which has been entered in said input step.

9. An image processing method according to claim 8, wherein the plurality of polygon data in said generating step is adaptive polygon data, and a size and a shape of a polygon are changed in accordance with a partial shape of the object.

10. An image processing method according to claim 9, wherein, in said generating step, hierarchical adaptive polygon data comprising the plurality of adaptive polygon data is obtained by changing a maximum resolution contained in the adaptive polygon data in steps.

11. An image processing method according to claim 10, wherein in said storing step, overlapped data on polygon vertexes or edges shared in the hierarchical adaptive polygon data is removed and the data is stored.

12. A 3-D image processing method according to claim 10, wherein in said displaying step, a hierarchy of said hierarchical adaptive polygon data is selected in accordance with a display condition required by a user and load required for display.

13. An image processing method according to claim 10, wherein in said displaying step, a hierarchy of the hierarchical adaptive polygon data is selected in accordance with an angle of view from an observer, which is occupied by the object on a 2-D plane of projection, onto which the object is projected, and the object is displayed according to the adaptive polygon data of the selected hierarchy.

14. A 3-D image processing method according to claim 10, wherein in said displaying step, a hierarchy of the hierarchical adaptive polygon data is selected in accordance with a projection size of the object and a resolution of a display unit on a 2-D projection plane, onto which the object is projected.

15. An image processing method according to claim 1, wherein said first updating step and said second updating step are performed in parallel, and said third updating step and said fourth updating step are performed in parallel.

16. An image processing apparatus comprising:

input means for interactively selecting and entering discrete points on an object in a 3-D space;

generating means for generating a model having a 3-D geometrical shape by employing triangular patches making use of a Delaunay triangulation net in accordance with the discrete points entered by said input means;

said generating means comprising:

first updating means for adding a generating point, which has been entered by said input means, generating a triangular patch data including the added generating point, and updating the Delaunay triangulation net;

second updating means for deleting an existing generating point by designating the point to be deleted, deleting a triangular patch data including the deleted generating point, and updating the Delaunay triangulation net;

third updating means for fixing a line segment connecting two points, which have been entered by said input means, as an edge of a triangle of a triangular patch data, and updating the Delaunay triangulation net; and fourth updating means for selecting an existing fixed edge on a screen displaying the Delaunay triangulation net, releasing the fixed edge from the Delaunay triangulation net, and updating the Delaunay triangulation net;

storing means for storing the model generated in said generating step; and displaying means for providing a 3-D display of the object by using shape data selected from the plurality of types of shape data stored by said storing means to change a resolution in accordance with a display condition of the object.

17. An image processing apparatus according to claim 16, wherein said input means interactively selects corresponding points of right and left images in a stereo image and enters 3-D positional data of these points in accordance with the principle of trigonometrical survey.

18. An image processing apparatus according to claim 16, wherein said input means selects points from a range image and enters 3-D positional data of these points.

19. An image processing apparatus according to claim 16, wherein said input means selects points by means of a 3-D digitizer and enters 3-D positional data of these points.

20. An image processing apparatus according to claim 16, further comprising:

storing means for storing a plurality of types of shape data with different resolutions for displaying the object in a form of a 3-D image;

deciding means for deciding a resolution of shape data used for a 3-D image display in accordance with a display condition when displaying the object in a form of the 3-D image; and displaying means for providing a 3-D image display by employing the shape data with the decided resolution.

21. An image processing apparatus according to claim 16, wherein said input means inputs range image data of an object and said generating means generates 3-D geometrical shape data, which represents a 3-D shape of the object, based upon the range image data.

22. An image processing apparatus according to claim 16, wherein the discrete points on the object are manually input in said input means.

23. An image processing apparatus according to claim 16, wherein said generating means generates a plurality of polygon data with different resolutions in accordance with the 3-D geometrical shape data.

24. An image processing apparatus according to claim 23, wherein the plurality of polygon data in said generating means is adaptive polygon data, and a size and a shape of a polygon are changed in accordance with a partial shape of the object.

25. An image processing apparatus according to claim 24, wherein said generating means employs hierarchical adaptive polygon data comprising the plurality of adaptive polygon data obtained by changing a maximum resolution contained in the adaptive polygon data in steps.

26. An image processing apparatus according to claim 25, wherein said storing means removes overlapped data on polygon vertexes or edges shared in the hierarchical adaptive polygon data and stores the data.

27. An image processing apparatus according to claim 25, wherein said displaying means selects a hierarchy of the hierarchical adaptive polygon data in accordance with a display condition required by a user and load required for display.

28. An image processing method according to claim 25, wherein said displaying means selects a hierarchy of the hierarchical adaptive polygon data in accordance with an angle of view from an observer, which is occupied by the object on a 2-D plane of projection, onto which the object is projected, and the object is displayed according to the adaptive polygon data of the selected hierarchy.

29. An image processing apparatus according to claim 25, wherein said displaying means selects a hierarchy of the hierarchical adaptive polygon data in accordance with a projection size of the object and a resolution of a display unit on a 2-D projection plane, onto which the object is projected.

30. An image processing apparatus according to claim 16, wherein said first updating means and said second updating means operate in parallel, and said third updating means and said fourth updating means operate in parallel.

* * * * *

UNITED STATES PATENT AND TRADEMARK OFFICE
CERTIFICATE OF CORRECTION

PATENT NO. : 5,748,865
DATED : May 5, 1998
INVENTOR(S) : Yamamoto et al.

It is certified that error appears in the above-identified patent and that said Letters Patent is hereby corrected as shown below:

On the title page,

[56] References Cited

U.S. PATENT DOCUMENTS

"5,428,726  6/1995" should read --5,428,726  7/1995--.

SHEET 5 OF THE DRAWINGS:

In FIG. 5, In Memory A, "TRANFORMATION" should read --TRANSFORMATION--.

SHEET 9 OF THE DRAWINGS:

In FIG. 9, "COODINATE" should read --COORDINATE--.

SHEET 22 OF THE DRAWINGS:

In FIG. 22C, "PLYGONAL" should read --POLYGONAL--.

SHEET 36 OF THE DRAWINGS:

In FIG. 36, In S3680, "DISPALY" should read --DISPLAY--.

COLUMN 1:

Line 11, "determine" should read --determines--;
Line 34, "object," should read --object--;

UNITED STATES PATENT AND TRADEMARK OFFICE
CERTIFICATE OF CORRECTION

PATENT NO. : 5,748,865

DATED : May 5, 1998

INVENTOR(S) : Yamamoto et al.

It is certified that error appears in the above-identified patent and that said Letters Patent is hereby corrected as shown below:

Line 35, "there is a method," should be deleted; and
    Line 36, "wherein" should be deleted.

COLUMN 3:

Line 53, "a edge" should read --an edge--.

COLUMN 4:

Line 1, "of.local" should read --of local--;
    Line 28, "object as in a case," should read --object, as in a case--; and
    Line 64, "of still" should read --of a still--.

COLUMN 5:

Line 12, "detecting," should read --detecting--.

COLUMN 6:

Line 42, "entering." should read --entering--.

COLUMN 11:

Line 20, after "manner.", begin a new paragraph with "(2)";
    Line 30, "needs" should read --need--; and
    Line 33, "needs" should read --need--.

UNITED STATES PATENT AND TRADEMARK OFFICE
CERTIFICATE OF CORRECTION

PATENT NO. : 5,748,865
DATED : May 5, 1998
INVENTOR(S) : Yamamoto et al.

It is certified that error appears in the above-identified patent and that said Letters Patent is hereby corrected as shown below:

COLUMN 12:

Line 31, "rotates" should be deleted.

COLUMN 13:

Line 34, "shows" should read --show--.

COLUMNS 15-16:

"$T = \alpha - \beta\gamma$" should read --$T = \alpha\beta\gamma$--.

COLUMN 17:

Line 9, "oneline" should read --one-line--;
Line 26, "an range" should read --a range--; and
Line 66, "add" should read --dd2--.

COLUMN 18:

Line 4, "re" should read --rr3--; and
Line 37, "S503)" should read --S503).--.

UNITED STATES PATENT AND TRADEMARK OFFICE
CERTIFICATE OF CORRECTION

PATENT NO. : 5,748,865
DATED : May 5, 1998
INVENTOR(S) : Yamamoto et al.

It is certified that error appears in the above-identified patent and that said Letters Patent is hereby corrected as shown below:

COLUMN 19:

Line 1, "S507)" should read --S507).--; and
Line 34, "606" should read --S606--.

COLUMN 20:

Line 12, "stereo," should read --stereo--;
Line 17, "is fixed," should read --are fixed,--; and
Line 53, "which" should be deleted.

COLUMN 21:

Line 1, "fixing a" should read --fixing an--; and
Line 5, "like" should read --like that--.

COLUMN 22:

Line 16, "other" should read --another--;
Line 26, "a stereo" should read --stereo--; and
Line 38, "has a" should read --has--.

COLUMN 23:

Line 34, "embodiment,." should read --embodiment.--; and
Line 36, "needs" should read --need--.

UNITED STATES PATENT AND TRADEMARK OFFICE
CERTIFICATE OF CORRECTION

PATENT NO. : 5,748,865
DATED : May 5, 1998
INVENTOR(S) : Yamamoto et al.

It is certified that error appears in the above-identified patent and that said Letters Patent is hereby corrected as shown below:

COLUMN 24:

Line 5, "plurality types" should read --plurality of types--;
Line 14, "plurality types" should read --plurality of types--;
Line 23, "plurality types" should read --plurality of types--; and
Line 46, "to an" should read --to a--.

COLUMN 25:

Line 23, "obtained" should read --are obtained--; and
Line 38, "the." should read --the--.

COLUMN 26:

Line 9, {E1, E2, EN}." should read --{E1, E2, ..., EN}.--;
Line 10, "when" should read --When--;
Line 32, "are" should read --is--; and
Line 45, "{R1, R2, RN-" should read -- {R1, R2, ..., RN- --.

UNITED STATES PATENT AND TRADEMARK OFFICE
CERTIFICATE OF CORRECTION

PATENT NO. : 5,748,865
DATED : May 5, 1998
INVENTOR(S) : Yamamoto et al.

It is certified that error appears in the above-identified patent and that said Letters Patent is hereby corrected as shown below:

COLUMN 28:

Line 55, "eye is" should read --eyes are--; and
Line 62, "eye is" should read --eyes are--.

COLUMN 29:

Line 5, "representing" should read --represent--; and
Line 21, "according" should read --accordingly--.

COLUMN 30:

Line 4, "imange" should read --image--.

Signed and Sealed this

Third Day of August, 1999

Attest:

Q. TODD DICKINSON

*Attesting Officer*    *Acting Commissioner of Patents and Trademarks*